US008073836B2

(12) United States Patent
McNall et al.

(10) Patent No.: US 8,073,836 B2
(45) Date of Patent: Dec. 6, 2011

(54) SYSTEM FOR VIEWING DATABASES

(75) Inventors: Kent S. McNall, Edmonds, WA (US); Samuel G. Dernulling, Lynnwood, WA (US)

(73) Assignee: Epicor Software Corporation, Irvine, CA (US)

( * ) Notice: Subject to any disclaimer, the term of this patent is extended or adjusted under 35 U.S.C. 154(b) by 1200 days.

(21) Appl. No.: 11/070,054

(22) Filed: Mar. 1, 2005

(65) Prior Publication Data

US 2005/0256852 A1 Nov. 17, 2005

Related U.S. Application Data

(60) Provisional application No. 60/548,966, filed on Mar. 1, 2004, provisional application No. 60/571,395, filed on May 15, 2004.

(51) Int. Cl.
*G06F 7/00* (2006.01)
*G06F 17/30* (2006.01)

(52) U.S. Cl. ........ 707/713; 707/718; 707/726; 707/732; 707/759

(58) Field of Classification Search .................. None
See application file for complete search history.

(56) References Cited

U.S. PATENT DOCUMENTS

| 5,515,488 | A | * | 5/1996 | Hoppe et al. | 345/440 |
| 5,713,020 | A | * | 1/1998 | Reiter et al. | 707/102 |
| 5,819,268 | A | * | 10/1998 | Hackett | 707/690 |
| 5,874,953 | A | * | 2/1999 | Webster et al. | 715/733 |
| 6,169,992 | B1 | * | 1/2001 | Beall et al. | 707/103 R |
| 6,226,635 | B1 | * | 5/2001 | Katariya | 707/4 |
| 6,356,897 | B1 | * | 3/2002 | Gusack | 707/4 |
| 6,574,637 | B1 | * | 6/2003 | Lindsey | 707/104.1 |
| 6,993,533 | B1 | * | 1/2006 | Barnes | 707/102 |
| 7,113,941 | B2 | * | 9/2006 | Arend et al. | 707/3 |
| 7,188,317 | B1 | * | 3/2007 | Hazel | 715/804 |
| 7,263,667 | B1 | * | 8/2007 | Hoellerer et al. | 715/782 |

(Continued)

OTHER PUBLICATIONS

Ammoura, "Towards a Novel OLAP Interface for Distributed Data Warehouses" Lecture Notes in Computer Science; vol. 2114, Proceedings of the Third International Conference on Data Warehousing and Knowledge Discovery, pp. 174-185, Year of Publication: 2001.*

(Continued)

*Primary Examiner* — Pierre Vital
*Assistant Examiner* — Berhanu Mitiku
(74) *Attorney, Agent, or Firm* — Graybeal Jackson LLP; Bryan A. Santarelli

(57) ABSTRACT

A system and method allows for dynamic, parameterized linking of database views or tables. The database tables are related in a parent-dependent relationship, with dependent tables being linked to parent tables through a parameter. When a new record in the parent table is scrolled to, dependent tables automatically run queries and return records with matching parameters. The parameters include field values. Several table views may be combined in a single database table set. Multiple dependent tables may be linked to an individual parent table in a parallel manner. Dependent tables may also be cascaded through intermediate parent tables, each table in the cascade acting as a dependent to its parent and acting as a parent table to its dependent table(s). Database table sets may be saved and may be transmitted, for example via email.

48 Claims, 44 Drawing Sheets

U.S. PATENT DOCUMENTS

| | | | |
|---|---|---|---|
| 7,707,221 B1* | 4/2010 | Dunning et al. | 707/770 |
| 2003/0149704 A1* | 8/2003 | Yayoi et al. | 707/102 |
| 2003/0172082 A1* | 9/2003 | Benoit et al. | 707/101 |
| 2004/0249788 A1* | 12/2004 | Dant | 707/1 |
| 2005/0080773 A1* | 4/2005 | Koike et al. | 707/3 |
| 2005/0144176 A1* | 6/2005 | Lei et al. | 707/100 |
| 2009/0112857 A1* | 4/2009 | Tong et al. | 707/5 |
| 2009/0119270 A1* | 5/2009 | Dettinger et al. | 707/3 |

OTHER PUBLICATIONS

Davison et al. "A Visual Interface for a Database with Version Management", ACM Transactions on Office Information Systems, vol. 4, No. 3, Jul. 1986, pp. 226-256.*

Schneider "A Relational View of the Data Independent Accessing Model" Martin Marietta Data Systems Division, Denver, Colorado 80201.*

* cited by examiner

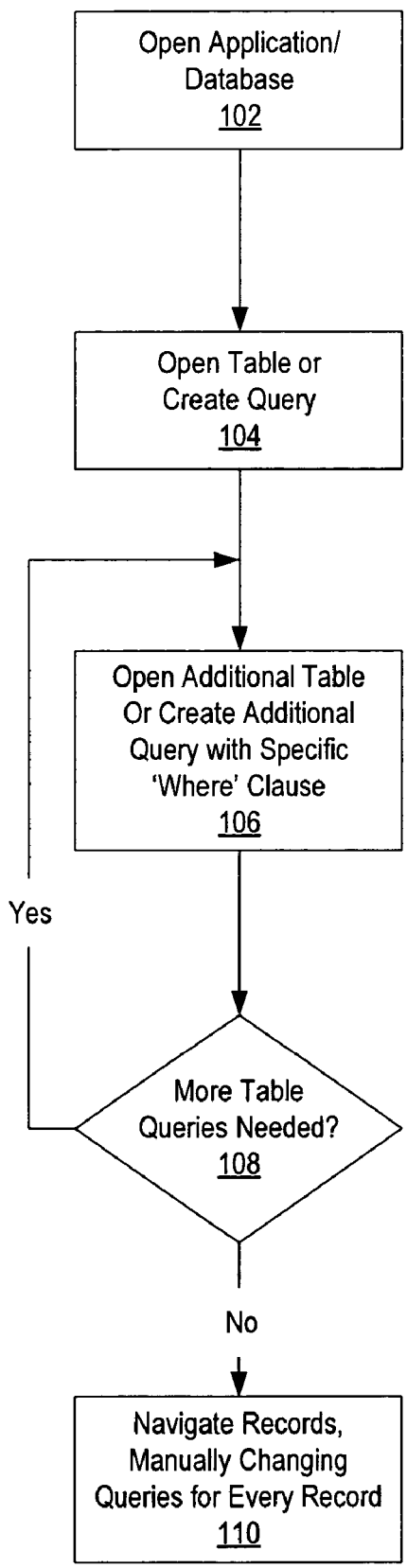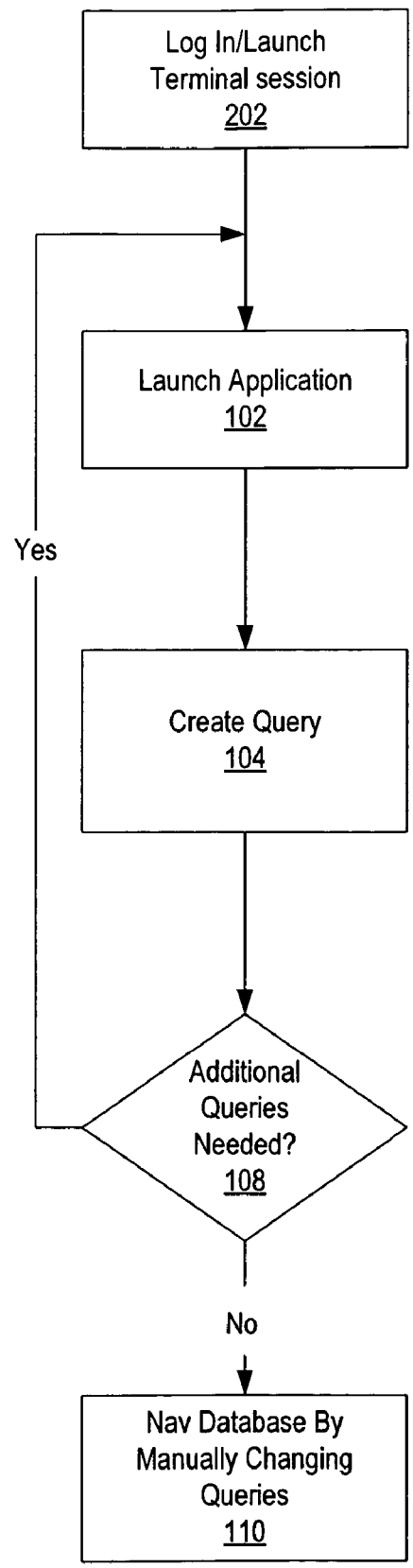
FIG. 1
FIG. 2

| inv_id1 | inv_id2 | inv_id3 | inv_desc | inv_price | inv_cost | inv_reg_price | inv_lsat_pur | inv_last_sale |
|---|---|---|---|---|---|---|---|---|
| MOR001 | 924 | 1033 | (JF) FOOTBALL | 9.95 | 4.50 | 9.95 | 10/27/1999 | 7/16/2001 |
| GEN001 | 924 | 1032 | NEW TERMINALS WOULD | 0.00 | 0.00 | 0.00 | 5/28/1998 | |
| OES001 | 124 | 1031 | JLP | 0.00 | 0.00 | 0.00 | 5/27/1998 | |
| 999 | 924 | 1030 | (AP98) ANNIVERSAR | 2.95 | 0.66 | 2.95 | 6/29/1998 | 5/3/2001 |
| GEAR | 512 | 1029 | (PLP2XXL) PICK LOG | 44.00 | 21.25 | 44.00 | 6/10/1998 | 7/16/2001 |
| GEAR | 512 | 1028 | (PLP2) PICK LOGO P | 42.00 | 20.25 | 42.00 | 6/10/1998 | 7/16/2001 |
| GEAR | 512 | 1027 | (PLP2XXL) PICK LOG | 42.00 | 19.75 | 42.00 | 6/10/1998 | 7/16/2001 |
| GEAR | 512 | 1026 | (PLP) PICK LOGO PO | 40.00 | 18.75 | 40.00 | 6/10/1998 | 7/16/2001 |
| MER001 | 924 | 1025 | (JFB) FLAP BRIEFCA | 48.00 | 23.72 | 48.00 | 6/5/1998 | 12/15/2000 |
| MER001 | 924 | 1024 | (JK) KNAPSACK | 35.00 | 16.72 | 35.00 | 6/5/1998 | 12/15/2001 |
| GEAR | 923 | 1023 | (CBH) COLLEGIATE B | 16.95 | 8.38 | 16.95 | 6/22/1998 | 6/19/2001 |
| ADVCOM | 924 | 1022 | (BBB) BEAN BAG BUF | 9.95 | 4.25 | 9.95 | 5/22/1998 | |
| ADVCOM | 924 | 1021 | (BBJ) BEAN BAG | 9.95 | 4.60 | 9.95 | 5/22/1998 | 7/16/2001 |
| ADVCOM | 924 | 1020 | (LP) LAPEL PIN | 2.50 | 1.00 | 2.50 | 5/22/1998 | 12/15/2000 |
| GEN001 | 124 | 1019 | MISTAKE | 0.00 | 0.00 | 0.00 | 5/28/1998 | |
| OAR001 | 802 | 1018 | (SOS) STILLWATER | 46.00 | 22.00 | 46.00 | 2/24/2001 | 7/16/2001 |
| OAR001 | 802 | 1017 | (SBLS) SMALL BLOC | 46.00 | 22.00 | 46.00 | 5/19/1998 | 12/15/2000 |
| Ameokc | 606 | 1016 | (JG00XXL) GRAD 20 | 13.95 | 4.61 | 13.95 | 5/19/1998 | 12/15/2000 |
| AMEOKC | 606 | 1015 | (JG00) GRADUATE 2 | 12.95 | 3.20 | 12.95 | 5/19/1998 | 12/15/2000 |
| AMEOKC | 606 | 1014 | (JG99XXL) GRADUA | 13.95 | 4.60 | 13.95 | 5/19/1998 | 12/15/2000 |
| AMEOKC | 606 | 1013 | (JG99) GRADUATE 9 | 12.95 | 3.20 | 12.95 | 5/19/1998 | 12/15/2000 |
| GEAR | 509 | 1012 | (ASJXXL) ARM STRI | 36.00 | 17.50 | 35.00 | 6/23/1998 | 7/16/2001 |

FIG. 8

| | | | | | | | | | | |
|---|---|---|---|---|---|---|---|---|---|---|
| ge_batch_ids | | | | | | | | | | |
| gift_card | inv | | | | | | | | | |
| giftcert | inv_id1 | inv_id2 | inv_id3 | inv_desc | inv_price | inv_cost | inv_reg_price | inv_lsat_pur | inv_last_sale | inv_s |
| gl_div_acct | ▲ MOR001 | 924 | 1033 | (JF) FOOTBALL | 9.95 | 4.50 | 9.95 | 10/27/1999 | 7/16/1999 | 2 |
| glbatches | GEN001 | 924 | 1032 | NEW TERMINALS W | 0.00 | 0.00 | 0.00 | 5/28/1998 | | 0 |
| gljm_dtl | OES001 | 124 | 1031 | JLP | 0.00 | 0.00 | 0.00 | 5/27/1998 | | 0 |
| gljm_hdr | 999 | 924 | 1030 | (AP98) ANNIVERSAR | 2.95 | 0.66 | 2.95 | 6/29/1998 | 5/3/2001 | 8 |
| handle_msg | GEAR | 512 | 1029 | (PLP2XXL) PICK LOG | 44.00 | 21.25 | 44.00 | 6/10/1998 | 7/16/2001 | 2 |
| help_files | GEAR | 512 | 1028 | (PLP2) PICK LOGO P | 42.00 | 20.25 | 42.00 | 6/10/1998 | 7/16/2001 | 6 |
| his_bucket | GEAR | 512 | 1027 | (PLP2XXL) PICK LOG | 42.00 | 19.75 | 42.00 | 6/10/1998 | 7/16/2001 | 2 |
| hold_types | GEAR | 512 | 1026 | (PLP) PICK LOGO PO | 40.00 | 18.75 | 40.00 | 6/10/1998 | 7/16/2001 | 2 |
| honorifics | MER001 | 924 | 1025 | (JFB) FLAP BRIEFCA | 48.00 | 23.72 | 48.00 | 6/05/1998 | 12/15/2000 | 0 |
| html_reports | inv_detail | | | | | | | | | |
| inetlog | id_id3 | id_store | id_colbr | id_size1 | id_size2 | id_size3 | id_size4 | id_size5 | id_size6 | id_size7 | id_size8 | id_size9 |
| inout_times | ▲ 1 | 999 | BR- | 230.0 | 299.0 | 410.0 | 324.0 | 0.0 | 0.0 | 0.0 | 0.0 | 0.0 |
| inv | 1 | 999 | BW- | 177.0 | 151.0 | 239.0 | 211.0 | 0.0 | 0.0 | 0.0 | 0.0 | 0.0 |
| inv_average | 1 | 999 | CD- | 181.0 | 164.0 | 256.0 | 174.0 | 0.0 | 0.0 | 0.0 | 0.0 | 0.0 |
| inv_control | 1 | 999 | DM- | 118.0 | 137.0 | 247.0 | 211.0 | 0.0 | 0.0 | 0.0 | 0.0 | 0.0 |
| inv_detail | 1 | 999 | FA- | 28.0 | 50.0 | 234.0 | 151.0 | 0.0 | 0.0 | 0.0 | 0.0 | 0.0 |
| inv_detailstatus | 1 | 999 | FG- | 222.0 | 174.0 | 257.0 | 246.0 | 0.0 | 0.0 | 0.0 | 0.0 | 0.0 |
| inv_dtemp | 1 | 999 | GE- | 196.0 | 204.0 | 174.0 | 275.0 | 0.0 | 0.0 | 0.0 | 0.0 | 0.0 |
| inv_normalized | 1 | 999 | JE- | 79.0 | 35.0 | -20.0 | 0.0 | 0.0 | 0.0 | 0.0 | 0.0 | 0.0 |
| inv_store | 1 | 999 | NY- | 150.0 | 146.0 | 283.0 | 223.0 | 0.0 | 0.0 | 0.0 | 0.0 | 0.0 |
| invoice_ids | | | | | | | | | | |
| invtran | | | | | | | | | | |

📄 ol_qadb_07 retail – Data Ninja on INFORMIX  — □ X

File  Query Sets  Plugins  Windows  Help

| as | xml | sql | scr | db |
| all | x | / |  |  |
|  | ▲ |  |  | ? ▲ | customer_issues
customers — 2708
employees
issue_types
items_catalog
items_master
manufacturers
order_items ← 2712
orders
package_codes
state_names

2710

2702

CREATE TABLE
informix.cusotmers (
customer_id SERIAL NOT NULL,
first_name CHAR(15),
last_name CHAR(15),
company CHAR(20),
address_l1 CHAR(20),
address_l2 CHAR(20),
city CHAR(15),
st_code CHAR(2),
postal_code CHAR(5),
day_phone CHAR(18)
)

CREATE TABLE
informix.employees (
user_id CHAR(12) NOT NULL,
first_name CHAR(15),
last_name CHAR(15),
address_l1 CHAR(20),
address_l2 CHAR(20),
city CHAR(15),
st_code CHAR(2),
postal_code CHAR(5),
mobil_phone CHAR(18),
day_phone CHAR(18),
photo BYTE
)

2704

CREATE TABLE
informix.order_items (
line_no SMALLINT,
order_no INTEGER,
stock_no SMALLINT NOT NULL,
manf_id CHAR(3), NOT NULL
qty_odered SMALLINT,
extended_price MONEY,
qty_shipped SMALLINT
)

2706

706

FIG. 27 ol_qadb_07 retail – Data Ninja on INFORMIX

File  Query Sets  Plugins  Windows  Help

- customer_issues
- customers
- employees
- issue_types
- items_catalog
- items_master
- manufacturers
- order_items
- orders
- package_codes
- state_names customers

| customer_id | last_name | company | address_l2 | city |
|---|---|---|---|---|
| 101 | Johnson | All Sports Supplies | | Sunnyvale |
| 102 | Martin | Sports Sport | | San Francisco |
| 103 | Gura | Phil's Sports | P.O. Box 3498 | Palo Alto |
| 104 | Griffey | Play Ball! | | Redwood City |
| 105 | Moyer | Los Altos Sports | 422 Bay Road | Los Altos |
| 106 | Jackson | Watson & Son | | Mountain View | orders

| order_no | customer_id | cap_backorder | po_no | ship_date |
|---|---|---|---|---|
| 1002 | 101 | n | 9720 | 5/26/1998 | order_items

| line_no | order_no | qty_ordered | extended_price | qty_shipped |
|---|---|---|---|---|
| 1 | 1002 | 1 | 960.00 | 1 |
| 2 | 1002 | 1 | 240.00 | 1 |

SYSTEM FOR VIEWING DATABASES

CROSS REFERENCE TO RELATED APPLICATIONS

This patent application claims priority benefit from and incorporates by reference U.S. Provisional Patent Application Ser. No. 60/548,966, entitled SYSTEM AND METHOD FOR PARAMETERIZED LINKING, VIEWING, AND TRANSMISSION OF DATABASES, invented by Kent S. McNall et al., filed on Mar. 1, 2004; and claims priority benefit No. 60/571,395, entitled METHOD AND APPARATUS FOR VIEWING DATABASES, invented by Kent S. McNall et al., filed on May 15, 2004.

FIELD OF THE INVENTION

The present invention relates to a system and method for linking, viewing, and transmitting sets of related tables and queries of relational databases and related data, and more specifically to creating, viewing, and transmitting parameterized views of related tables, queries and data in a graphical user environment where the queries dynamically respond to changes in related queries.

BACKGROUND

Databases are used in a broad range of computing applications, including point-of-sale systems, management resource planning systems, and many other systems that track items, people, and/or transactions. In some cases, a user "front end" manages the interface to a user with the database contents themselves being hidden from view. In other cases, a database query and viewing application such as SQL-Explorer, Toad, MS Query Analyzer, or DBAccess may be used to select and view a range of records in the database.

A particular view of a database may be called a table, a query window, or a query result.

For many applications and systems, it is convenient to track data through multiple databases rather than a single database. In other applications, it is useful to track data across multiple views, query windows, or tables of one or plural databases. In such applications, there is frequently a logical relationship, including one-to-one, one-to-many, or many-to-one, between records across the separate tables.

In the prior art, viewing the relationships between records across multiple tables generally involved using a custom user front end, or alternatively opening individual independent queries to select each table. For cases involving running individual queries, query parameters are frequently entered into each query manually. Thus, viewing a range of related records across multiple tables or queries was substantially static, i.e., each new set of conditions would require entering new query parameters into each of a plurality of query windows.

FIG. 1 illustrates a method for performing multiple database queries with a tool such as SQL-Explorer, Toad, or MS Query Analyzer for example, according to the prior art. In step 102, the query tool or database is opened. Next, according to step 104, a table is opened or a query created to select a range of records. A second table is then opened or new query created according to step 106 to view a range of related records. Step 106 is repeated as necessary, as indicated by decision box 108, to open additional sets of related records that are of interest. According to process 110, records are then navigated by manually changing queries for every table.

FIG. 2 illustrates an alternative prior art method for performing multiple database queries in separate work sessions using a tool such as DBAccess. A terminal session is opened according to step 202. The process then proceeds similarly to that illustrated by FIG. 1, with each separate, but simultaneously viewed query being launched in a new terminal emulation window.

FIG. 3 is a screen shot of a query being performed according to the process of FIG. 2. First and second respective terminal windows 302 and 304 each contain a range of field values, 308 and 312 respectively, associated with a query.

An index value 306 inv_id3=I033 entered into window 302 identifies the record of interest in the first query window 302. Similarly, the index value 310 id_id3=1033 identifies the record of interest in the second query window 304. If a second set of related records needs to be viewed, the user would manually enter similar new index values 306 and 310 in each window to change the contents of that query, as indicated by step 110 of FIG. 2. Thus, the two windows are not dynamically related, but rather static, requiring the user to manually change the queries.

OVERVIEW

According to an aspect of an illustrative embodiment of the invention, a database query viewer is a multi-purpose data access, viewing, and migration tool for users, managers, and developers of SQL and other databases from supported database providers.

According to another aspect, queries and views or tables of relational databases may be linked in a parameterized manner. The linkages may be viewed to show dynamic changes in a set of related query panes resulting from changes, additions, or subtractions made to one or more queries in the linked set. Linkages and pane parameters may be conveniently defined in a graphical user environment.

According to another aspect, database queries are displayed in panes or windows according to the preferences of the user, with the placement, size, and contents of each pane being configurable. Alternatively, individual panes may be minimized. A plurality of related database queries may be grouped into a set. According to another aspect, the database query viewer may be set to automatically "wrap" to display a table or query pane having columns that are too wide or too many to be displayed in a single pane at a chosen magnification. In an alternative mode, the contents of a pane may be automatically magnified (or shrunk) to fit within a given pane.

According to another aspect, a database query viewer allows users to quickly and easily create views of SQL and other data without application programming.

According to another aspect, a database query set, including its pane parameters and linkage definitions may be conveniently saved, for example, as an XML file, that may then be transmitted and/or later retrieved without needing to manually enter the parameters again.

According to another aspect, a database query viewer allows users to quickly and easily share views of data. Views of data may be shared with others who have the same database layout (schema) whether or not they use the same system.

According to another aspect, a saved database query set may be opened to form part of or a superset of a new database query set that may also be saved. According to another aspect, query views are linked to one another in a parent-dependent manner that may additionally be branched and/or chained. A change to a parent query may drive changes to one or more depending queries. In turn, changes to the one or more depending queries may drive changes to additional queries depending from them, etc. Single or multiple dependencies may be defined. In a single dependency, changes to a single parent query are cascaded down to successive generations of dependent queries. In the case of multiple dependencies, changes in one or both of two parallel queries may drive changes in one or more queries depending from both parallel parent queries.

According to another aspect, windows comprising various objects may be combined. In addition to database queries, script windows and plug-in windows may be combined.

According to another aspect, script windows may be defined to create temporary tables and/or perform other operations.

According to another aspect, plug-in panes may publish data such as providing for expression of binary large object (BLOB), text field (MEMO) or other types of extended data.

According to another aspect, a plug-in may be defined according to an API standard.

According to another aspect, a plug-in may process data to be used by dependant query panes or other plug-ins or objects.

According to another aspect, an application for parameterized linking, viewing, and transmission of databases may be called from another application to act as a plug-in having a defined data interface.

According to another aspect, object windows including database query windows, script windows, and plug-in windows may be linked to execute in a preferred order. Such a preferred order of execution may be user defined or may be determined automatically following logical heuristics.

According to another aspect, object windows may conditionally execute. Such conditional execution may include a set of rules for execution upon loading and may include the same or a different set of rules for execution arising from changes to a parent query or other parent object.

According to another aspect, object windows may be forced to execute by the user. This may take the form, for example, of a menu drop-down, a right click menu, or other interfaces known to the art.

According to another aspect, a window or set of windows may include selectable "ignore errors" logic. Such selection may include always, never, and logical determination.

According to another aspect, users of database applications are provided with a tool to view information in ways that are not available in their applications. Such views may be tested for usefulness prior to investing in custom or semicustom programming, or alternatively, may be used in place of the development of non-standard views.

According to another aspect, a tool is provided to quickly and conveniently provide troubleshooting, quality assurance, and customer support for database applications. Views of database sets may be easily communicated between interested parties to speed analysis.

According to another aspect, a viewer application is provided that allows viewing database sets created by the full version of the software. The viewer application has its ability to make changes to databases removed or disabled. According to another aspect, an application written according to an embodiment of the invention may be used to create multiple views of the same or different databases, and even different database types. The databases may exist on a single computer, a single server, may span networks and may span internetworks.

According to another aspect, an interactive, easy-to-use environment provides for creating multi-query joins as well as creation of complex, interrelated forms quickly.

According to another aspect, the construction of a database query set may be performed graphically.

According to another aspect, data can be transported between databases using XML data Packages. This may be used, for example, for a range of uses from simple table copies to complex table relationships. The XML data packages may move information between test databases, between applications, and between operating systems.

In another aspect, a tool is provided for prototyping or using data flow in one or across databases without writing software code. The data flow may be viewed live and interactively.

According to another aspect, log files may be used to monitor database query set activity.

Other aspects of the invention will become apparent in the appended brief description of the drawings, detailed description, figures, and claims.

BRIEF DESCRIPTION OF THE DRAWINGS

FIG. 1 is a flow chart illustrating a method for making static linkages between database tables or queries.

FIG. 2 is another flow chart illustrating an alternative method for making static linkages between database tables.

FIG. 8 is a screen shot showing a first open query pane in a database query viewer workspace corresponding to state 506 of FIG. 5.

FIG. 9 is a screen shot showing the first open query pane resized and a second parameterized query pane opened corresponding to state 510 of FIG. 5.

FIG. 10 is a screen shot showing entering Design Mode where tables may be selected and dynamic linkages therebetween defined.

FIG. 13 is a screen shot showing a first record selected in the first query pane and a related record automatically displayed in the second pane. The screen shot of FIG. 13 corresponds to state 534 of FIG. 5.

FIG. 15 is a screen shot showing the saving of a database query set as an XML file.

FIG. 27 is a screen shot showing multiple table information panes open in the database query viewer workspace.

FIG. 35 shows a database query set view in the query session. The panes and dynamic links are as defined by the process of FIG. 34. The "Tile Panes" button has been pressed to automatically size the panes for the workspace.

FIG. 38 illustrates a single joined table resulting from execution of the graphical commands of FIG. 37.

Also included is a drop-down view of the query command used to create the linkage between the two parent panes and the dependant pane.

Figure 43:
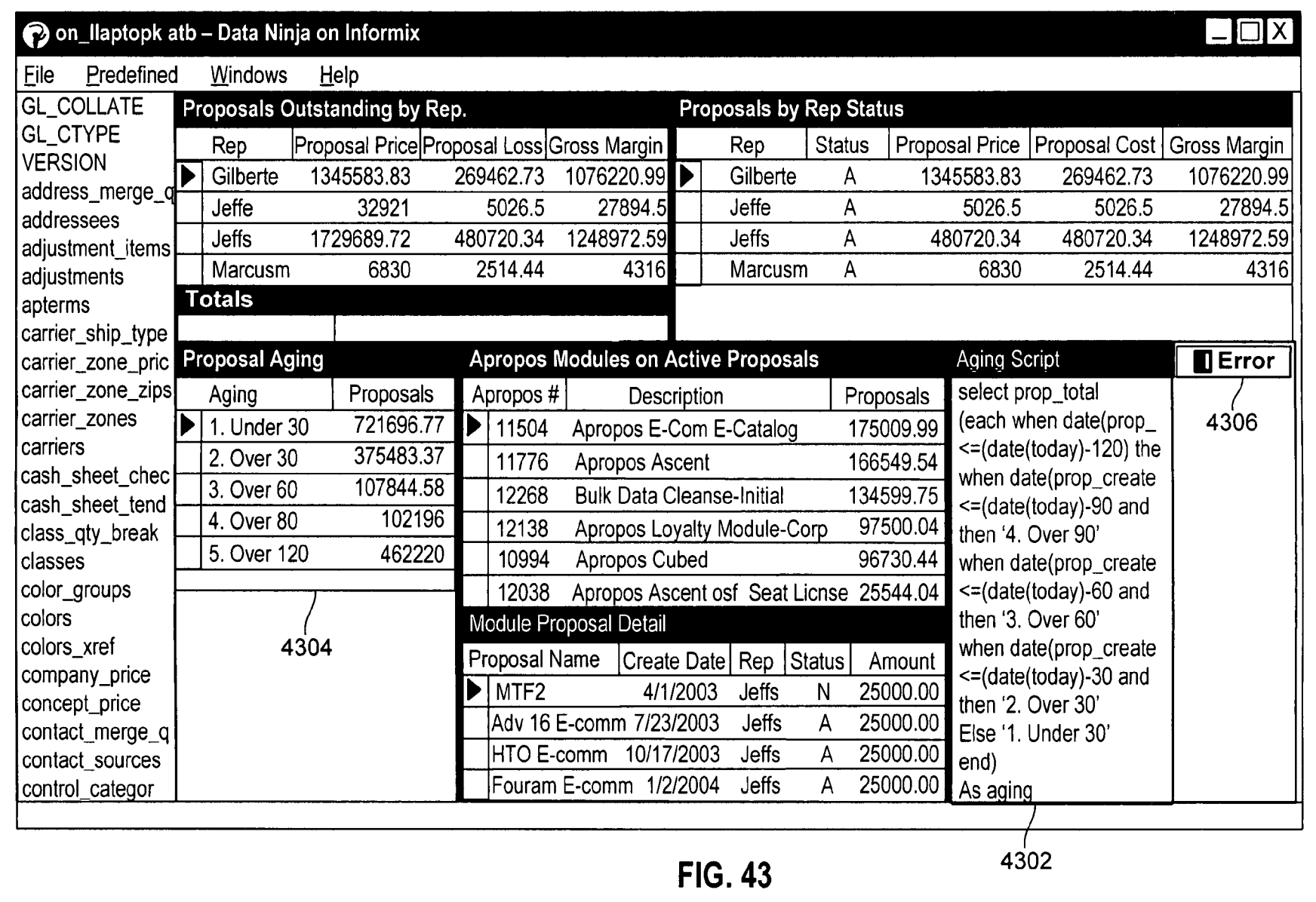

FIG. 43 illustrates a database query set that includes a script pane.

DETAILED DESCRIPTION

A numbering convention to facilitate easy understanding by the reader is used herein. Figures are numbered in conventional consecutive order. Specific features are generally indexed consecutively using three or four digit numbers in the order described. The first one or two digits correspond to the figure number in which the feature is first described. Features having similar functionality generally retain their originally assigned number throughout, even though their physical or logical appearance may vary considerably from figure to figure.

Figure 3:
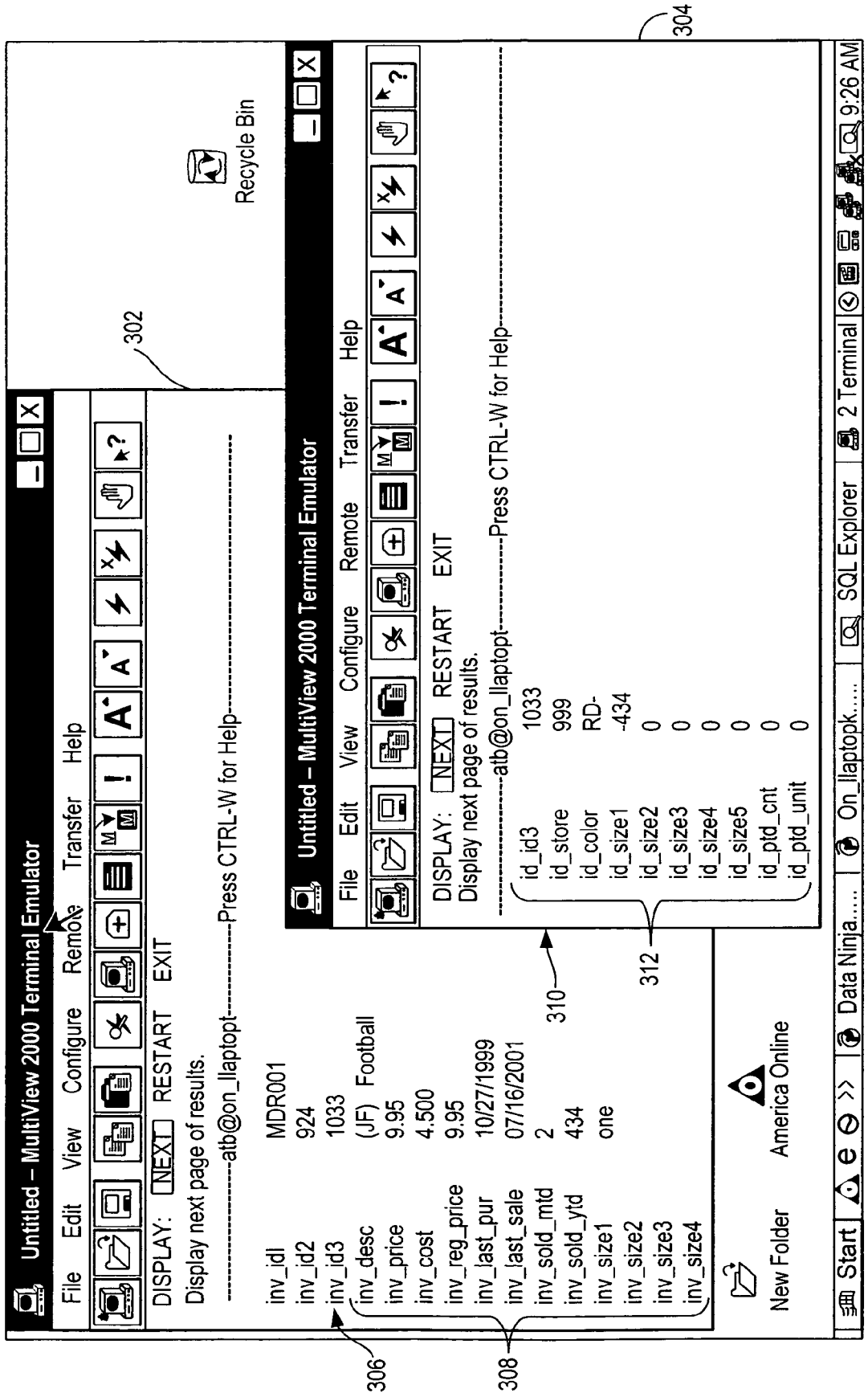
FIG. 3 is a screen shot showing two queries opened in terminal emulator windows.
Figure 4:
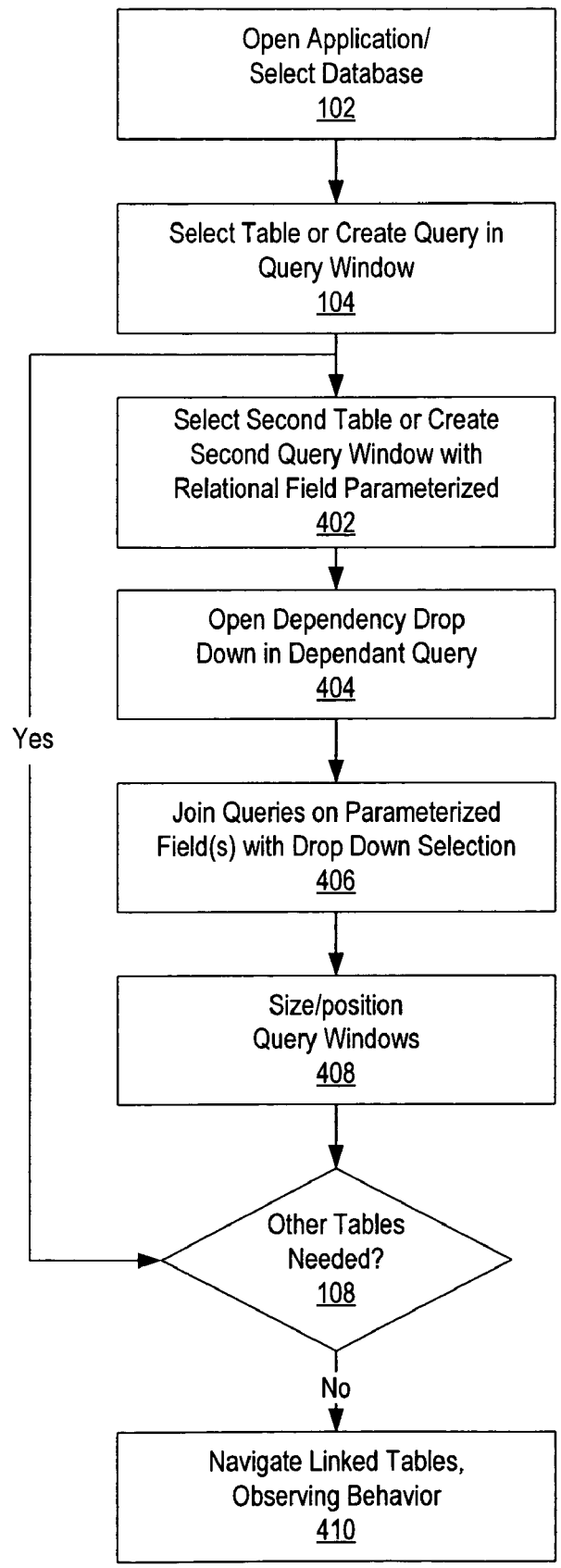
FIG. 4 is a flow chart illustrating a method for making and viewing dynamic linkages between databases.

FIG. 4 is a flow chart showing a method for making and viewing dynamic database linkages. According to step 102, the application is opened, and then, according to step 104, a database query is selected or a query is created in a query pane. Typically, the user would first select a parent query from which other queries and pane objects draw one or more dependencies, although queries may be selected or queries created in any order. For the example of FIG. 4, it is assumed that the parent query pane is first selected in step 104.

According to step 402, a second query is selected or a second query created. In step 404, a drop down dialog box is opened in the second (or other) dependent query. A relationship between the first (parent) query and the dependent query is defined according to a relationship between a variable field in the dependant query and an index field in the parent query. The index field acts as an indicator of the record that is selected. At least one relational field in the second query is parameterized, that is, set to a variable value that is determined by the value of an index field in the parent window. Parameterized fields are used to create dynamic linkages between the queries. In some instances, the parameterized field in the dependent query may be set to equal the value of an index field in the parent query. In other embodiments, the parameterized field value in the dependent query may be set equal to a function of the value of the index field in the parent query. In other embodiments, the parameterized field may be set equal to a range of values that are a function of the value of the index field. In still other embodiments, the parameterized field may be set equal to a function of two or more index fields in a parent query or, as will be seen below, a function of one or more index fields or indicators in two or more parent queries.

According to step 406, the link is executed and the queries are logically joined. Whereas the relational query statement creates a relationship between defined fields, the link made in step 406 includes an identity of from which (parent) query the index field is to be read. As used herein, the word "link" may be used as a convenient term to refer collectively to a relational query statement and the identity of queries to which the statement refers. In other words, it may refer generally to the dynamic relationship between two or more query panes, or between one or more query panes and other expressions of database data as will be described below.

As will become apparent, other methods may be used to specify the parameterized linkage between panes, including query panes and other types of panes. According to an exemplary embodiment, panes may be linked graphically, such as by dragging and dropping a link tool between panes. According to one exemplary embodiment, a link tool is selected from a toolbar; the left mouse button is depressed over an index or linking column in the parent query pane, the mouse is dragged to the linking column in the dependant query pane, and the button is released. A link indicator graphical element, for example including an arrow, between the linked windows may be thereupon inserted to indicate the linkage. In one embodiment, the link indicator is formed as an arrow extending from the index column in the parent query window to the linking column in the dependent window. According to another exemplary embodiment, the user may enter a separate graphical "query builder" mode to perform pane selection, specification, and linkage functions. According to another embodiment, linkages between panes may be selectively shown or hidden in a query session to respectively make the query set structure evident or hide the structure for streamlined viewing. An interactive embodiment allows the user to slide a pointer or tool over a hidden link to display it.

As indicated by step 408, the user may select the size and position of the panes. If other queries are needed, indicated by decision step 108, steps 402, 404, and 406 may be repeated as necessary. Step 408 may be performed at any time after a query is selected or created. Furthermore, it is possible to perform multiple instances of step 402 first, and then proceed with step 404 and step 406.

After decision step 108 is answered in the negative, the user exits design mode. As indicated by step 410, the query panes may then be navigated and the results observed. An outcome of the dynamic linking is that, as records are scrolled in a parent query pane or other parent object, the value of one or more index fields will change. As the value or values change in the index field(s), a new parameter value is set in the dependent query pane. An automatic update returns records in the dependent query whose parameterized field is equal to the new parameter value. In other words, changing the selected record in the parent pane changes the value of the index field. The variable field in a dependent pane is thus set to the new parameter value and data sets associated with that index value are displayed.

Parameterized relationships may be parallel, with several dependent queries being linked to a single parent query. Parameterized relationships may also be cascaded, with a dependent query being linked to another higher level dependent query, etc., culminating with a higher level dependent query linked to the parent query. Alternatively, a plurality of parent (or intermediate) queries may be linked to one dependent query. According to one embodiment, one parent query determines one record selection criterion and another parent query determines a second record selection criterion.

Figure 5:
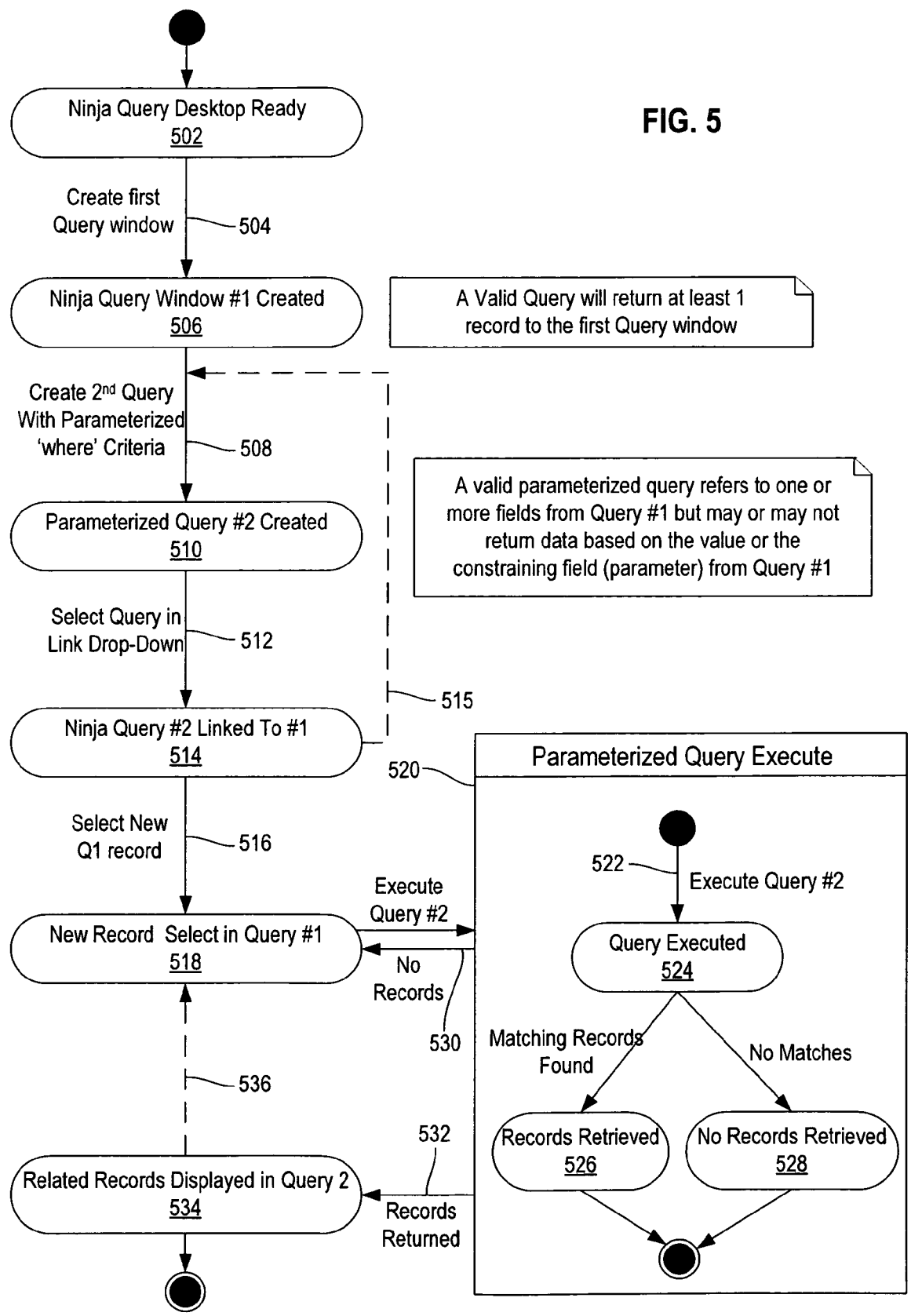
FIG. 5 is a state chart illustrating a computer program for executing the process shown in the flow chart of FIG. 4.

FIG. 5 shows several states and processes for a computer program, according to an exemplary embodiment of the invention. State 502 occurs when the application window is opened. The program receives a user selection or creation of a query in procedure 504, causing the program to enter state 506, wherein a first query pane is displayed in the database query viewer workspace. The program then receives a user selection or creation of another query in process 508 and the program enters state 510, wherein at least two query panes are displayed. According to one embodiment, step 508 corresponds to receiving two discrete inputs from the user; first, the selection or creation of a query, and second, the creation of a link with a parameterized "where" criterion.

In other embodiments, query panes may alternatively be opened or created with automatically parameterized or default "where" criteria. Where such parameterized queries are pre-existent, the second step of receiving a parameterized "where" criterion may be omitted.

After the second query is opened, the program receives a command to link to a parent (e.g. the first) query in action 512, and enters state 514. As shown by optional step 515, additional queries and parameterized relationships may be selected as may be desired by the user. As stated above, the relationships between panes may be "parallel" wherein a plurality of panes refer to a common parent query pane. Alternatively, a series of panes may depend upon one another in a "cascaded" manner, wherein a pane that is dependent to a parent pane acts as a parent to a lower level dependent pane, etc. Queries that act as parent to lower level queries and as a dependent to higher level queries may be referred to as intermediate queries. Such cascaded relationships may be accompanied by parallel or branching structures, with a plurality of dependent queries all possessing a dependency (i.e. a parameterized link) to the same intermediate query.

The program may receive a command from the user to save or export the pane and linkage parameters. As will be seen, such saved entities may preserve the entire query set, including size, placement, and contents of panes, as well as the parameterized linkages between panes.

According to some embodiments, the contents of the query panes may be representations of the underlying databases, thus allowing contents to be varied without changing the underlying data. Such views may be refreshed manually, or alternatively may be automatically refreshed when activities occur in the underlying databases. In other embodiments, the underlying databases can be driven to respond to changes made in query panes. As will be described below, one exemplary embodiment uses a "Commit" button or command to commit the changes to the underlying databases.

According to some embodiments, the application may be set to automatically "wrap" to display one or more query panes having columns that are too wide or too many to be displayed in a single pane at a chosen magnification. As will be described later, other types of panes may be used, but the term "query pane" may be used to also refer to those other types of panes where appropriate to avoid cumbersome language. For the example of wrapping, such a property may similarly be set in other types of panes. In an alternative mode, the contents of a pane may be automatically magnified (or shrunk) to fit within a given pane. Various workspace, pane, and column format options such as "wrapping" and "size to fit" may be accessed through various menus, buttons, and keyboard shortcuts.

After the desired tables (query panes) have been selected, positioned and sized, and the parameterized relationships therebetween defined, the program may receive a command to exit Design Mode. Additionally or alternatively, according to the particular embodiment, the cursor position in one or several windows may be scrolled.

Scrolling a cursor causes the application to enter state 518, wherein a new record is selected in a parent query pane. As noted elsewhere, owing to the range of allowable relationships, there may be several panes that act as intermediate (various generations of "parent") panes to one another. State 518 thus corresponds to substantially any of the intermediate panes being scrolled.

According to some embodiments, each query pane includes its own cursor, and scrolling the cursor in any intermediate or parent pane causes the subsequent operation to occur.

Upon entering state 518, the program automatically executes a parameterized query, represented by process 520 in FIG. 5. Alternatively, the parameterized query execution 520 may be delayed, for instance, to avoid consuming computer resources, or may be triggered by a user input. Parameterized query execution process 520 includes a recursive query 522, query executed state 524, conditional states 526 and 528 for cases where records are retrieved or not retrieved, respectively, and displaying resultant views. For cases where no records are retrieved, the process returns to state 518 via procedure 530. For cases where records are retrieved, they are displayed in state 534 via procedure 532.

As was noted above, several query panes may exist in a given query set. The relationships between the panes may be quite extensive with multiple dependent panes being related to one or more ultimate parent panes through several generations of cascaded intermediate panes. Thus, manually scrolling the cursor in a given pane, such as an ultimate parent pane, for example, may result in several dependent query panes executing a new query and displaying new records. The dependent panes thereby display one or more new records and each pane has a particular cursor position. This new cursor position may also act as an intermediate pane new record select state and thus force second generation dependent panes to also execute parameterized queries according to their relationships to the intermediate panes. Each dependent pane is scrolled to new records according to its linkage, query, format, and execution parameters. Similarly, the newly selected records in the dependent query panes may force the next lower generation of query panes to execute another parameterized query. Thus, procedure 520 is recursive in supporting changes in a plurality of query panes (and other type of panes or linked objects as will be generally described herein) as the result of changes to their parents.

The parameterized queries may result in returning multiple records in some or all of the linked query panes. According to one exemplary embodiment, the dependent cursor positions are automatically set to the top record returned. According to other embodiments, various rules may be used to select the particular cursor position in dependent panes. For example, the cursor may be set at the newest or oldest record, may be set at a record that returns the most or fewest records recursive records in dependent panes, may be set at a record that returns a response most closely matching a filter value in a field or fields, etc. Similarly, the row order may be sorted according to various automatic or user-selected criteria.

After displaying a set of query panes resulting from a particular cursor selection, the program may, according to optional step 536, receive a new cursor position in the ultimate parent pane, in one of the intermediate panes, or in a dependent pane. In such a case, the program then reenters parameterized query execution procedure 520 and repeats the sequence of recursive queries. While the above explanation has used the term "display" and related terms in a nominal sense, it is not necessary to display the query results. For example, one or more linked tables or panes may be minimized or otherwise not displayed. One use of this approach is to keep an uncluttered desktop while returning an ultimate set of dependent records that may result from the parameterized relationships between a plurality of generations of related panes. In other embodiments, the parameterized query execution may be used to drive a front-end application. In such cases, it may be useful to not display the query desktop at all, once its parameters have been determined. Thus, according to some embodiments, a program described herein may act as a database application design language.

Understanding some of the states and procedures illustrated in FIGS. 4 and 5 and elsewhere may be aided by a pseudo-code representation. Such a representation according to an exemplary embodiment follows:

```
Procedure DisplayNinjaData(ParentNinjaWindow)
{
    If ParentNinjaWindow is NONE then
        Clear CircularReferenceList;
    If ParentNinjaWindow is not NONE and ParentNinjaWindow =
    DropDownList
    selected value
        Set queries DataSource's parent to ParentWindow;
    Execute SQL Query;
    Loop through NinjaWindows on the screen.
    {
    If the NinjaWindow in the loop is a detail of the
    CurrentNinjaWindow and
        The CurrentNinjaWindow is not in the
        CircularReferenceList then
        {
    Add CurrentNinjaWindow to CircularReferenceList;
            DisplayNinjaWindow(CurrentNinjaWindow);
        }
    }
}
Event Dataset Cursor Scrolled;
{
    Clear CircularReferenceList;
    Loop through NinjaWindows on the screen.
    {
    If the NinjaWindow in the loop is a detail of the
    current NinjaWindow then
        DisplayNinjaWindow(SetName);
    }
}
Procedure Build Dataset List;
{
    Add NONE to the dropdown list;
    Loop through NinjaWindows on the screen
    {
        If the NinjaWindow is not current Ninja Set then
            Add NinjaWindow to the dropdown list;
    }
}
```

In the pseudo-code shown above, NinjaWindows includes individual panes containing queries and grids on the screen. DropDownList includes instances of available data source lists on NinjaWindows and indicate what the parent NinjaWindow (pane(s)) is (are).

"Procedure DisplayNinjaData(ParentNinjaWindow)" corresponds to the creation or selection of a parent or intermediate view state 506 in FIG. 5.

"If ParentNinjaWindow is NONE then

Clear CircularReferenceList;", and related lines relate to error checking having to do with avoiding circular references between the query panes.

"If ParentNinjaWindow is not NONE and ParentNinjaWindow=DropDownList selected value Set queries DataSource's parent to ParentWindow;" corresponds to the creation of a second (and additional) query panes, the setting of a parameterized relationship between a second pane and a first pane, and linking the panes, culminating in state 514 in FIG. 5.

The lines beginning with "Execute SQl Query;" and culminating with "DisplayNinjaWindow(CurrentNinjaWindow);" represent recursively looping through parent, intermediate, and dependent panes to update the records displayed in a dependent query pane. The conditional referring to circular references relates to error checking.

"Event Dataset Cursor Scrolled;" relates to state 518 of FIG. 5. In the event a new cursor position is selected, parameterizes query execution 520 is performed, resulting in new records displayed.

"Procedure Build Dataset List" updates the available data sources shown in drop down lists in the query panes.

Figure 6A:
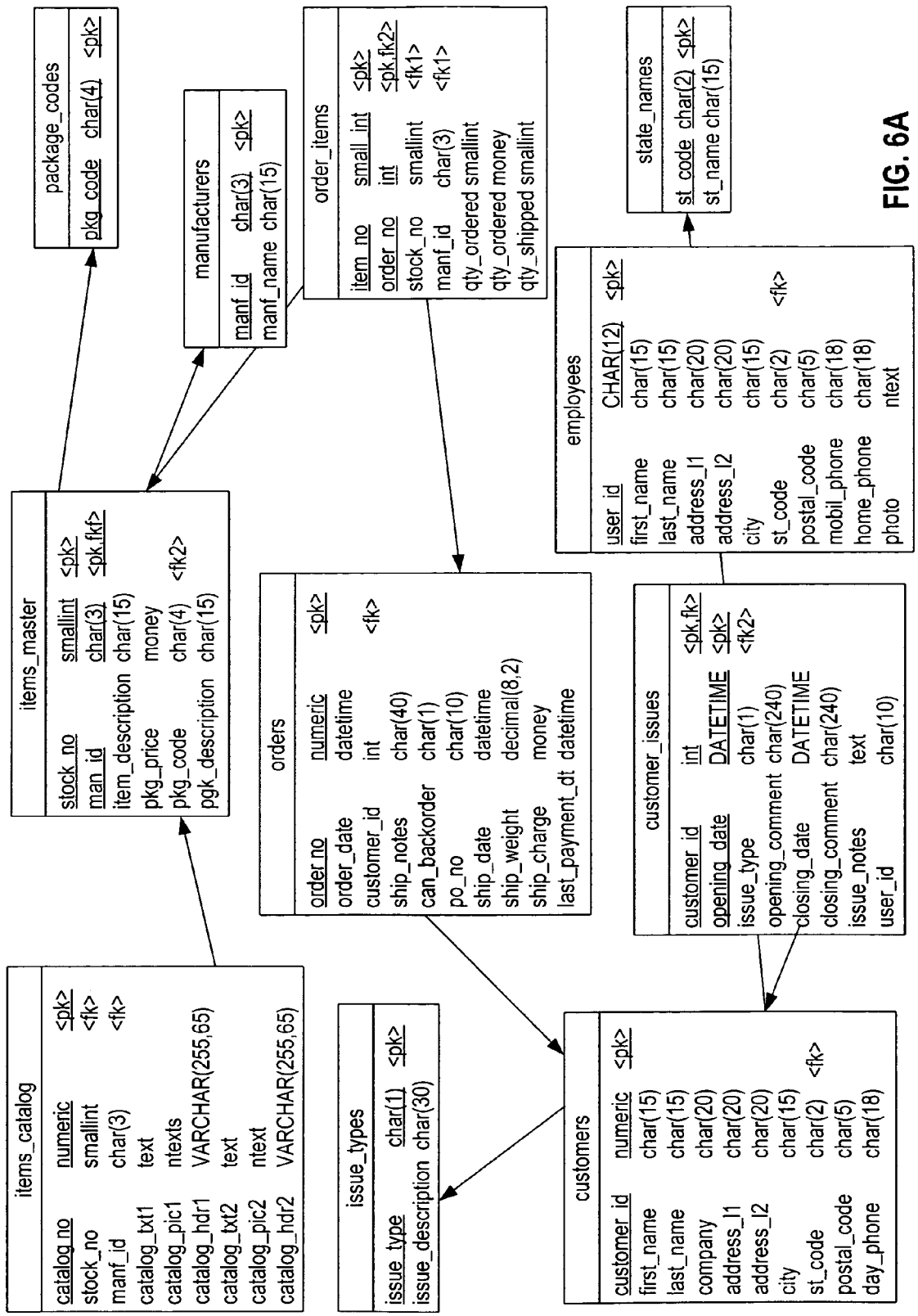
FIG. 6A illustrates a schema of a sample database called "Retail".

Having reviewed the structure of one or more program(s) used in various exemplary embodiments, it is now useful to turn our attention to a human interface aspect of an exemplary embodiment made according to the program structure and process illustrated above. FIG. 6A illustrates a schema of a sample database called "Retail". Several of the following examples of the human interface and related material, including FIGS. 6B-7C and FIGS. 27-42, will be based upon various tables and queries related to the Retail database of FIG. 6A. A software program made according to an exemplary embodiment of the present invention is distributed with a sample database represented by the schema of FIG. 6A.

Figure 6C:
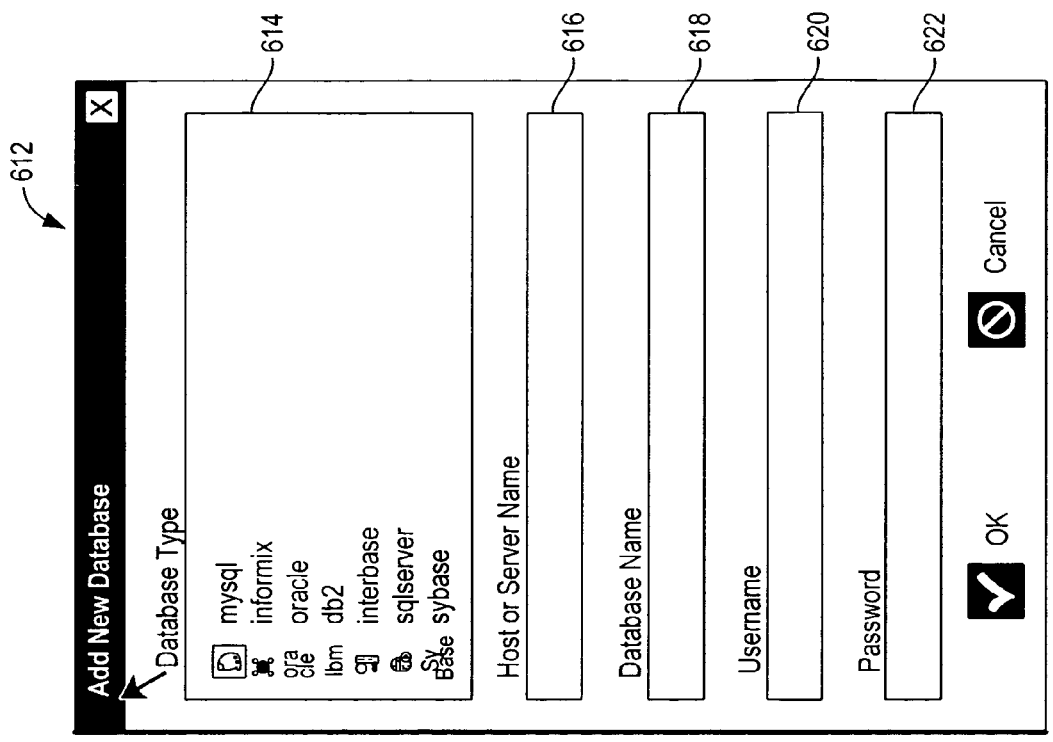
FIG. 6C is a screen shot of a dialog box for adding a new storage database.
Figure 6B:
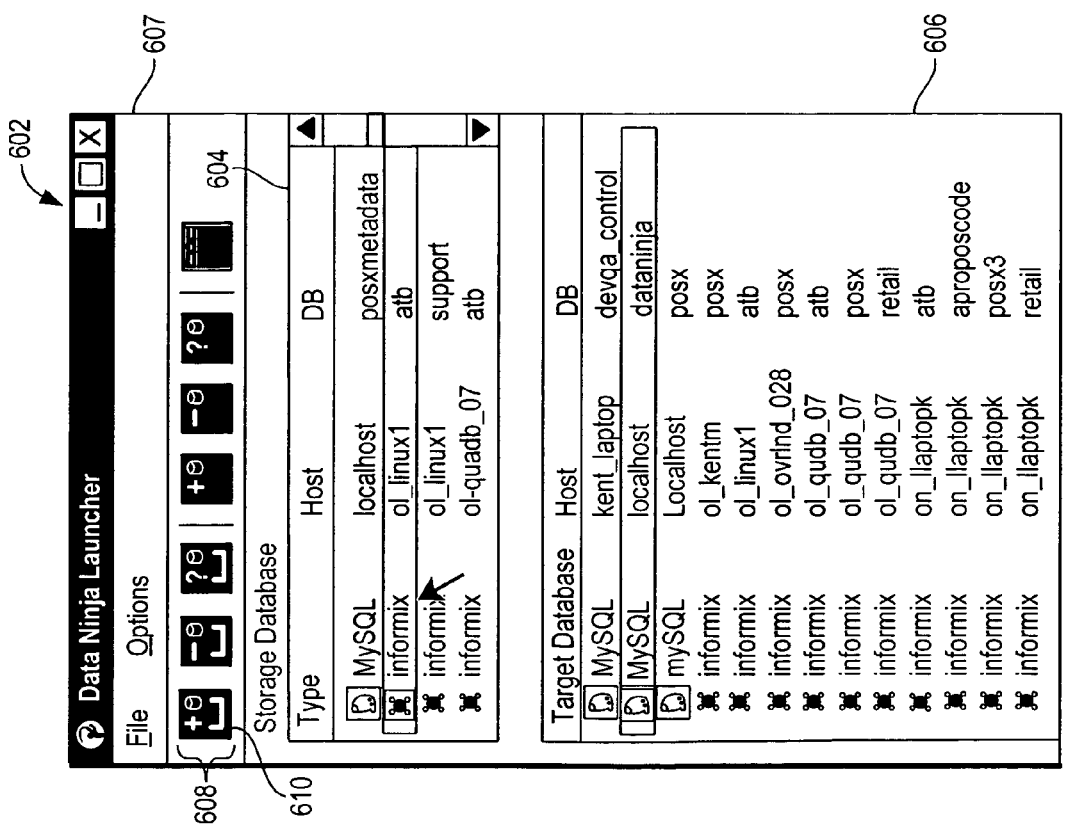
FIG. 6B is a screen shot of a database query viewer application launcher used to select a database.

FIG. 6B is a screen shot showing an application launcher 602 entitled "Data Ninja Launcher" that is used to select a database. The application launcher may be entered by double-clicking the database query viewer icon on a Windows or Macintosh desktop, for example. The application launcher keeps track of SQL and other databases that have been configured and to which the system has access. It allows a user to "launch" database query viewer sessions into one or more databases at the same time. The launcher is optionally "persistent" in that it will stay open and active on a database even after a session has been launched.

According to one embodiment, once a session(s) is (are) launched, there is no further connection or communication between the session and the Launcher.

According to one embodiment, the launcher manages connections only. It does not manage databases (DBs). Therefore, the menu selections that refer to "Creating" new DBs or "Deleting" DBs is referring to the connections to those databases from the user's desktop, not creating or deleting the underlying databases themselves.

The database query viewer application launcher 602 includes two database lists, a Storage Database list 604 and a Target Database list 606, as well as a button bar 608 and other familiar window features. The storage database list 604 and target database list 606 represent two types of database connections the application launcher manages.

According to an exemplary embodiment, the database query viewer uses database tables to store information about the query sets created by a user. In order to store these tables, the database query viewer itself uses a database connection. Storage databases (listed in the storage database list 604) can be a valid supported database and does not have to be the same as a target database.

In some applications, it may be desirable to have multiple storage databases. It may also be useful to have at least one shared storage database so that the users of a database can share database query sets.

A target database, listed in the target database list 606 contains the information that a user wishes to view. The database query viewer may have a large number of target databases. Two parameters characterize each target database: The type of database it is (Informix, DB2, Oracle, Sybase, etc.) and its name or server name.

According to one exemplary embodiment, at least one storage database and at least one target database are selected to enable a database query viewer session. To configure a new storage database, the "File . . . New Storage DB" menu selection or the command button new storage database command button 610 is pressed. After executing the menu command or clicking button 610, an Add New Database form 612 will appear on the screen as shown in FIG. 6C.

The Add New Database form 612 includes several fields to fill out: DATABASE TYPE 614: A drop-down is used to select a valid SQL or other database type from the database type list 614.

HOST OR SERVER NAME 616: This is the host or server name for the database "instance" on which the user will store database query viewer or specific database query set metadata. The database query viewer metadata does not have to be stored on the same database that the user wishes to query (the Target database). The storage DB could thus be set up locally, for example on the user's PC under MYSQL, or on a remote host or server.

DATABASE NAME 618: The name of the storage database holding the database query set metadata.

USERNAME 620: The login name that will give a user access to the server and database. This may be a user's network login, or a different name.

PASSWORD 622: The password for the username.

A Test Database Connection Button may be on the form to test the connection and make sure that the user has filled out the form correctly and has a working connection to the database. According to an exemplary embodiment, adding a new connection does not create the database itself. The Add New Database form 612 selects a database that is already in existence. Adding a new Storage Database will often result in putting one or more new tables in the database.

Configuring a new Target Database follows similar steps as creating a Storage Database. From the database query viewer launcher, a user selects "File . . . New Target Database" on the menu bar 607, or uses the "New Target Database" command button 624 on the button bar 608. The user is then presented with an Add New Target Database form, which is similar or identical to the Add New Database form 612. The form is filled out as previously described. According to an exemplary embodiment, creating a new Target Database Connection does not create any tables or modify the database.

According to an exemplary embodiment, once the database query viewer launcher 602 has been configured with a valid storage database connection and a valid target database connection, the user may launch a database query viewer session. One way to launch such a session is to double-click a target database in the target database list 606 that the user wishes to open with the database query Viewer.

Figure 7A:
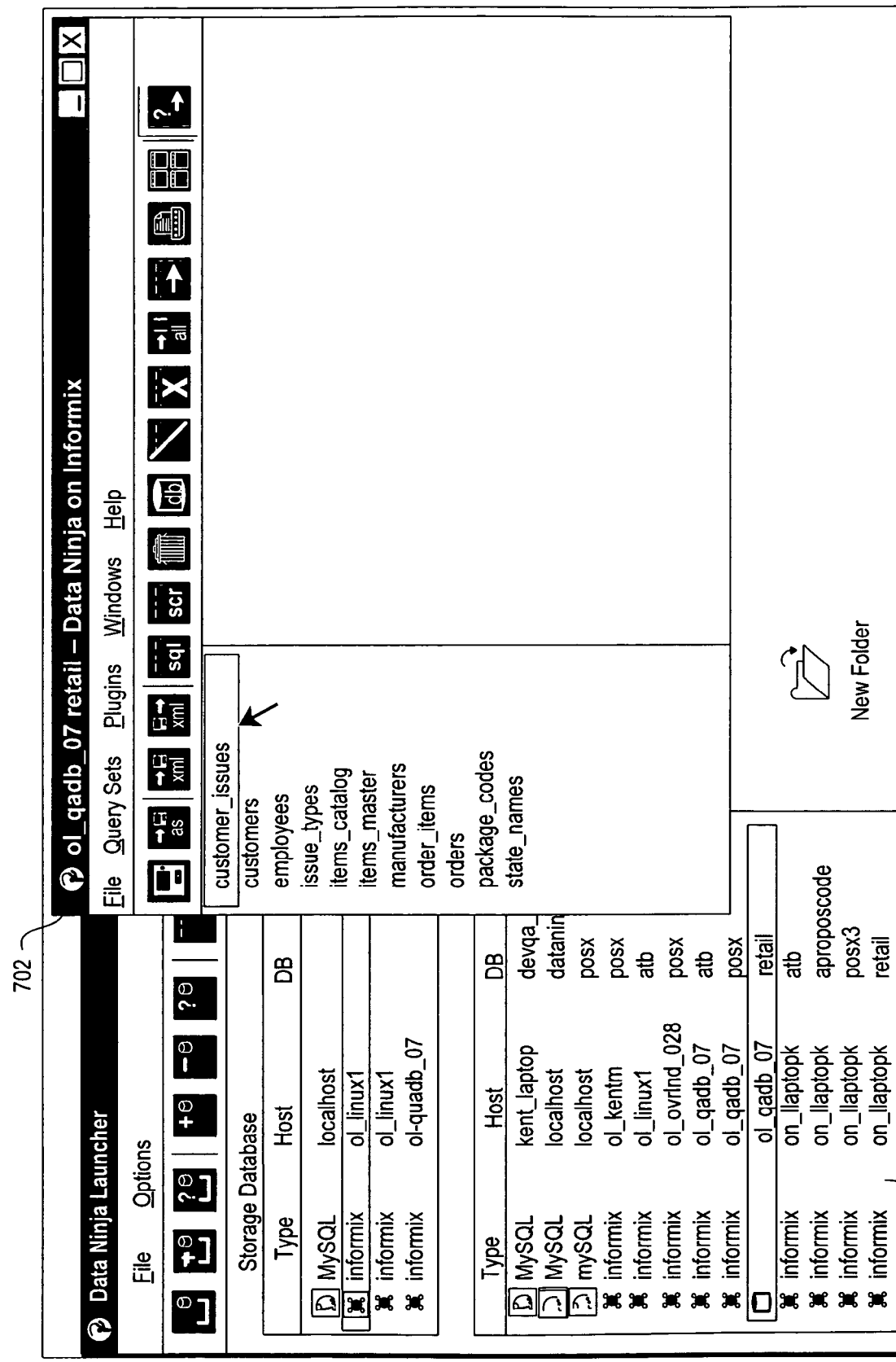
FIG. 7A is a screen shot showing an opened database query viewer workspace or desktop before a table has been selected.
Figure 7B:
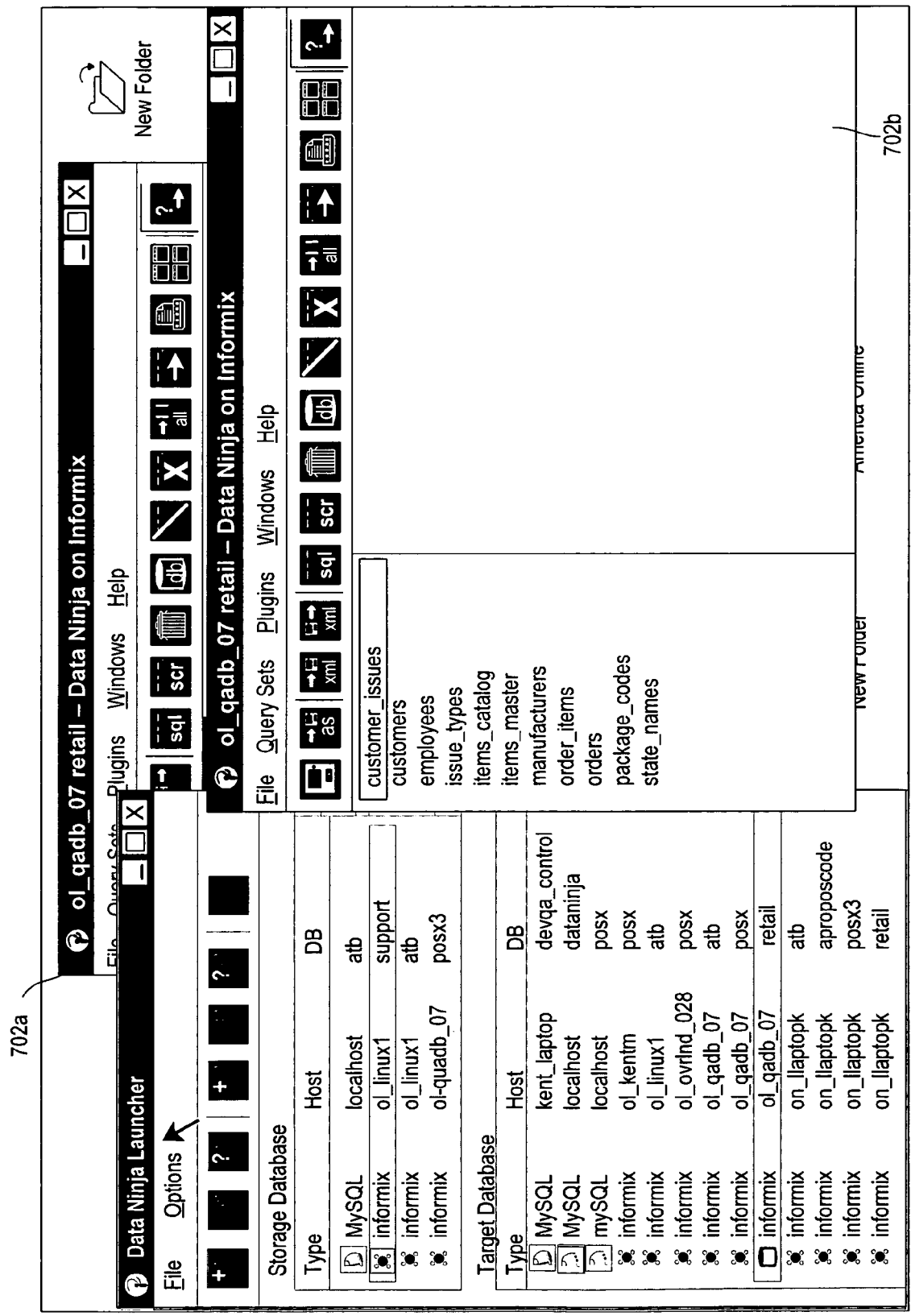
FIG. 7B is a screen shot showing two database query viewer sessions opened, each with its own desktop.

FIG. 7A shows the launcher window still open and active on the desktop even if covered by the session window or database query viewer desktop that has been created. According to an exemplary embodiment multiple database query viewer sessions may be opened simultaneously, as shown by separate sessions 702a and 702b in FIG. 7B. The sessions may be opened by a series of double clicks on one or more target databases in the application launcher window 602. The sessions may use the same target database or a different target database. The sessions may also use the same storage database or different storage databases. According to the exemplary embodiment, many concurrent sessions may be launched.

Against a single target database, multiple sessions may be used, for example, to see "before and after" views of data. Against plural target databases, multiple sessions may be used to transport data between databases. Like single sessions, having multiple sessions open need not affect the database query viewer launcher. It may remain open and active and allow further launches of database query viewer sessions, or be closed according to the user preference and/or configuration options.

Figure 7C:
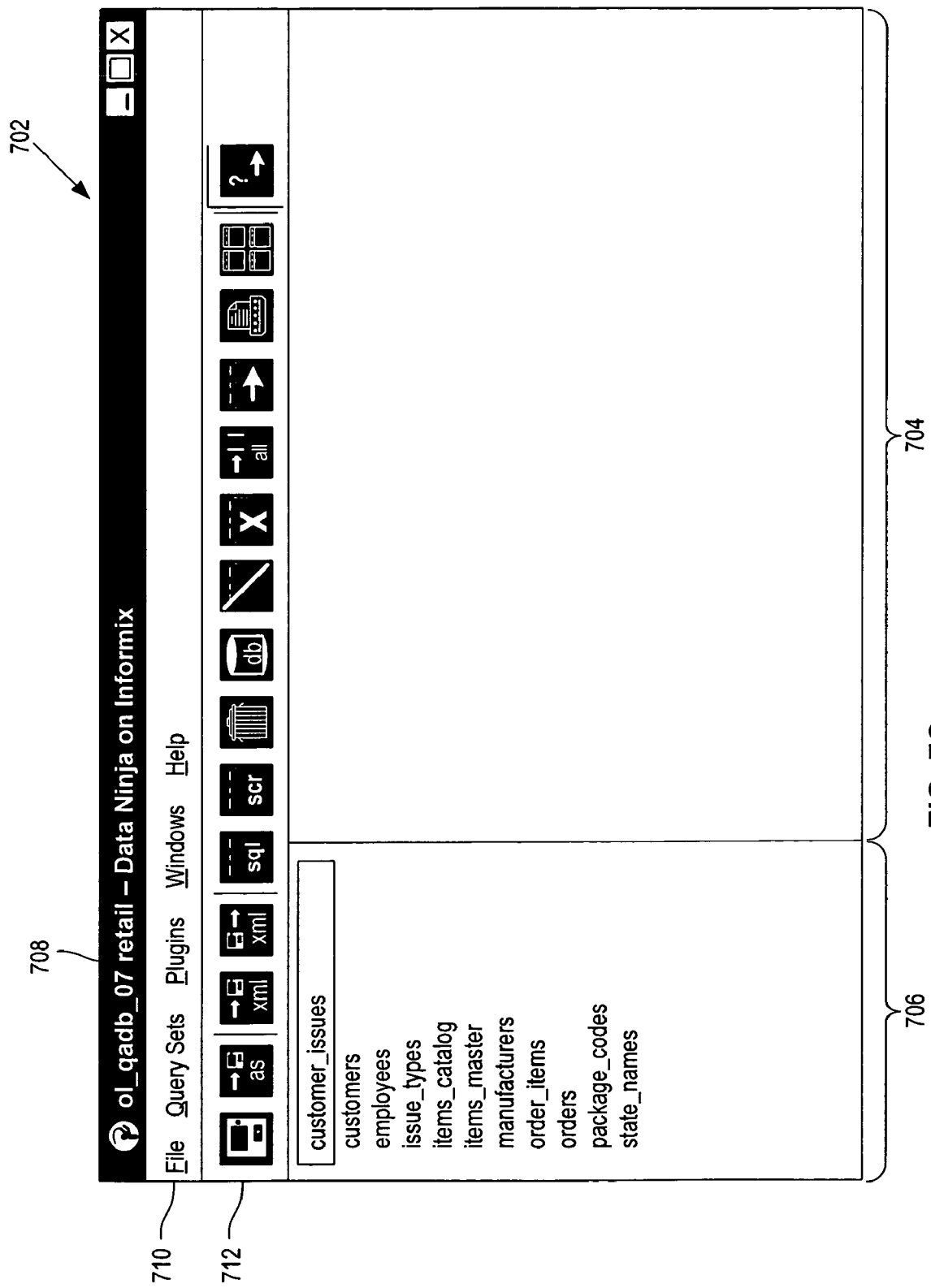
FIG. 7C is another screen shot of a maximized database query viewer desktop before a table has been selected.

FIG. 7C shows a database query viewer session open. Desktop 702 ready for specification of a first query pane. FIG. 7 corresponds to state 502 of FIG. 20.

A query session, as viewed by a database query session window (an instance of a database query viewer desktop window) 702, may be where the bulk of interaction with a database query viewer takes place. The database query viewer desktop or session window may represent a single, persistent data connection to the target database chosen when the session was launched.

Within a query session window, a user can define and execute new queries, or use pre-defined queries created by the user or other database query viewer users and saved to a shared storage database. Depending on the version of the database query viewer, a user can also execute SQL and other scripts, create XML exports of data or import XML data. A user can also create and save database query viewer sets, either to a storage database or to an XML format that can be emailed and shared with other database query viewer users.

Depending on the version of the database query viewer (for example, Full, Viewer, or Viewer Pro), the following elements are part of the database query viewer desktop window:

As shown in FIG. 7C, the desktop 702 includes a workspace 704 on the right and a database table list 706 on the left. For the example of FIG. 7A, the database tables listed in the database table list 706 correspond to the tables shown in the exemplary database schema of FIG. 6A.

The database table list 706 provides a convenient list of available, previously defined views from which a user may build a set of parametrically linked query panes. According to an exemplary embodiment, the list may include defined individual tables as well as previously defined database query sets that may be retrieved for view or to use as building blocks for building a new database query set.

Expanding on the explanation above, the database query viewer desktop 702 may include the following elements:

SESSION TITLE BAR 708—Identifies the server name, database name, and database type for the query session.

SESSION MENU 710—Provides access to the database query viewer commands through a typical drop-down menu system.

TOOL BAR 712—Provides access to key database query viewer commands through graphical tool buttons. Many or all of the tool bar commands are also available through session menus.

TABLE LISTING 706—A listing of tables that a session has access to within the target database. According to an exemplary embodiment, the table listing is not shown in a limited version.

SESSION WORKSPACE 704—An area for displaying database query and other types of panes such as script panes, user input panes, and other plug-in panes, for example.

MENU BAR 710 includes the command menus: File, Query Sets, Plugins, Windows, and Help. FIG. 7D shows commands from the file menu 714:

SAVE SQL SET—Allows a user to save a database query set into the storage database for later retrieval via the Query Sets menu.

SAVE SQL SET AS—Allows a set to be saved under a different name into the storage database.

SAVE AS XML SET—Allows the database query set to be saved to a text file with an XML format. Useful for exchange with other database query viewer users via Email or other methods.

LOAD XML SET—Loads an XML-formatted database query set that was saved with the previous option. In order to load such a set, the user should be using a database connection with the same database format as that which created the set.

NEW QUERY—Opens an empty database query onto the session desktop.

NEW SQL SCRIPT WINDOW—Opens a blank SQL script window on the session desktop. Alternative script languages may be used in addition to or in place of SQL script languages according to alternative embodiments.

DELETE QUERY—Deletes the currently open database query set from the storage database. If the query set is the last query set in a query set folder, the folder will also be "deleted".

STORAGE DB MANAGEMENT—Presents a form which allows a user to manage the contents of the storage database. Can help to clear out any unwanted database query sets, for example.

BUILD QUERY—Switches modes to the database query builder for user-friendly help in creating database query sets.

CLOSE ALL WINDOWS—Closes all query windows and any current database query sets in the desktop workspace. Does not delete storage databases.

COMMIT ALL QUERIES—For users of the full database query viewer version, commits any changes that have been made to any database tables through their respective database query viewer queries.

EXECUTE ALL QUERIES—Runs all the queries represented on the session desktop. The database query viewer is aware of dependences between the queries and will run them in the necessary sequence.

PRINT—Creates a printout of the query sets represented on the desktop.

CHANGE STORAGE DATABASE—Allows a user to change from the current storage database to a new one. This may be particularly useful for transferring saved queries from one storage DB to another, for example from a personal storage DB to a shared storage DB.

EXECUTE QUERY DURING LOAD—A global "switch" for a database query viewer session. Controls whether database query sets automatically execute as soon as they are loaded. This may be an especially useful feature, for example, if there are query sets that have saved parameters that may need to be changed before execution.

QUIT—Exits the database query session (current session only). Other query sessions and the launcher may still be running.

The "QUERY SETS" menu includes user-defined folders and saved database query sets. It may have many selections on it, or none at all. When database query sets are saved, they may be saved without folder specification, in which case they may automatically be placed in a folder called "Unnamed Sets". Hence, all database query Sets may be contained in a folder.

Figure 7E:
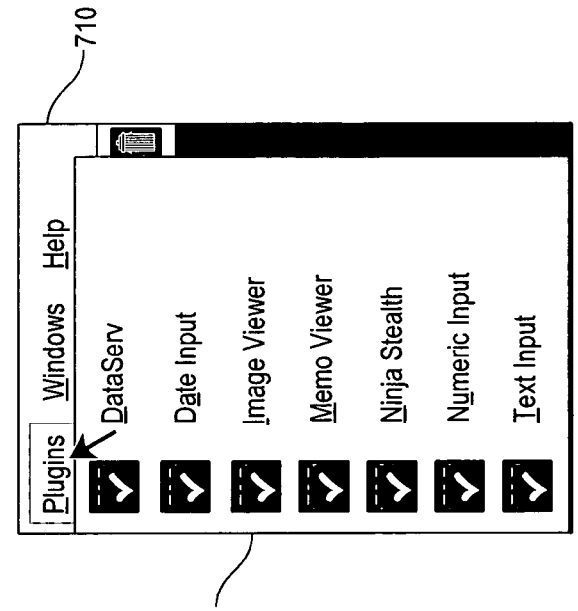
FIG. 7E illustrates a "Plug-ins" menu from the database query viewer desktop of FIG. 7C.

FIG. 7E shows "PLUGIN" menu commands 716. The PLUGINS menu is also a "variable" menu. The database query viewer ships with certain plug-ins. Users may also create plug-ins, receive more plug-ins from the supplier of the database query viewer, or receive them from one or more 3rd parties. Following is a list of plug-ins that may ship with the database query viewer and their functions:

DATE INPUT—Allows a user to input a date or select one from a calendar as input criteria for a database query set IMAGE VIEWER—Connects to an image field in another query pane to display an image within the query session.

MEMO VIEWER—Connects to a text or memo field in another query pane to display the text from that field within the database query session.

NUMERIC INPUT—Allows user input of numeric data for criteria-driven database query sets.

TEXT INPUT—Allows user input of text data for criteria-driven database query sets.

NINJA STEALTH—This is a "fun" plug-in that uses a slider to make your database query session disappear. It demonstrates the versatility of database query viewer plug-ins.

Figure 7F:
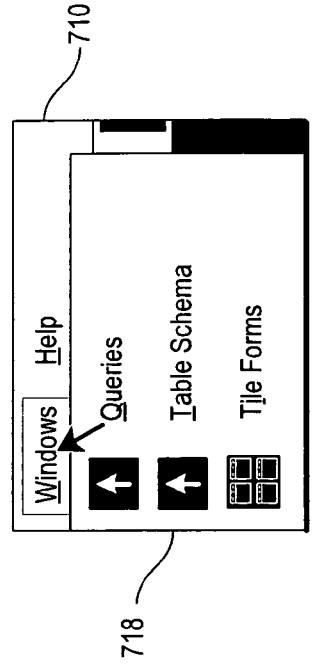
FIG. 7F illustrates a "Windows" menu from the database query viewer desktop of FIG. 7C.
Figure 7D:
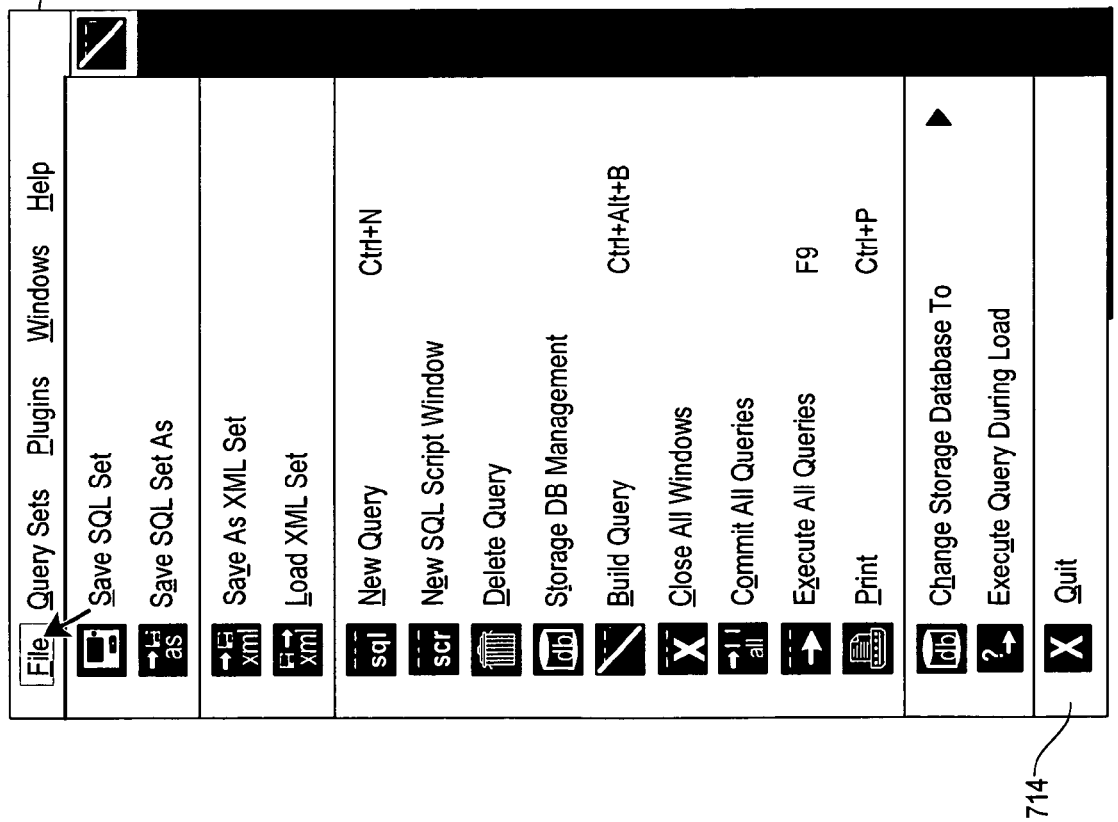
FIG. 7D illustrates a "File" menu from the database query viewer desktop of FIG. 7C.

FIG. 7F shows a "Windows" menu selection 718 menu bar 710 of FIG. 7C:

QUERIES—Brings the database query panes to the foreground of the session desktop if there are also table schema panes on the session desktop.

TABLE SCHEMA—Brings table schemas to the foreground on the session desktop if there are also database query panes being displayed on the desktop.

TILE WINDOWS—If there are multiple panes open on the session desktop, this selection automatically arranges them on the screen for easier viewing and manipulation.

The HELP Menu contains three selections:

HELP—pulls up documentation and the help index.

ABOUT THIS NINJA SET—Pulls up help specific to the database query set that is displaying.

ABOUT DATA NINJA—Displays the version information for a software embodiment made according to the present invention.

For the Full and Viewer versions of the database query viewer, the table listing 706 for the target database appears on the left-hand side of the database query viewer desktop. It lists available tables for use in creating a database query set.

The access that a user has to any given tables within the target database is not, according to one exemplary embodiment, determined by the database query viewer, but rather by the permission levels on the tables themselves that the user id and password allows. Hence, there may be tables in the database that a user cannot see or cannot access via a query window. There may be tables that a user can see but cannot change.

To see the structure of a given data table, CTRL-LEFT CLICK that table. A schema "pane" will open within the database query viewer desktop that contains useful information about the table. While the pane may open on top of database query panes in the desktop, it will not overwrite them.

The "Window" commands described above may be used to place the schema layer on top or below the query pane layer.

As previously mentioned, the query session workspace 704 is the area where query panes and other types of panes are placed. According to an exemplary embodiment, the session window will stretch or shrink the query pane sets proportionately as the user shrinks or grows the session window. The higher the screen resolution and the more of the screen area is taken up with the session window, the more data a user will be able to display. However, a database query set created at high resolution and in full screen mode cannot display the same data in low resolution and using only half the screen. Because the database query set will "shrink" the sets proportionately, a user should consider the screen size and resolution, and set the "open in full screen" mode appropriately for each database query set created.

FIGS. 8-14 are based on two database tables, one called inv and one called inv_detail that are linked as described. Table inv contains inventory information and table inv_detail contains location specific information the inventory. For this example both tables are of an ATB database type.

FIG. 8 is a screen shot showing a first open query pane 802 corresponding to table inv, shown as selection 804 in the database table list 706. FIG. 8 corresponds to state 506 of FIG. 5. The inv table represents an inventory list for a point-of-sale (POS) application. One way to create a query pane in the workspace of the query session is to double-click on of the tables in the tables list.

FIG. 9 is a screen shot showing the first open query pane 802 resized and a second parameterized query pane 902 opened. This corresponds to state 510 of FIG. 5. The inv_detail pane 902 represents a table of detailed information about the inventory items shown in the inv table pane 802. The inv pane 802 is open and has been resized and positioned. The second pane, inv_detail 902, is sized and positioned in a way to make viewing convenient. Sizing and positioning may be accomplished using intuitive graphical user environment procedures, for instance by dragging and dropping the pane border. The two panes will be linked so that as the user navigates through inv 802, the inv_detail pane 902 will change to show related records.

Figure 10:
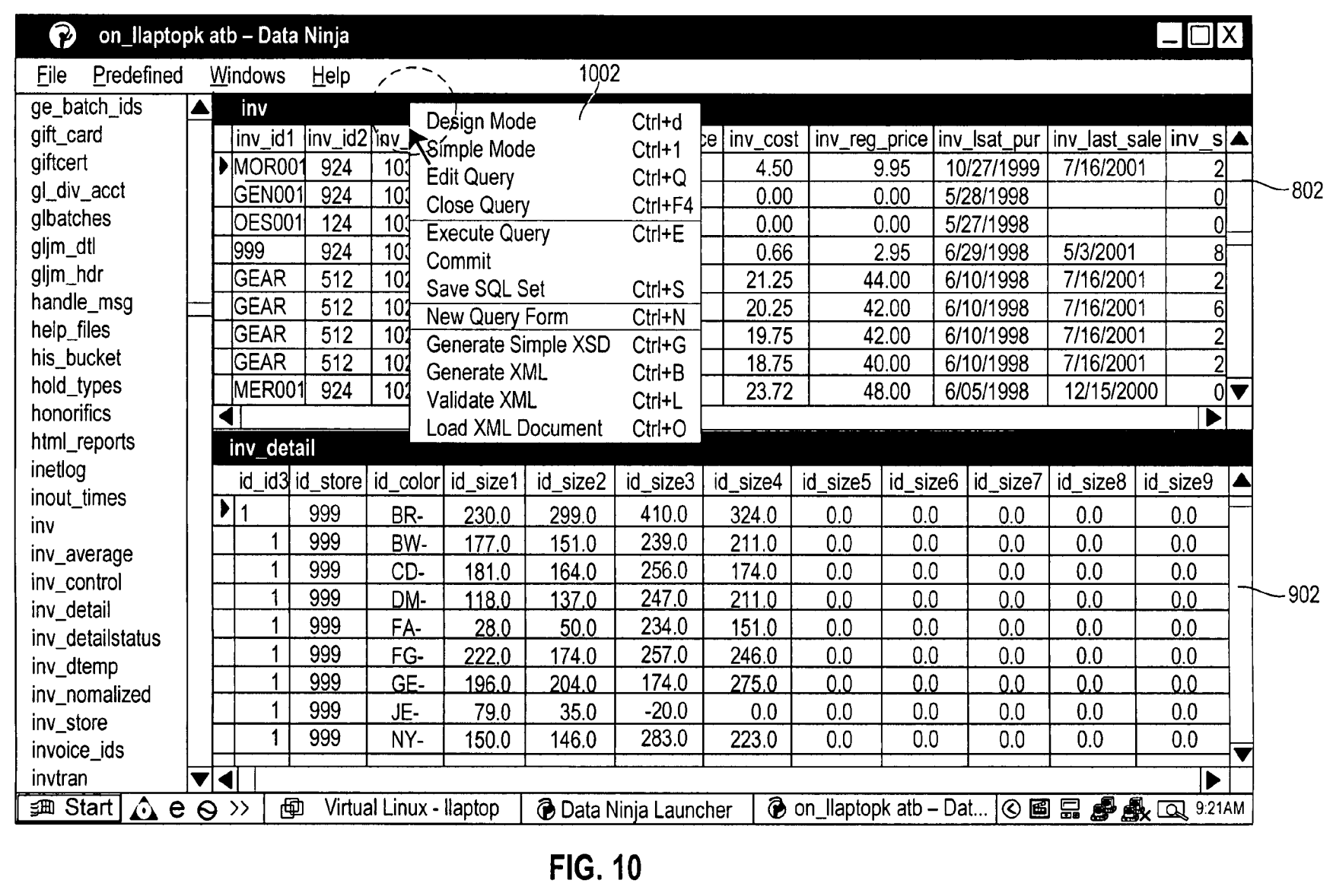

FIG. 10 shows a drop down menu 1002 that is used to select "Design Mode", a mode that allows linking of the tables.

Figure 11:
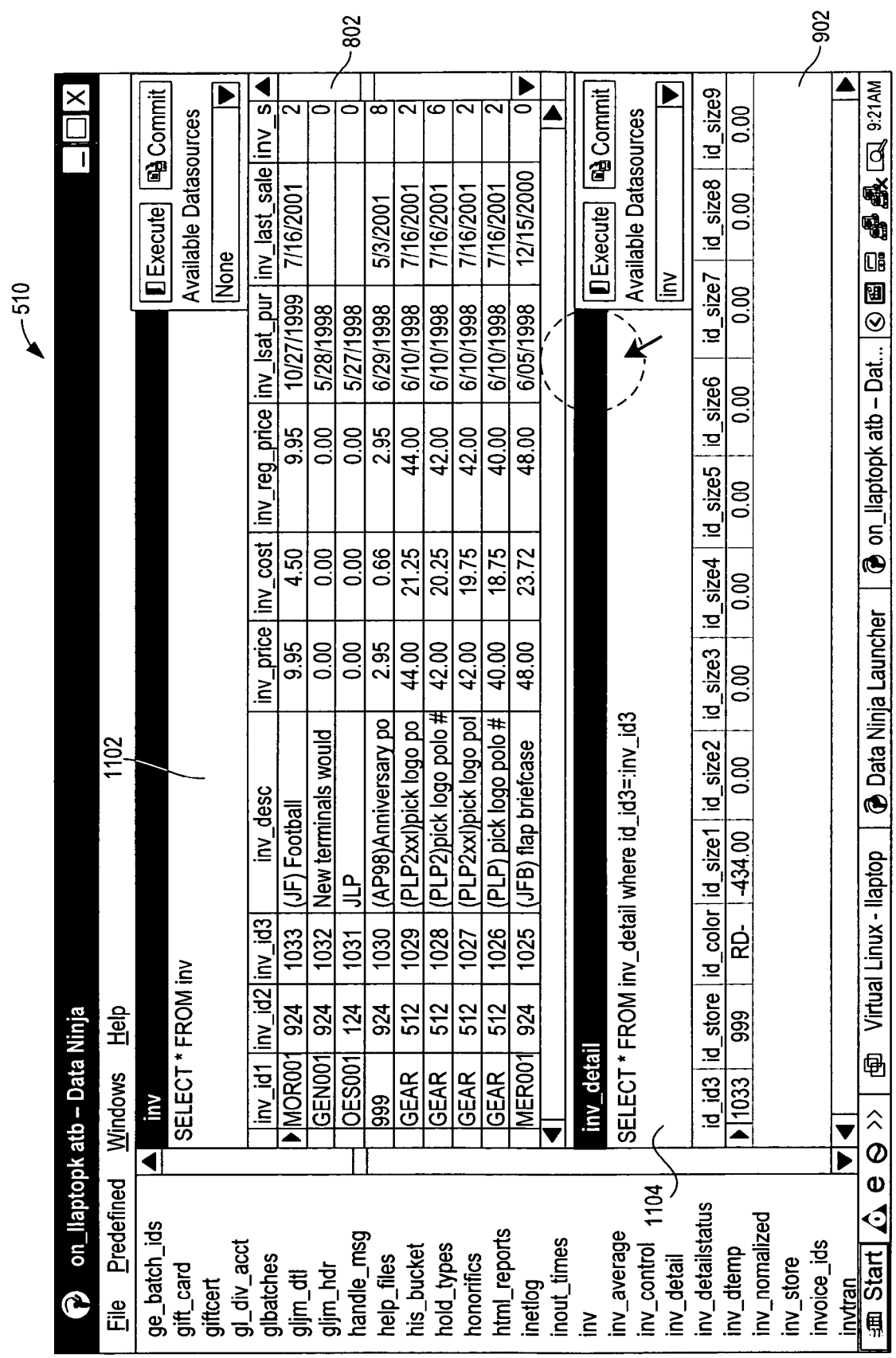
FIG. 11 is a screen shot showing the making of a dynamic linkage between the first and second query panes.

FIG. 11 shows the two panes in Design Mode, with the queries 1102 and 1104 for each respective pane 602 and 702 open. In this case, the inv_detail query 1104 is changed, the parameterized query being "where id_id3=:inv_id3." The colon (:) indicates to the program that the query is parameterized.

Figure 12:
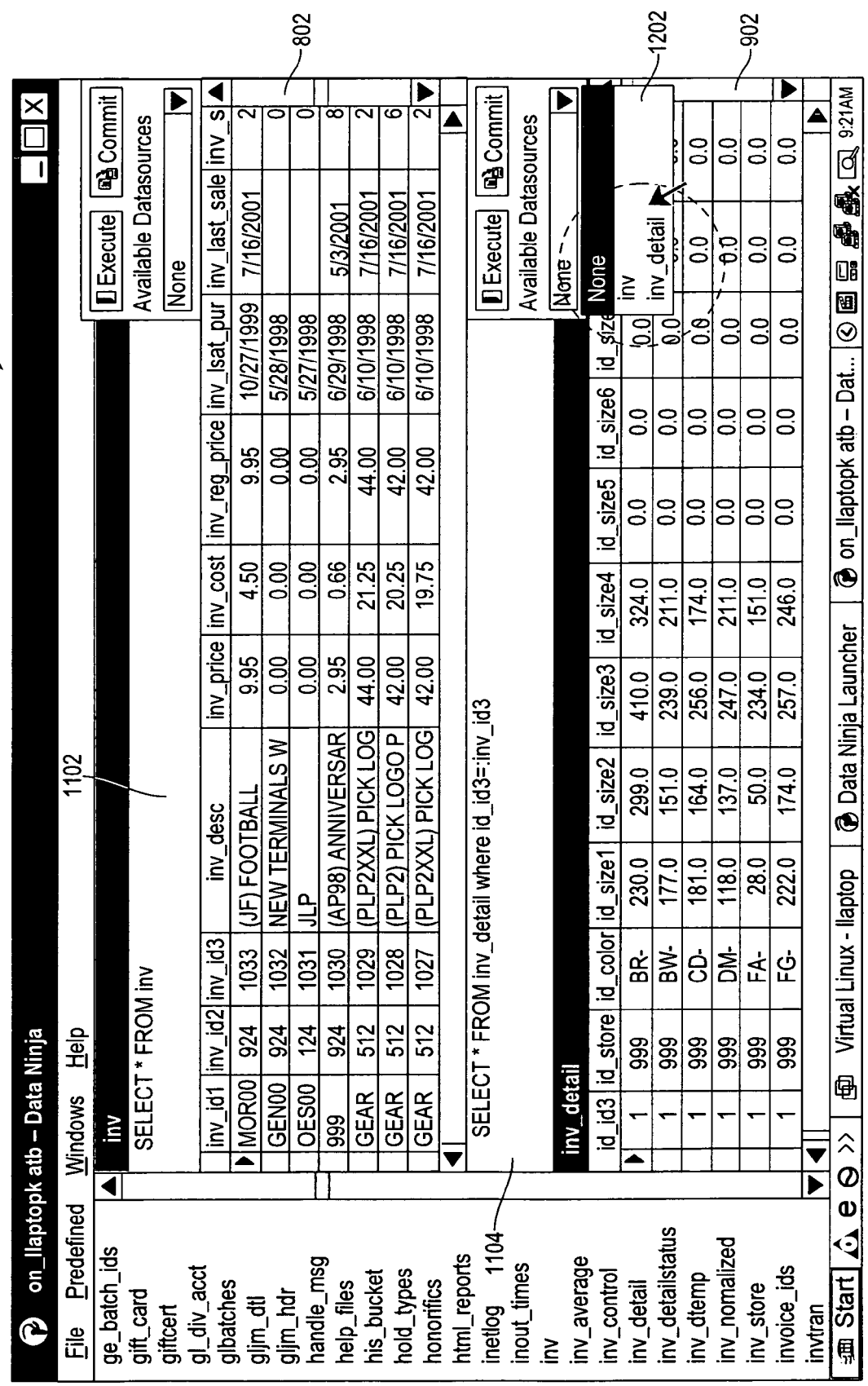
FIG. 12 is a screen shot showing leaving Design Mode and entering Simple Mode where linked query pane behavior may be observed.

FIG. 12 shows the drop-down dialog box 1202 used to link the dependent query pane inv_detail 902 to the parent query pane inv 802, the linking being such that any record in inv_detail pane 902 whose id_id3 field equals the inv_id3 field selected in inv pane 802 will be displayed. Thus the inv_id3 field serves as an index that links to the id_id3 field of the dependent query pane, thus linking the two views. The views are navigated by scrolling the cursor in the parent pane 802, which causes a parameterized query execution to occur, thus selecting new records in the dependent pane 902. The view of FIG. 12 corresponds to the procedure 512 of FIG. 5 where the dependent query pane is linked to the parent table.

Figure 13:
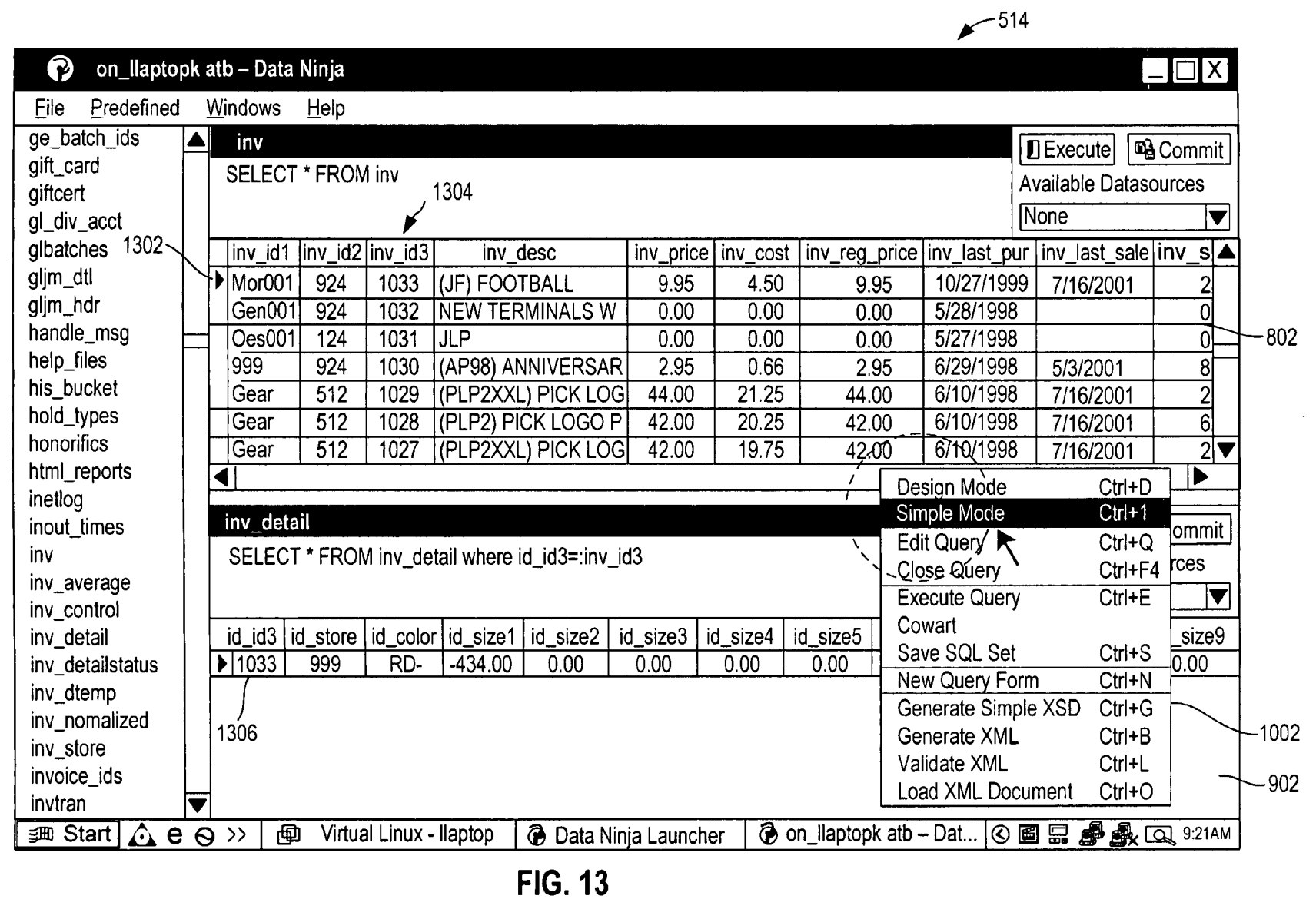

FIG. 13 shows drop down menu 1002 again displayed. This time, Simple Mode is selected. In Simple Mode, the queries and linkages are removed from view. The cursors may be scrolled and the behavior of the query panes observed. It may be noted that one record 1302 in parent table 802 is selected. The inv_id3 10 field 1304 in parent table 802 is "1033". The dynamic linking of the tables causes the dependent query pane 902 to scroll such that any records whose id_id3 field value is equal to the selected parent record inv_id3 field value are displayed. In this case record 1306 has an id_id3 field equal to the same value (1033) as the inv_id3 field in the selected record of the parent table. As will be explained below, various equivalency and non-equivalency relationships may be defined for a given link.

In some embodiments, the number of simultaneously selectable records in the parent pane may be limited to one. In other embodiments, a few or a large number of parent records may be selected. The number of records in the dependent query pane having a linking field value equal to the index field value in the parent table may vary from none to many. As will be illustrated later, an alternative exemplary embodiment allows the linking of a dependent query pane to two or more parent panes.

Figure 14:
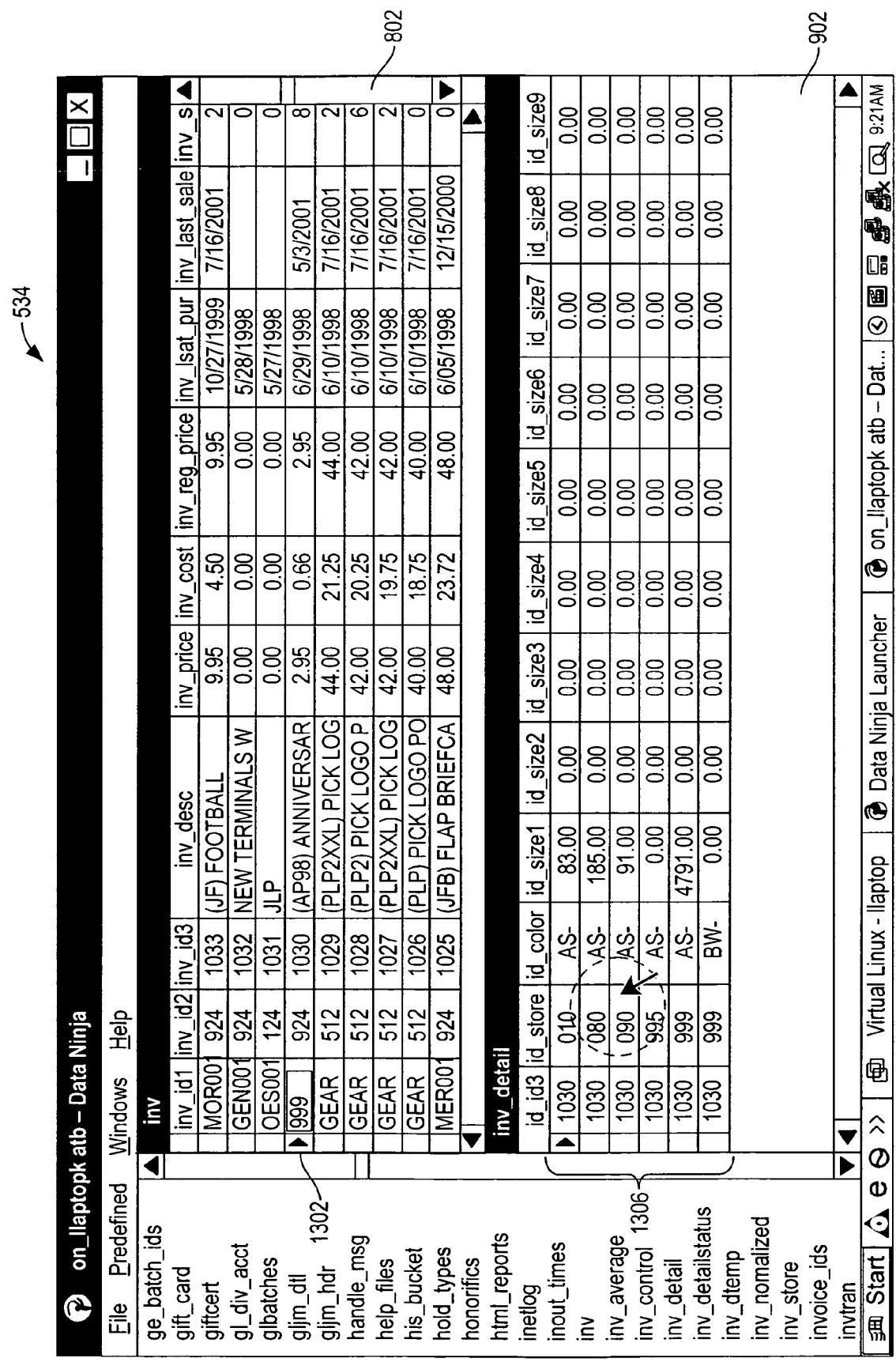
FIG. 14 is a screen shot showing a different record selected in the first query pane and a second set of related records automatically displayed in the second query pane.

FIG. 14 illustrates a view corresponding to state 534 of FIG. 5. The cursor in parent pane 802 has been scrolled to a different record 1302. This record 1302 has an inv_id3 value of 1030. In accordance with the Parameterized Query Execution step 520 of FIG. 5, records 1306 in the dependent pane 902 having an id_id3 field value of 1030 are displayed. For this example, six records 1306 meet the criterion and are displayed. In this case, the program logic sets the cursor in the dependent pane 902 on the top record of the group of displayed records 1306. As discussed above, alternative logic could select one or more different records.

Figure 15:
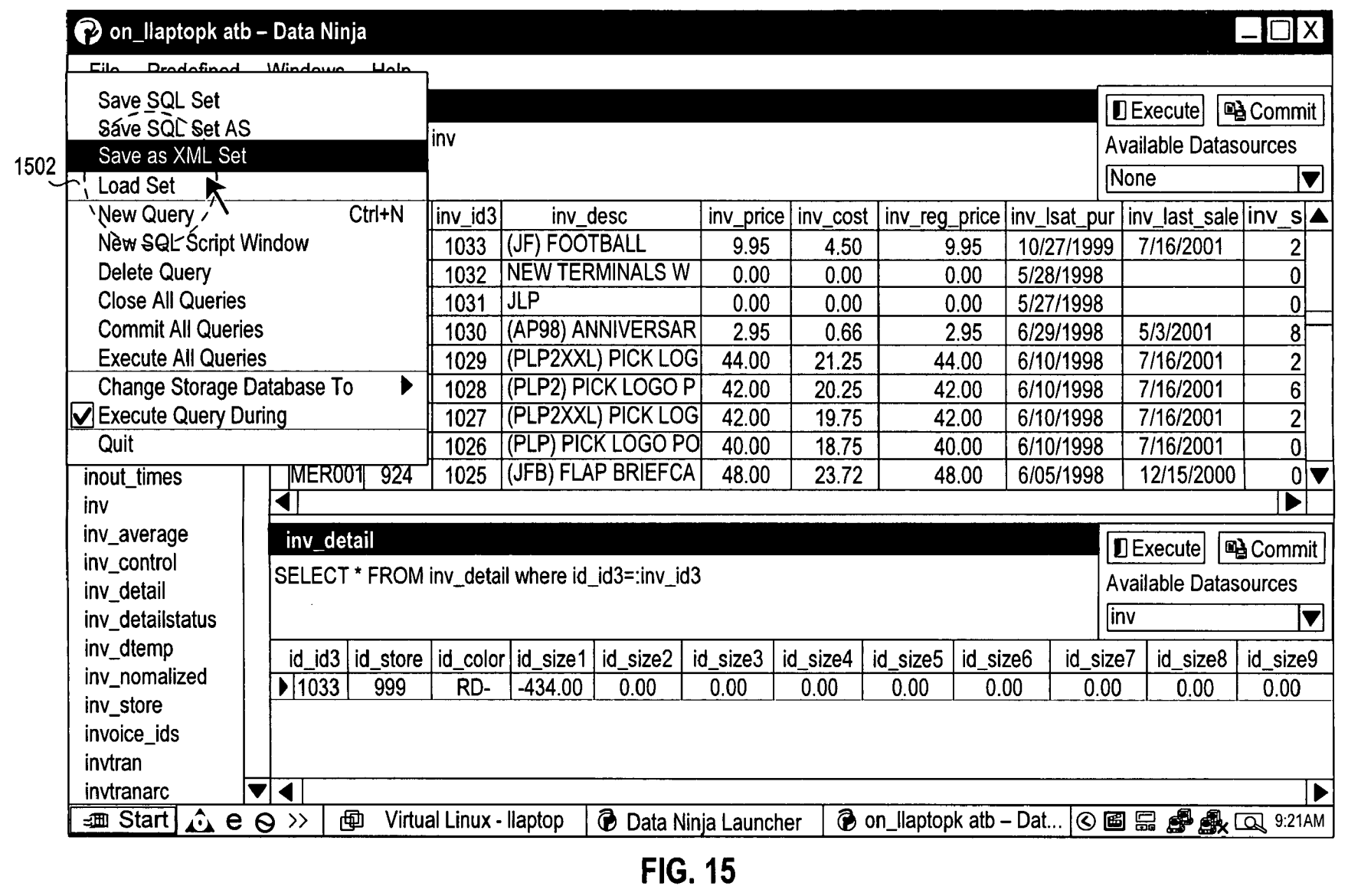
Figure 16:
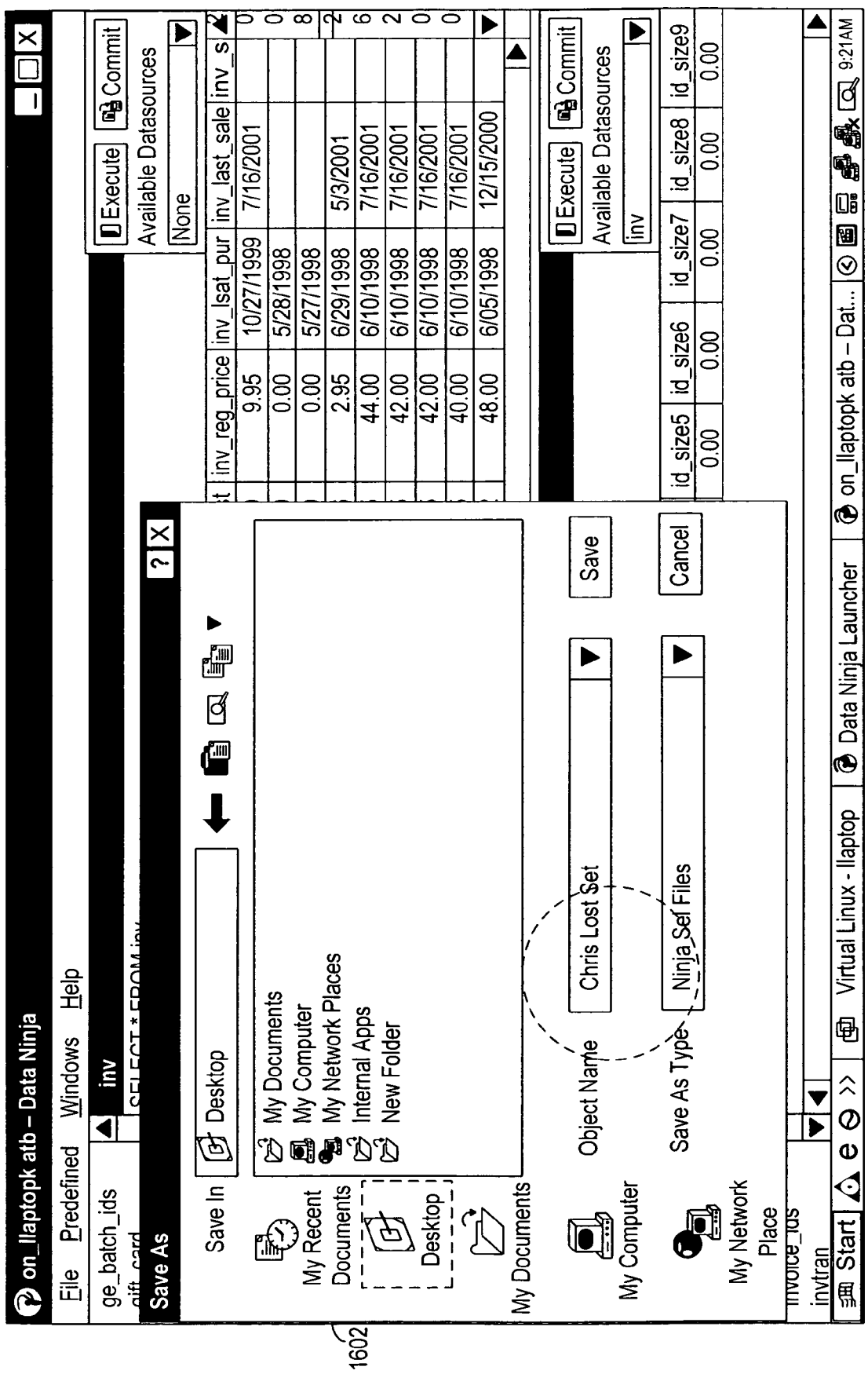
FIG. 16 is a screen shot showing the specification of a name and location for the saved XML file.
Figure 17:
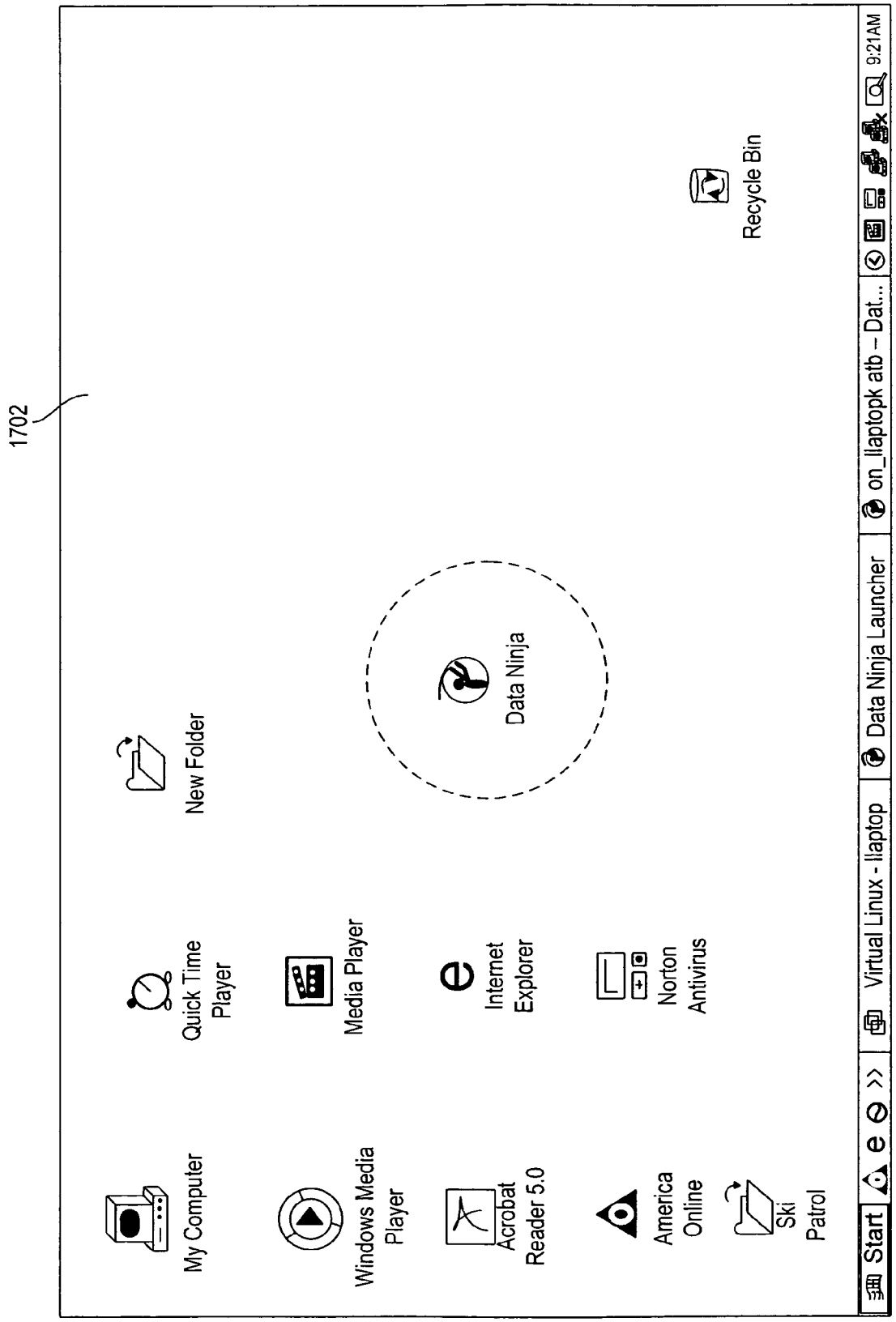
FIG. 17 is a screen shot showing an icon on the desktop representing the saved database query set.
Figure 18:
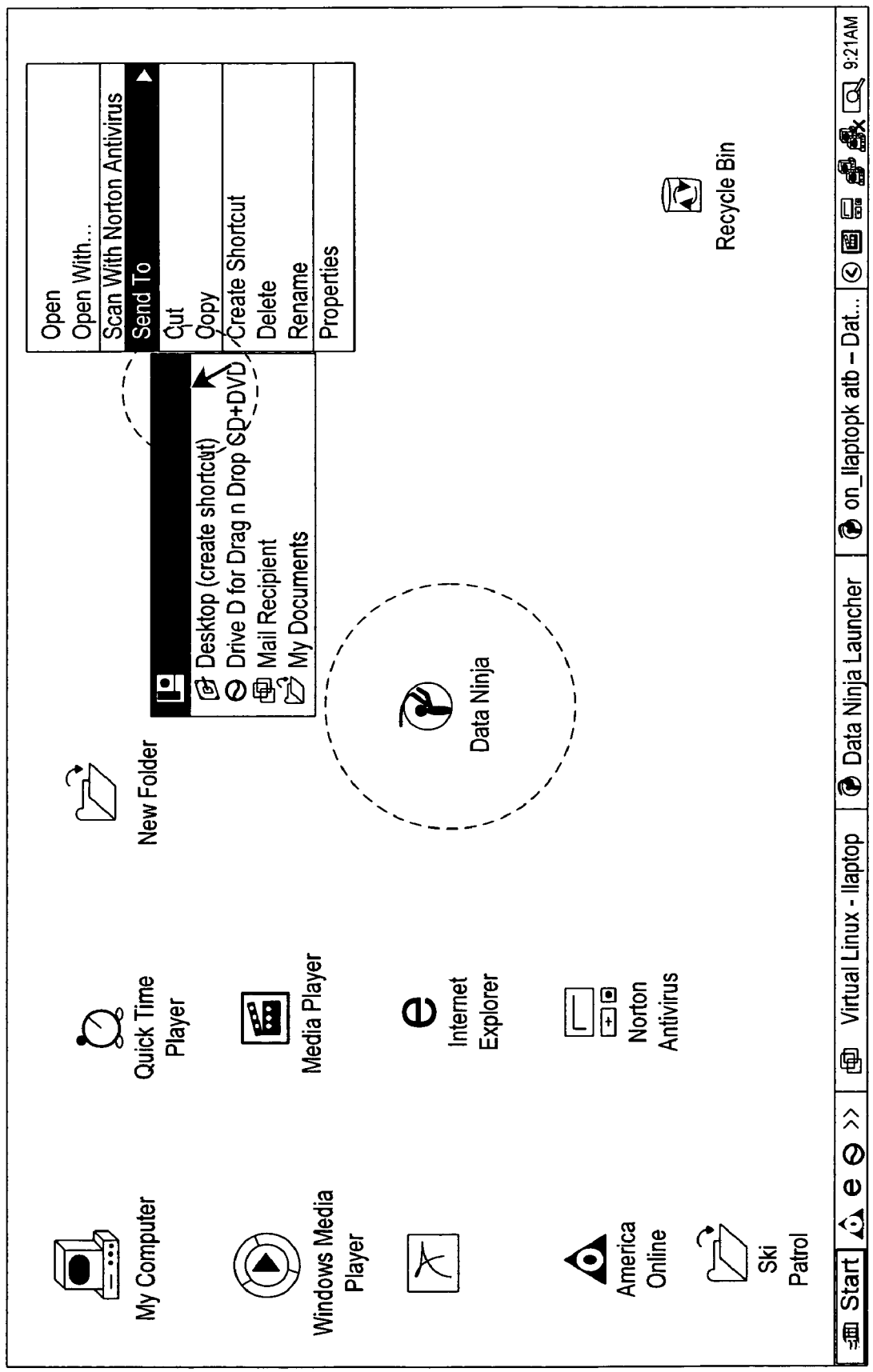
FIG. 18 is a screen shot showing the transmission of the saved database query set.
Figure 19:
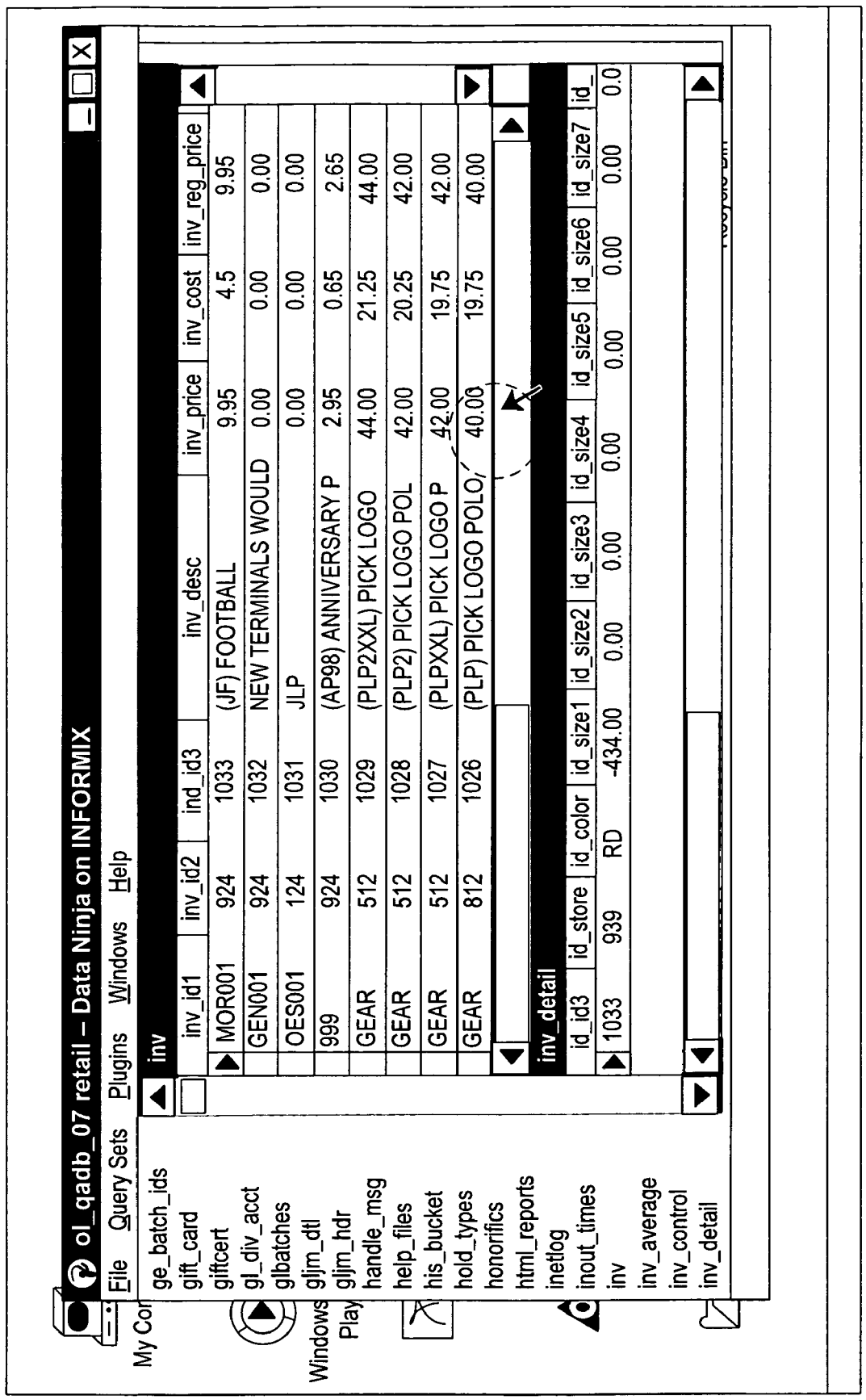
FIG. 19 is a screen shot showing the database query set of FIGS. 15 and 16 opened from the icon of FIGS. 17 and 18.

As described above, certain aspects relate to saving and/or transmitting database query set views. FIG. 15 illustrates the database query set being saved as an XML string. A dialog box 1502 offers several commands and export options. In FIG. 16, a dialog box 1602 opens to determine the location in which to save the database query set. In this case, it is shown being saved to a graphical operating system desktop. FIG. 17 shows the resultant saved file being represented by an icon 1702 on the graphical desktop. The database query set may then be transmitted, opened, cut, copied, etc, as illustrated in FIG. 18. As may be noted by the dialog box 1802, one option is to send the database query set via email. When the recipient receives the email, they may open the database query set using the full application or a variety of limited capability applications such as a viewer application, as illustrated by FIG. 19.

Figure 20:
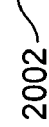
FIG. 20 is a screen shot of a point-of-sale transaction that uses a database.

FIGS. 20-23 illustrate using a program made according to an exemplary embodiment of the invention to navigate and view data flow arising from the use of a POS software package. FIG. 20 shows a transaction screen 2002 of the POS application. Two items, 2004*a* and 2004*b* have been "rung up" for sale.

Figure 21:
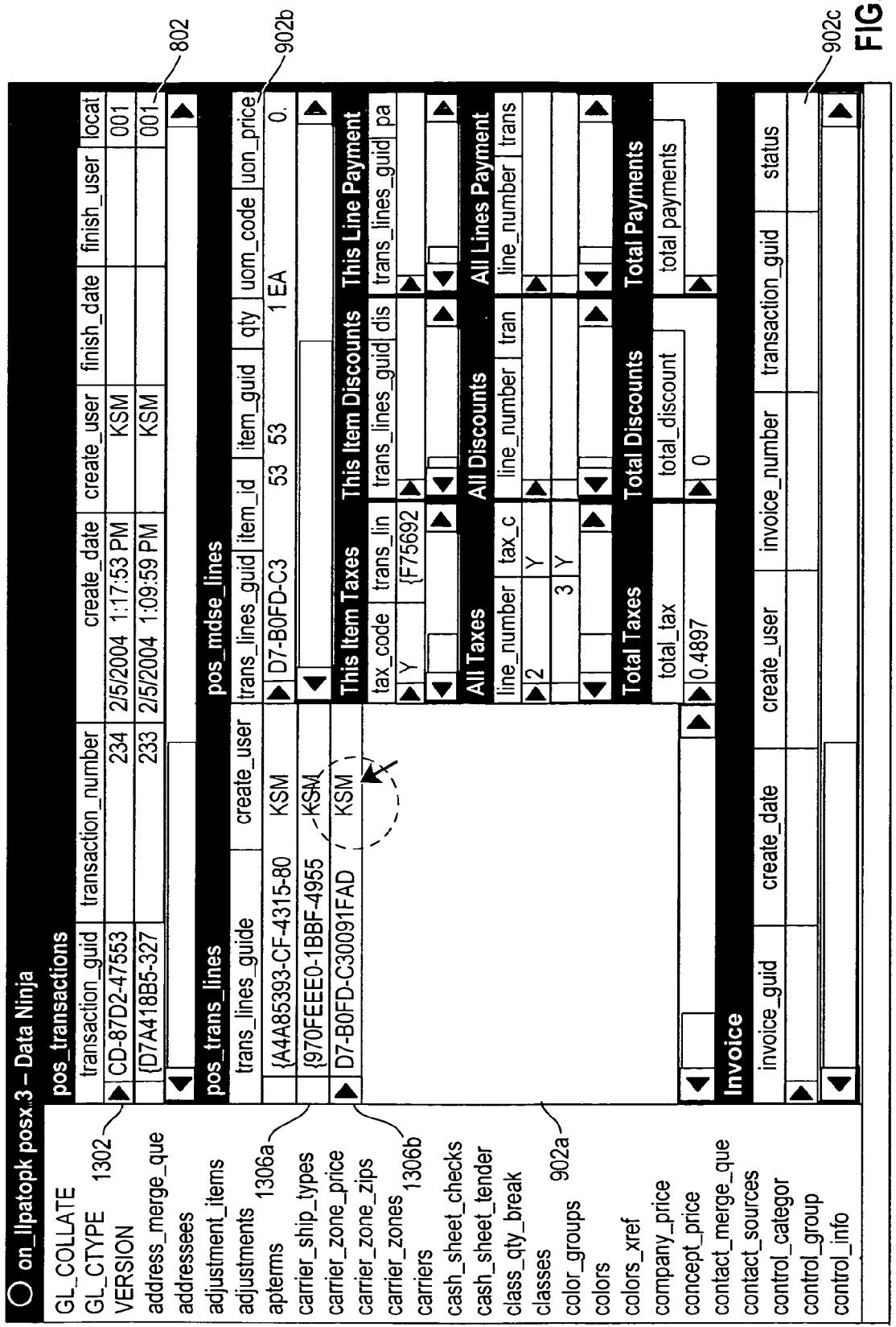
FIG. 21 is a screen shot of a database query set showing the flow of data through the database used by the application of FIG. 20.

FIG. 21 shows a database query set that displays the flow of data resulting from the transaction. A parent pane 802 pos_transactions shows all transactions for the current date. In this case, the top record 1302 corresponding to the transaction of FIG. 20 is selected. A dependent query pane 902*a* "pos_trans_lines" is dynamically linked to the parent table 802 by setting a dependent pane field (not shown) equal to the parent table field transaction_guid. Accordingly, items associated with the current transaction are shown in dependent pane 902*a*. The top record corresponds to a token. The second two records, 1306*a* and 1306*b*, respectively, correspond to the two items 2004*a* and 2004*b* sold in the POS transaction. As may be seen, the cursor in the dependent pane 902*a* is scrolled to the third line 1306*b*. Dependent pane 902*b* is dynamically linked in a cascaded manner to pane 902*a* "pos_mdse_lines". Pane 902*a* thus acts as an intermediate pane, being dependent to parent table 802 and parent to dependent pane 902*b*. Pane 902*b* displays details about the merchandise item selected in query pane 902*a*. As may be seen, the qty field is 1 and the uom-price field is 0.00. These values are reflected in the "Qty:" and "Subtotal:" values displayed for the second item in the screen shot of FIG. 20. The Invoice field 902*c* in FIG. 21 shows no records.

Figure 22:
FIG. 22 is a screen shot of the point-of-sale transaction after creating an invoice and printing a sales receipt.
Figure 23:
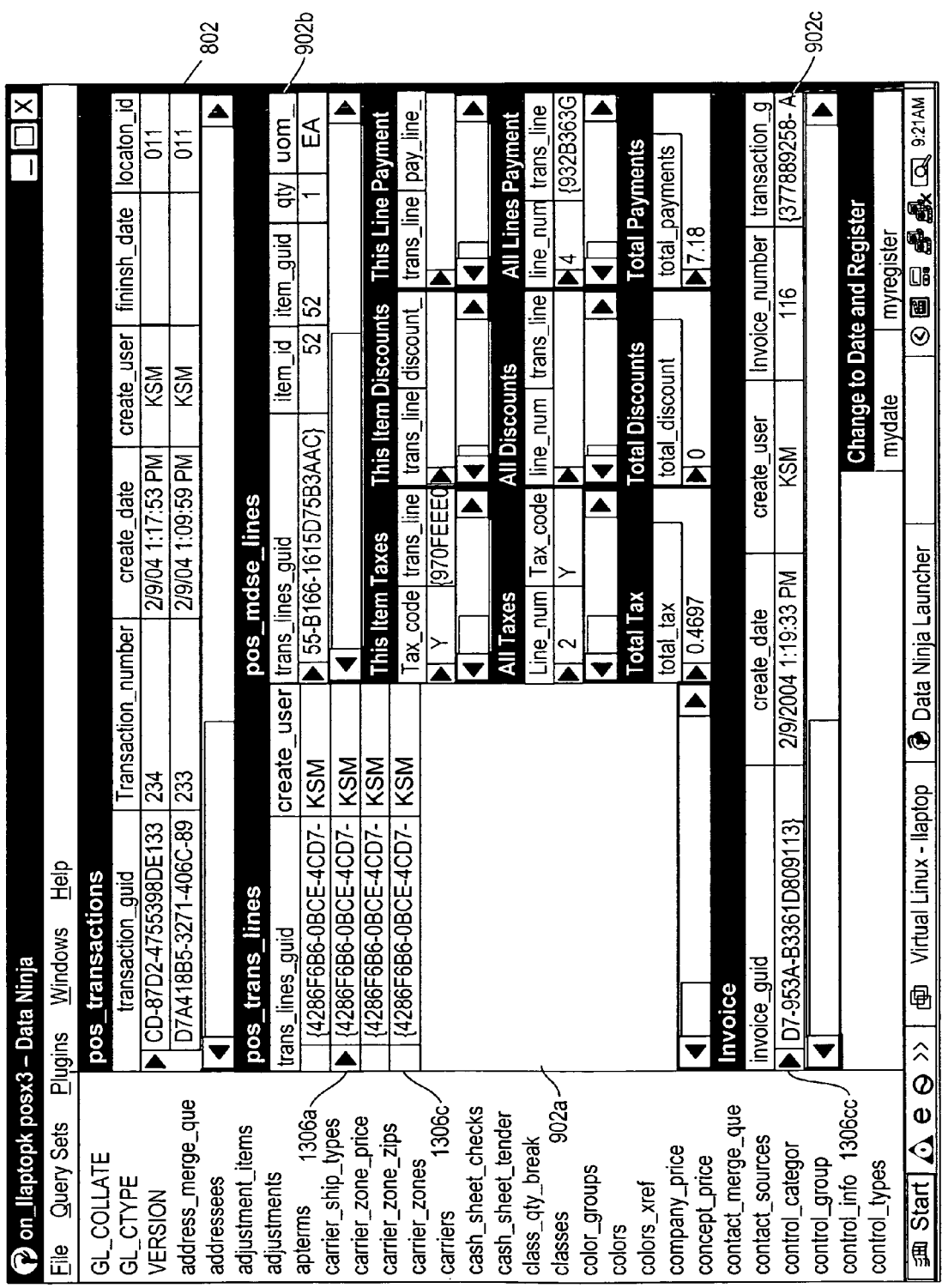
FIG. 23 is a screen shot of the database query set of FIG. 1 with changes resulting from completion of the transaction shown.

FIG. 22 illustrates the completed POS transaction with an invoice having been created and a sales slip 2202 printed. FIG. 23 again shows the database query set of FIG. 21, but at the later time corresponding to the finished transaction of FIG. 22. The pos_trans_lines table 902*a* includes a fourth line 1306*c* corresponding to the invoice. Invoice field 902*c* shows an invoice record 1306 cc. The invoice_guid field 1306 cc in pane 902*c* has been dynamically linked to the invoice_guid field in pane 902*a* and thus the corresponding invoice information is displayed. Pane 902*a* has been horizontally scrolled to show the invoice_guid field and the line_type field in its query.

The cursor is scrolled to record 1306*a* of the pos_trans_lines pane 902*a*. The pos_mdse lines pane 902*b*, dynamically linked to the selected line in pane 902*a*, now shows merchandise information about the second item 2004*a* of FIG. 20.

Figure 24:
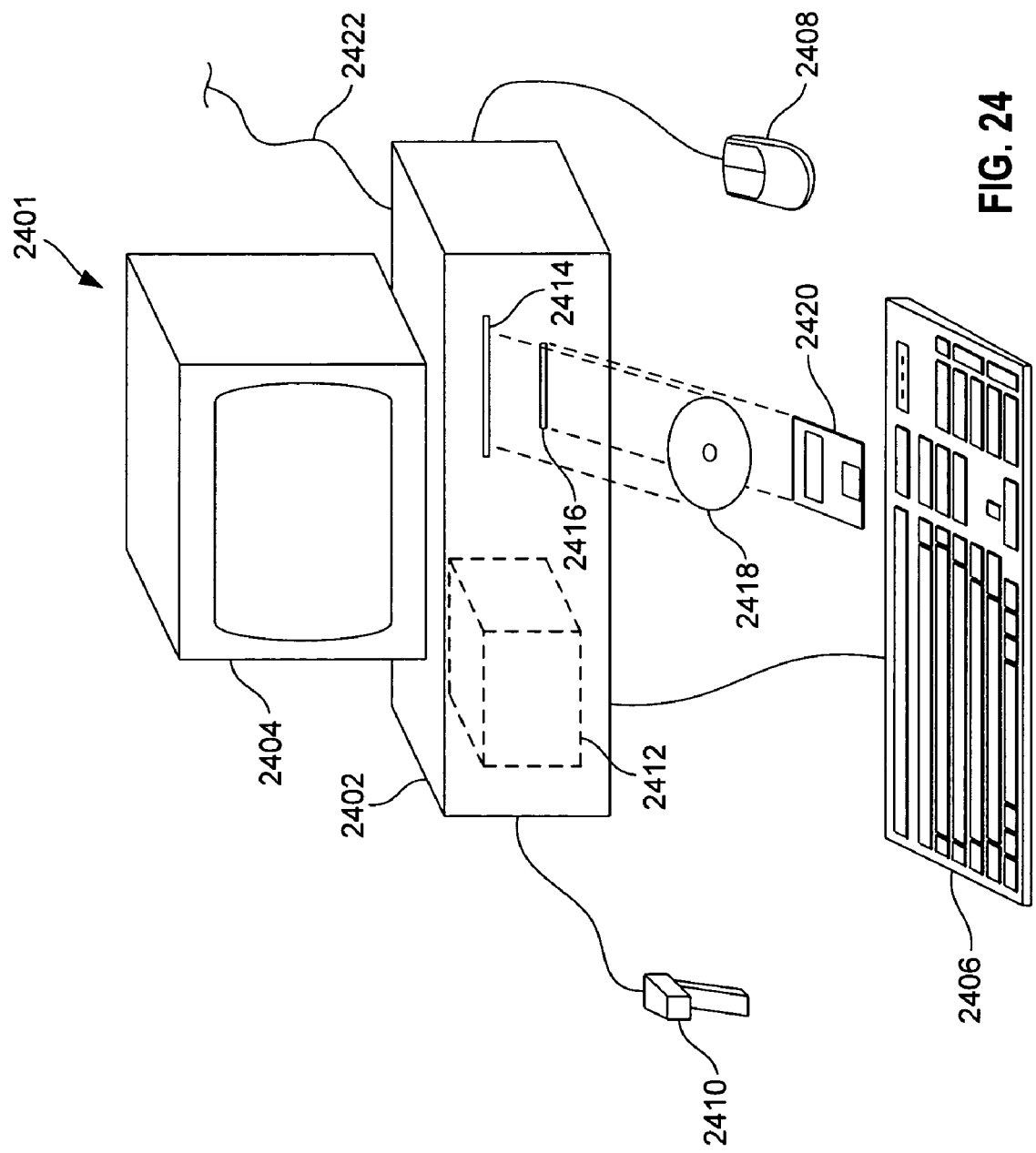
FIG. 24 is a block representation of a computer on which database linkages may be established, computed, and displayed and an application made according to an embodiment of the invention installed.
Figure 25:
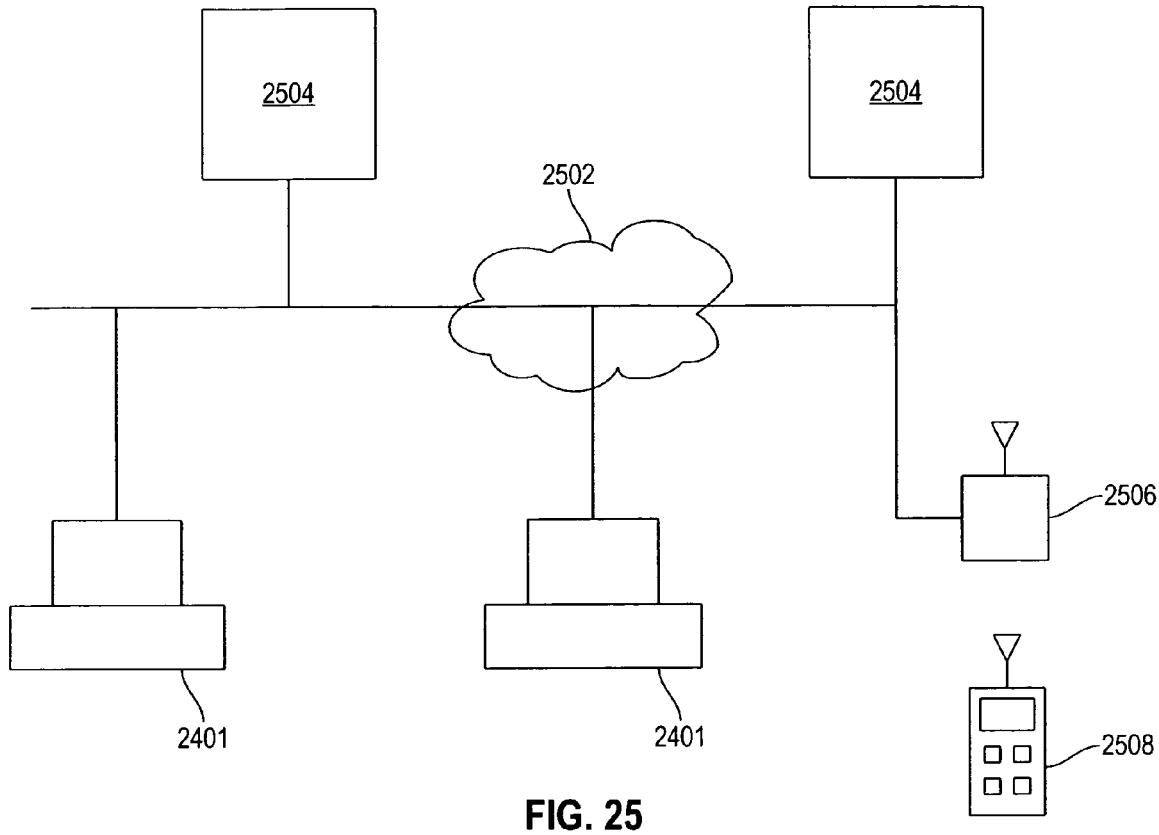
FIG. 25 is a block diagram of a network, across which databases may be linked and tracked, the linkages communicated, and an application made according to an embodiment of the invention installed.

The computer and network diagrammatically shown in FIGS. 24-25 represent platforms on which embodiments according to the present invention may be practiced and platforms across and onto which a program embodiment according to the present invention may be delivered and run. The computer 2401 of FIG. 24 includes a CPU 2402, an optional monitor 2404, and optional data entry devices such as a keyboard 2406, mouse 2408, and bar code reader 2410, respectively. The computer further includes a storage device 2412, such as a hard drive, and optional removable media storage devices such as optical drive 2414 and floppy disk drive 2416, capable of receiving removable media optical disk 2418 and floppy disk 2420, respectively. Computer 2401 may also have a network connection 2422. Software embodiments according to the invention may be loaded onto computer 2401 from optical disks 2418, floppy disks 2420, downloaded through a network connection 2422, loaded from a usb drive, or via other means, for example. Various portions of the computer 2401 diagrammatically shown in FIG. 24 may be regarded as non-transitory computer readable media. For example, memory (not shown) in the CPU 2402, a bar code (not shown) read by the bar code reader 2410, the storage device 2412, the optical disk 2418, the floppy disk 2420, and a usb drive (not shown) each represent a non-transitory computer readable medium.

FIG. 25 illustrates a network on which embodiments may be practiced. Network 2502, which may include a LAN, MAN, the Internet, etc. includes provision for connecting computers 2401. Computers 2401 may, for example, include POS terminals, personal computers, or other computing devices. Optional servers 2504 include application and database support. Also shown is an exemplary wireless gateway 2506 and wirelessly connected terminal 2508. Embodiments may be run on an individual computer 2401 and may optionally access databases spread across other computers 2401 or on network resources such as servers 2504 or remote terminals 2508. Programs may be run locally or may be accessed on a server. Various embodiments may be run on peer-to-peer, client-server, host-terminal, or other network environments.

Figure 26:
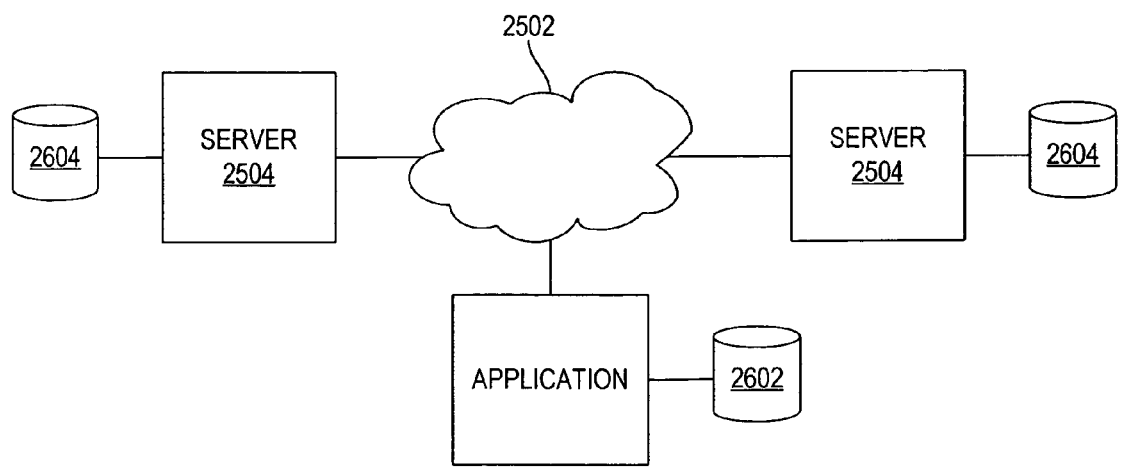
FIG. 26 is a block diagram of a networked system of local and remote databases.

As illustrated by FIG. 26, an application made according to an aspect of the invention may read from a local database 2602, from remote databases 2604 accessed across a network 2502, or a combination. Remote databases 2604 may, for example, reside on servers 2504. Various portions of the network diagrammatically shown in FIG. 26 may be regarded as non-transitory computer readable media. For example, the local storage device 2602 and the remote storage devices 2604 on which the databases reside each represent a non-transitory computer readable medium.

FIGS. 27-42 again refer to the database schema shown in FIG. 6A.

Referring back to the query session window or database query viewer desktop of FIG. 7C, FIG. 27 illustrates a view showing three data table structures 2702, 2704, and 2706 corresponding to respective tables 2708, 2710, and 2712 entitled "customers", "employees", and "order items" selected from the table list 706 by pressing CTRL-LEFT-CLICK or otherwise initiating a command to display the respective schema panes. As mentioned above, the schema panes may open on top of open query panes. The Window commands described above in conjunction with FIG. 7F, specifically the "Queries" and "Table Schema" commands may be used to respectively position the query pane and table schema pane layers on top for viewing. To close a schema pane, the user issues a RIGHT CLICK on the pane and selects the "Close Field List" selection that pops up at the cursor.

Figure 28:
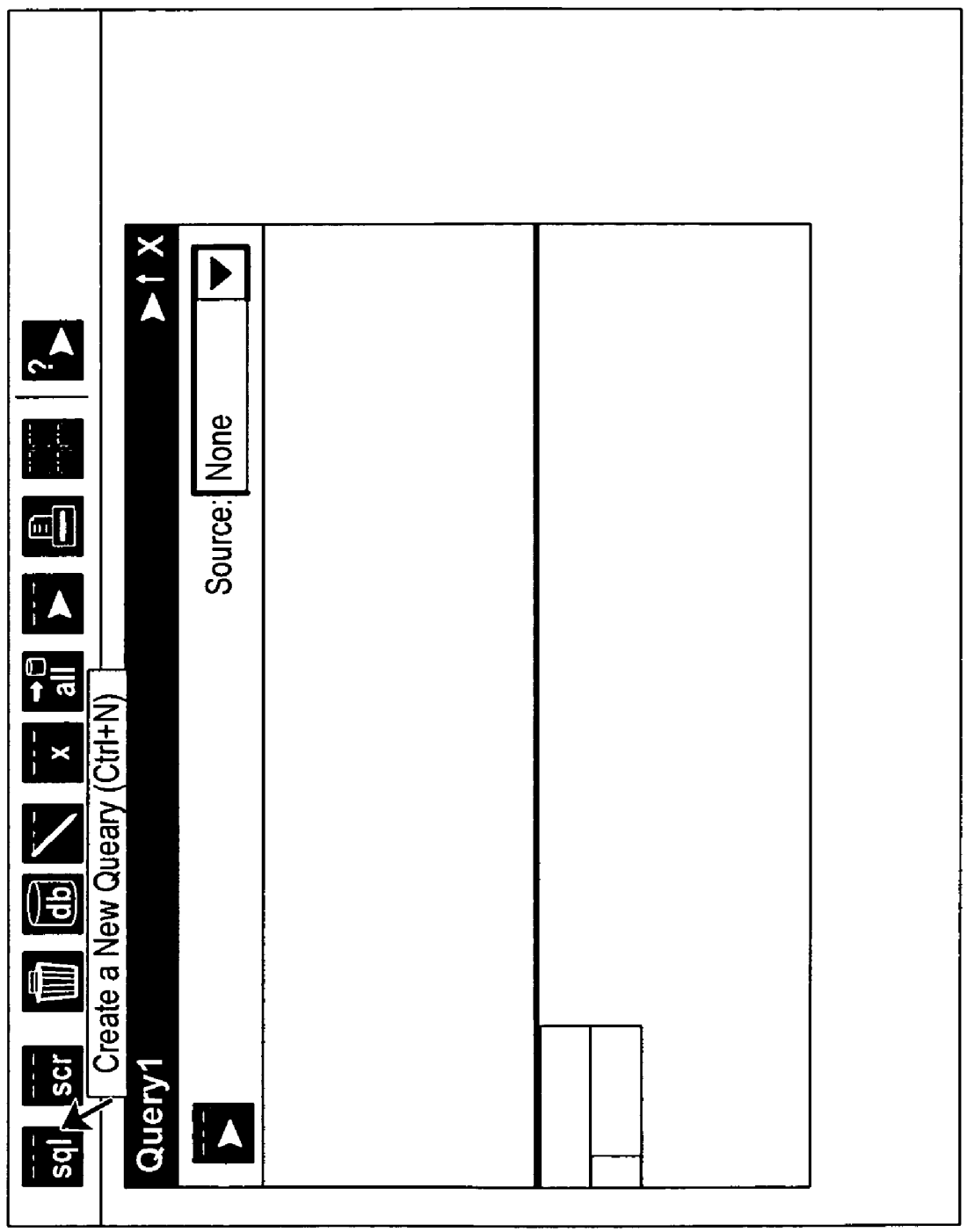
FIG. 28 is a screen shot showing a new query opened with the "New Query" button.

Referring again to the process of opening query panes, describe in conjunction with FIG. 8, one way to open a query pane is to double click on the corresponding table listed in the table list 706. Another way to open a query pane is illustrated by FIG. 28 where a new query is manually created by using the "New Query" menu selection or button bar, as shown. The query pane that opens has a "generic" name such as Query 1, and may be automatically opened in design mode to allow easy creation of a query. In this mode, the user manually inputs a valid SQL or other query. As described above, multiple query panes may be opened, sized, and arranged in the workspace. Pressing the "tile panes" button or selecting the corresponding command from the "Windows" menu tiles the panes within the workspace. As mentioned above, selected panes may be set to wrap or set a best fit magnification.

Figure 29:
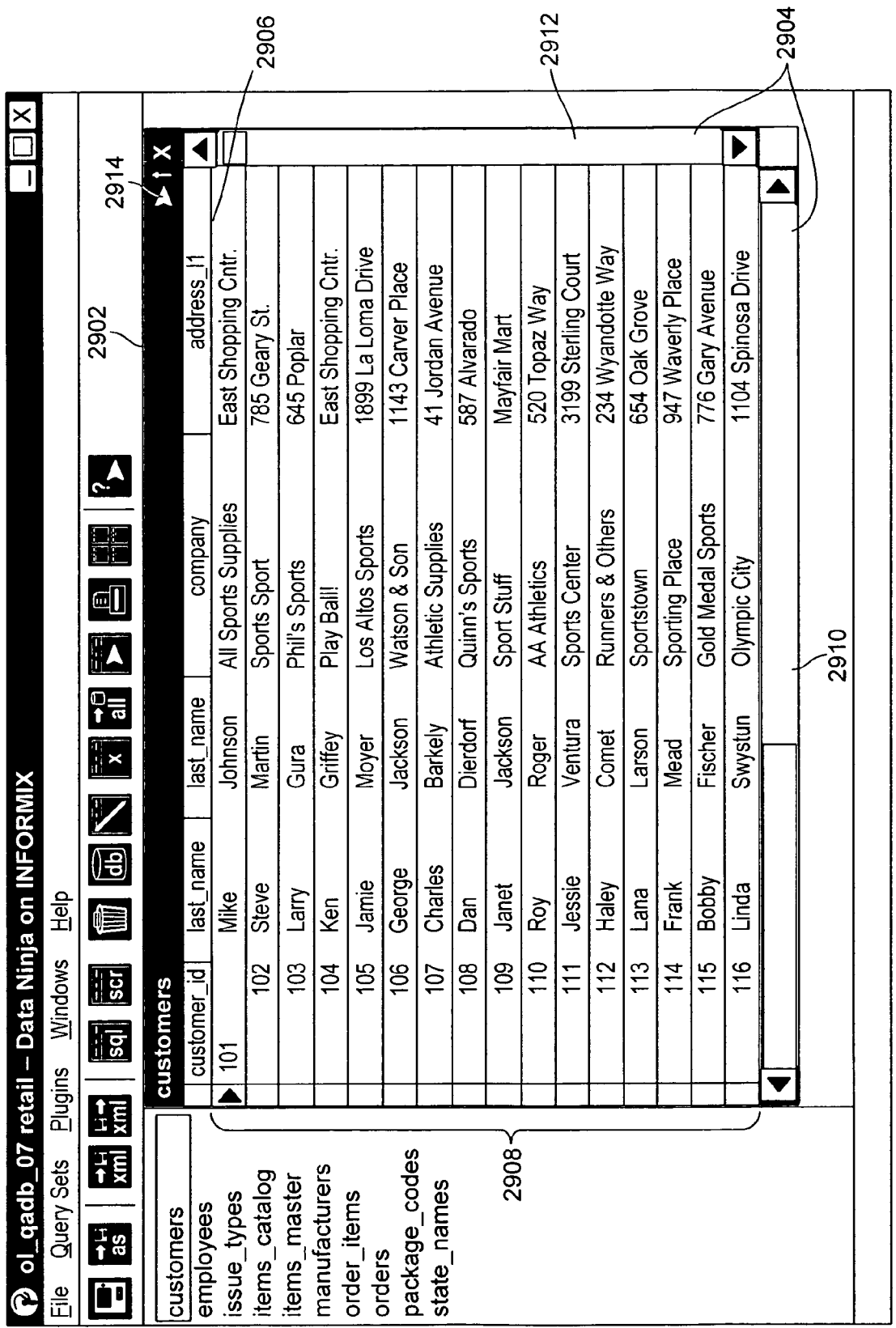
FIG. 29 is a query pane illustrating the principal components thereof.

FIG. 29 is a query pane in the session workspace showing its principal components:

TITLE BAR 2902—The title bar of the query pane contains the name of the query pane, which can be changed by clicking and typing. The query pane may also be positioned by executing a LEFT-CLICK-DRAG on the title bar. The user may also RIGHT-CLICK on the query pane title bar to display a context menu of important commands.

EDGES 2904—The edges of the query pane may be used to re-size the query window by left-click-drag.

COLUMN HEADINGS 2906—For an executed query that has returned data, the column headings will display below the title bar (except in design mode, see the following section).

QUERY DATA RESULTS AREA 2908—Below the column headings the data will be displayed. If there is not enough data to fill the query pane, the balance will be "white space" below the query data results.

CONTROLS—There are also several buttons and controls that may be displayed on the query pane:

HORIZONTAL AND VERTICAL SCROLL BARS 2910 and 2912—If there are more columns or rows of data than the pane can display, scroll bars for navigation will be displayed.

EXECUTE QUERY BUTTON 2914—A user may execute or re-execute the query within the query pane with execute query button 2914.

The query pane may be sized horizontally and vertically to take up the entire desktop or be as small as desired on the screen. A query pane does not need to be fully visible in order for the data contained in it to be useful to the overall database query set. According to an exemplary embodiment, one or more query, script, plug-in, or other panes may be minimized and still execute according to the defined linkages and pane attributes. Thus, the terms "pane" or "window" as used herein refer to database query set objects or members in more than the limited sense of a window that is actually displayed. Similarly, the term "query pane" may be used interchangeably with simply "pane" or "object pane" and may refer to an instance of various types of objects including query panes, table panes (sometimes also used interchangeably herein), plug-in panes, script panes, etc.

To size a pane, a user moves the mouse pointer over the top edge, bottom edge, left edge, or right edge of the window. The pointer will change to a "sizing tool". To position the pane within the session desktop, a user left-clicks and holds the mouse button on the title bar of the pane, then drags it to the desired position.

Figure 30:
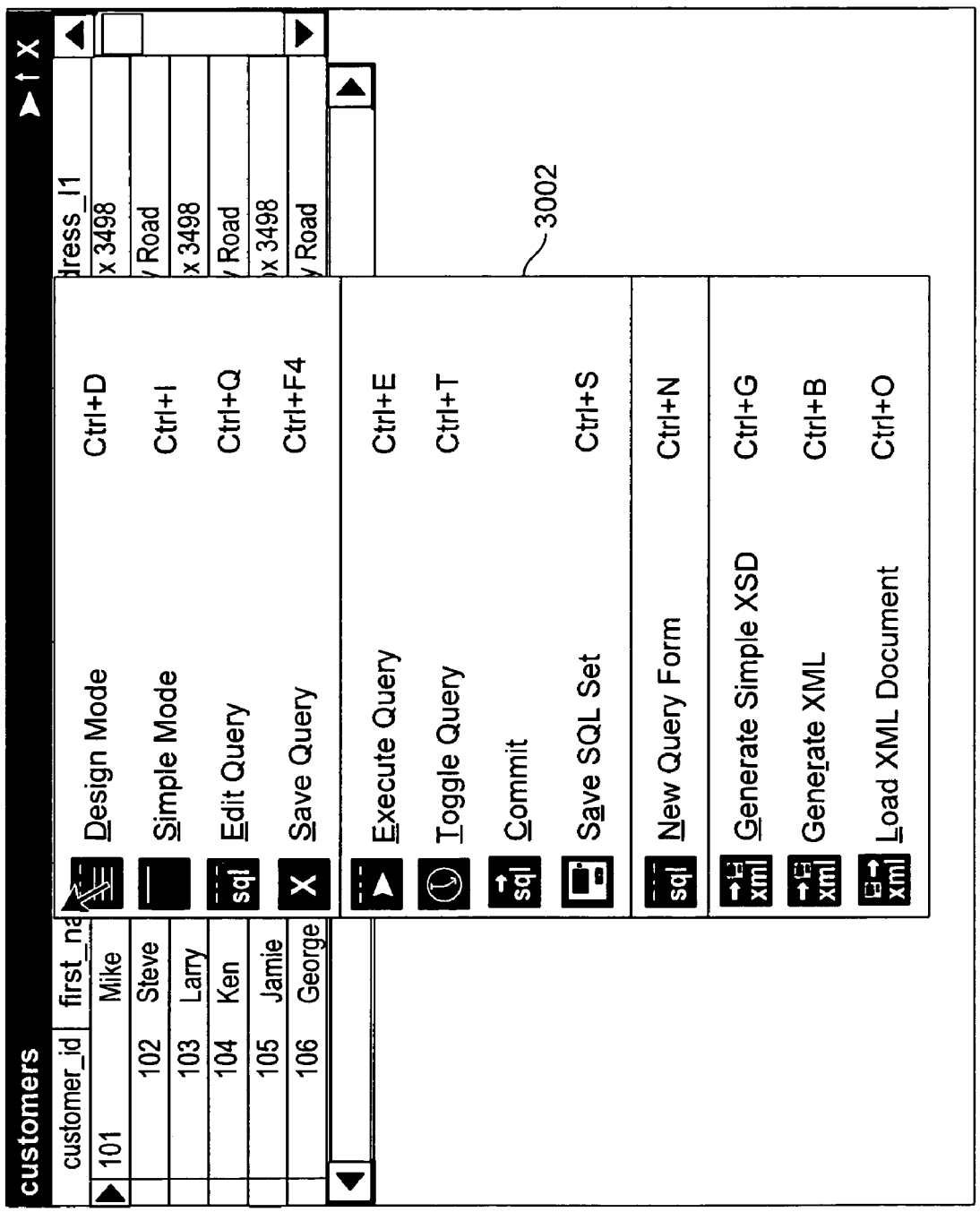
FIG. 30 is a screen shot showing a title bar context menu.

A query pane includes two context menus that may be accessed. The context menus contain many useful command tools, some of which are also accessed from the tool bar. FIG. 30 illustrates a title bar context menu 3002, which may be accessed by a RIGHT-CLICK on the title bar. The menu items (along with shortcut keys in parentheses) are explained below.

DESIGN MODE (CTRL+D)—Places query panes into Design Mode. Design mode exposes the query edit area and the "Source" drop-down list box (as shown in FIG. 11). Design mode may also be accessed via a command button in the upper right corner of a query pane.

SIMPLE MODE (CTRL+I)—Places the query pane in "simple mode", hiding the query text and the "source" drop-down list box, using the query area for columnar data.

EDIT QUERY (CTRL+Q)—Opens the query editor pane, which displays the SQL or other query for the selected query pane.

CLOSE QUERY (CTRL+F4)—Closes the current query pane without further prompting.

EXECUTE QUERY (CTRL+E)—Executes the query in the selected query pane. If other query panes are dependant on the current query pane, they are also refreshed. A query may also be executed by using the execute query button in the upper right of a query pane.

TOGGLE QUERY TIMER (CTRL+T)—Allows a user to time queries as they execute. A pop-up window inform the user how long each query in the database query set takes. The feature may be turned off with the same command. The query timer is useful for query performance optimization and tuning.

COMMIT—After making changes to a query set (in a full version embodiment of the database query viewer), a may commit changes made to permanently record them in the target database. Closing a set without committing the changes may be used to abort changes.

SAVE SQL SET (CTRL+S)—Provides the functionality similar to a "File . . . . Save SQL Set" command from the main menu.

NEW QUERY FORM (CTRL+N)—Provides the functionality similar to the "File . . . " menu selection.

GENERATE SIMPLE XSD (CTRL+G)—Allows a user to create an XSD base file for the data types in the selected database query. This may be useful if a user intends to generate an XML document based on the data types of a given table or query in the database and does not want to hand-code an XSD file.

GENERATE XML DOCUMENT (CTRL+B)—Allows a user to generate an XML document based on the database query set currently open. The XML document that is created represents the data hierarchy of the database query set.

LOAD XML DOCUMENT (CTRL+O)—Loads a database query set defined by an XML document.

When generating the XML document, a user may optionally use a valid XSD document for the generated XML file. XML documents may be especially useful for data transport between different databases.

Figure 31:
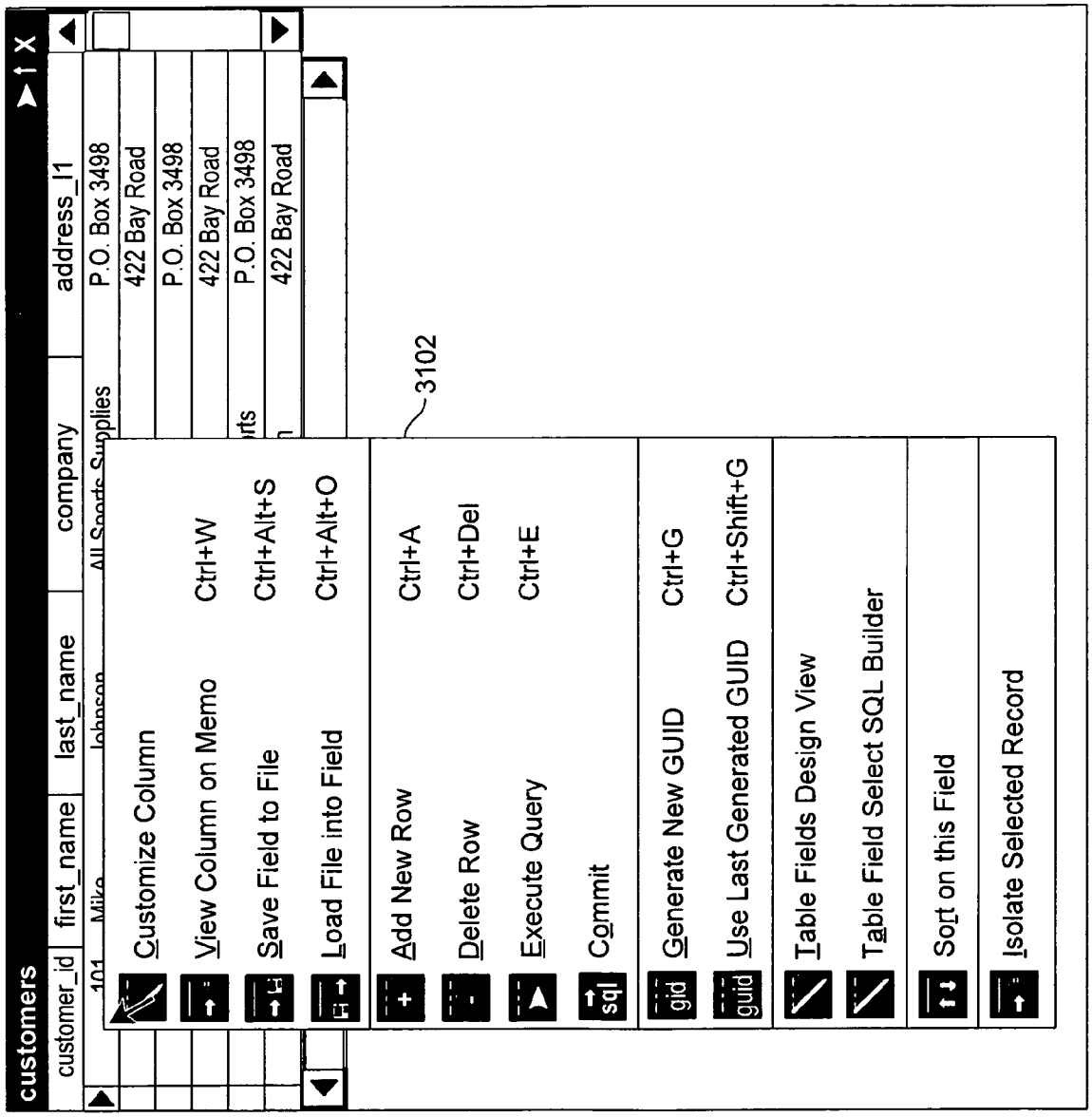
FIG. 31 is a screen shot showing a query grid context menu.

FIG. 31 illustrates a grid context menu 3102. It may be accessed by executing a RIGHT-CLICK on a grid cell. Following is an explanation of the commands shown on the query grid context menu:

CUSTOMIZE COLUMNS—Provides an ability to change the appearance of a column of data, including font attributes (size, style, color) and background color for both the column headings and the data itself.

VIEW COLUMN ON MEMO (CTRL+W)—Allows viewing a memo field. The command temporarily "commandeers" the entire query pane to display the memo field. Repeating this command toggles back to the normal query view. As will be described below, a memo field may also be placed on the desktop by using a memo viewer plug-in.

SAVE FIELD TO FILE (CTRL+ALT+S)—Saves the field content to a file on a local system or network. Several types of data are supported including memo-type fields, BLOBS, CLOBS, etc.

LOAD FILE INTO FIELD (CTRL+ALT+O)—Loads a file into the current field. If an attempt is made to load a file into a field with a data type that does not match (such as trying to load a JPG image file, for example, into an integer field), an error message is issued.

ADD NEW ROW (CTRL+A)—Inserts a blank row into the current query pane for editing. The new data entered must be committed in order to be saved to the database.

DELETE ROW (CTRL+DEL)—Deletes the currently selected row. The change must be committed in order to be permanently saved to the target database.

EXECUTE QUERY (CTRL+E)—Executes a query in the currently selected query window.

COMMIT (CTRL+M)—Commits database query set edits to the target database.

GENERATE NEW GUID (CTRL+G)—GUID's (Globally Unique Identifiers) are "guaranteed to be unique" 38-byte character strings that are frequently used as primary keys in database schemas. This feature allows the user generate a GUID into the currently selected field of the currently selected query pane.

USE LAST GENERATED GUID (CTRL+SHIFT+G)—When manually creating records with GUIDs, it may be convenient to use the last-created GUID several times in several fields and/or tables. The command will place the last generated GUID into the current field.

TABLE FIELDS DESIGN VIEW—Displays a list of fields from the current query pane and allows a user to select (or multi-select) which of the fields will be visible within the query pane. May be especially useful when fields (such as BLOB fields containing images) are needed in the query, but the user doesn't need to display the word "BLOB" in the query pane. The fields that are not displayed are still a part of the query and a part of the in-memory data set but they don't show within the query window.

TABLE FIELDS SELECT SQL BUILDER—Allows the user to select a field list from the current query pane and edit it down to a smaller number of fields wanted in the query. This feature may not be active if the underlying query is complex.

ISOLATE SELECTED RECORD—The database query pane is isolated on the selected record (adding criteria to the "where" clause of the query).

As indicated above, the database query viewer may, according to an exemplary embodiment, use a graphical interface for building query pane sets. Such an embodiment may take the form, for example, of drag-and-drop linkage creation. Parent-dependent relationships may be displayed as arrow tips on a graphical linkage representation. Pane position may, for example, be used to select execution order. Tool palettes may be used for selecting object pane types, linkages, determining display or other expression parameters, and performing other functions during creation, maintenance, and use of forms.

Figure 32:
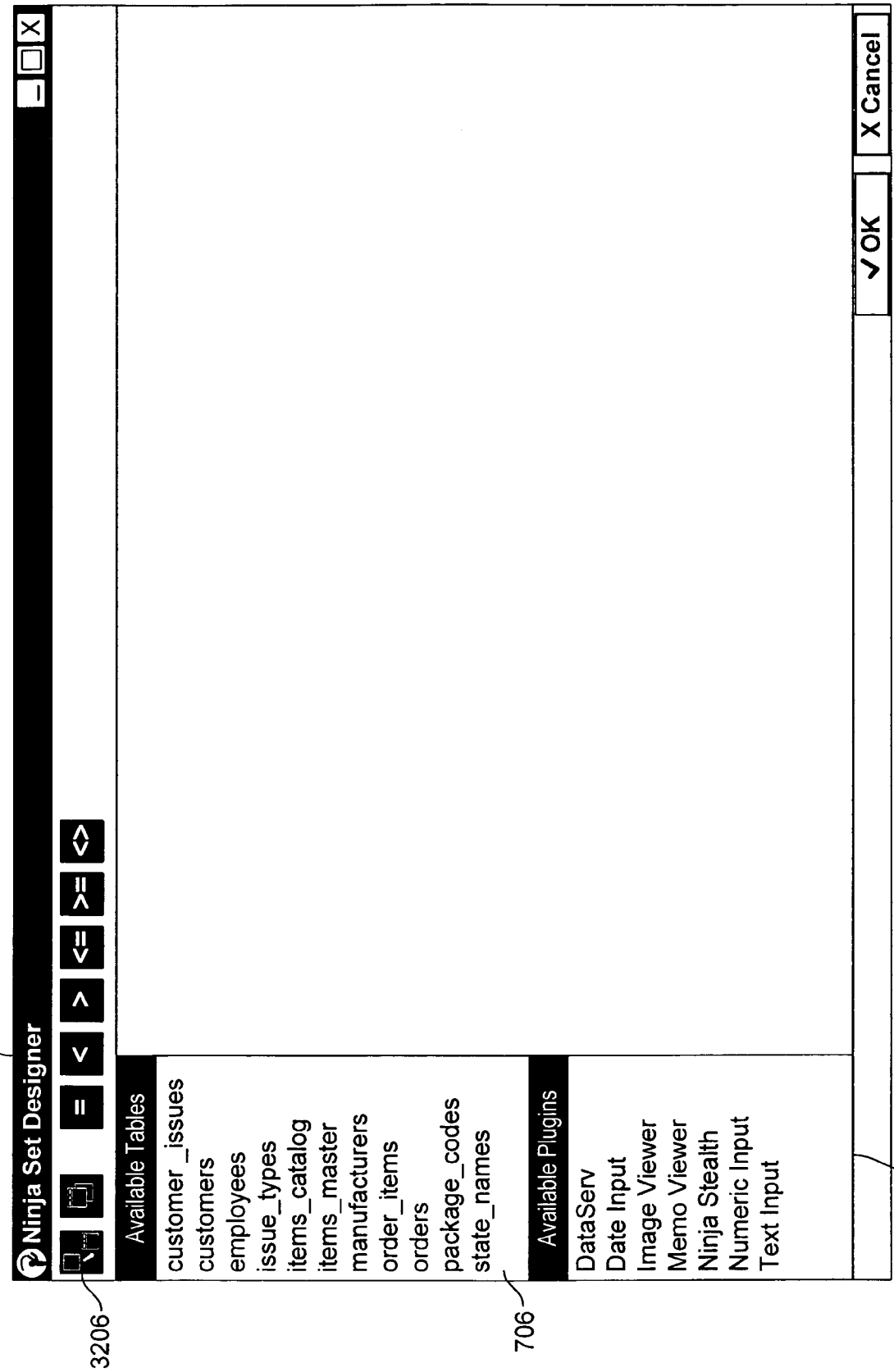
FIG. 32 is a "Query Builder" window or session for graphical construction of database query sets.

A "Query Builder Mode", illustrated in FIG. 32, may be accessed by pressing a query builder button on the toolbar, by selecting "build query" from the file menu on the on the menu bar or by using the CTRL+ALT+B keyboard command.

One advantage of using the query builder mode described herein is that it provides a user-friendly interface to build queries without having to type in SQL or other database commands. It allows the user to create single result panes with joined query data as well as multi-pane database query sets.

The query builder window 3202, shown in FIG. 32, opens on top of the query session desktop. It contains a table list 706 on the left, with a list 3204 of available plug-ins below that. The menu bar 3206 contains mode and relationship control buttons. The query builder window also contains a gray desktop area, in which a database query set may be built.

Figure 33:
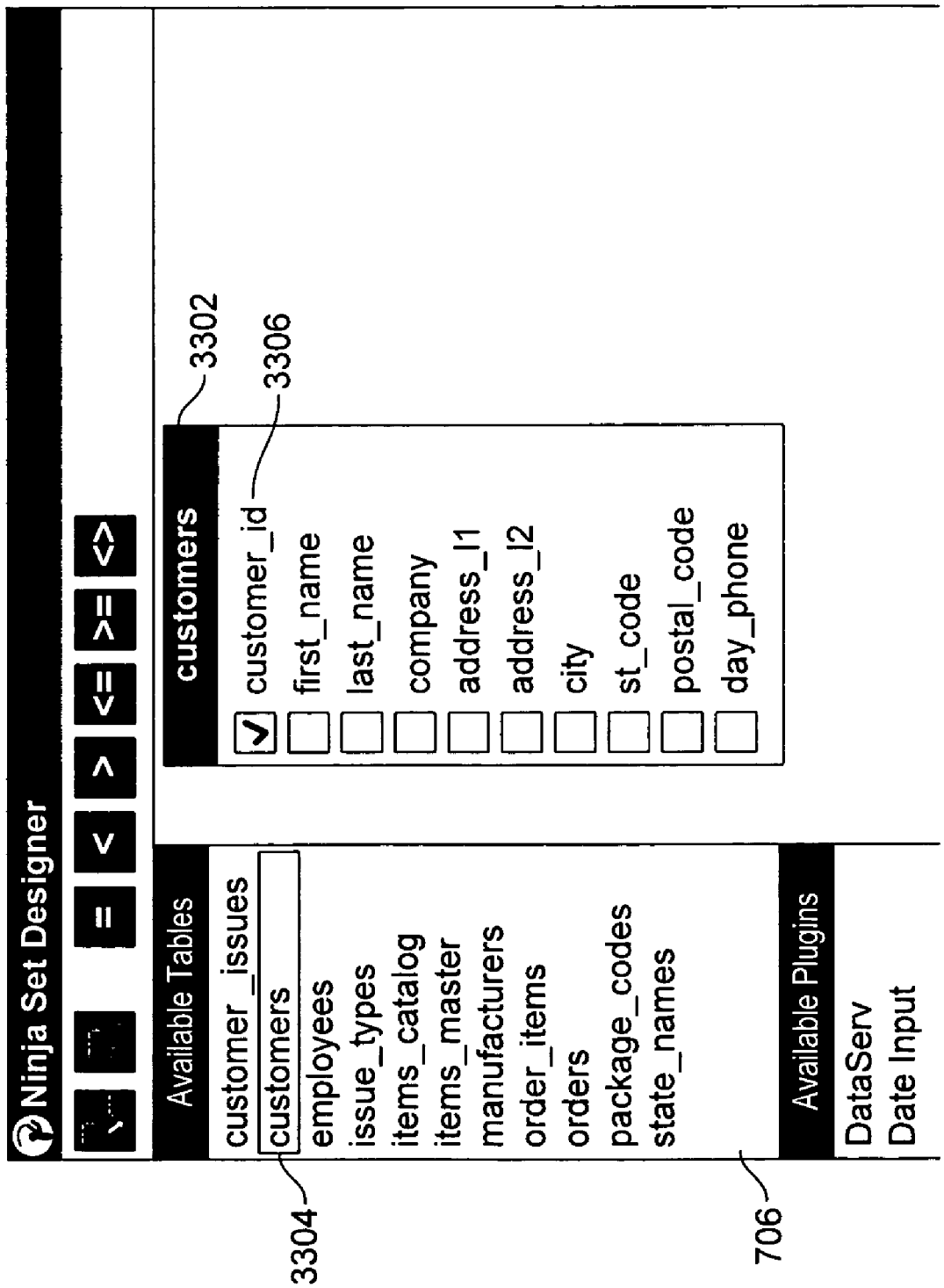
FIG. 33 shows a table selected in the Query Builder window of FIG. 32.

FIG. 33 illustrates a selected table or query 3302. To select the table, the corresponding table name "customers" 3304 may be double-clicked in the table list 706. A representation of the table and fields within it 3302 is placed on the desktop, with the primary key field 3306 automatically selected. Pressing OK at the bottom of the screen returns to the database query session, with a new query pane created and opened with one (checked) field "customer_id" displayed. Additional fields may be selected for display by checking additional boxes next to the field designations.

According to an exemplary embodiment a default query builder mode creates multi-pane linked database query sets. The multi-pane mode selector is indicated by button 3404 in FIG. 34. Multi-pane mode means that each table that is placed on the query builder desktop will be represented in its own query pane when the user returns to the database query session.

Figure 34:
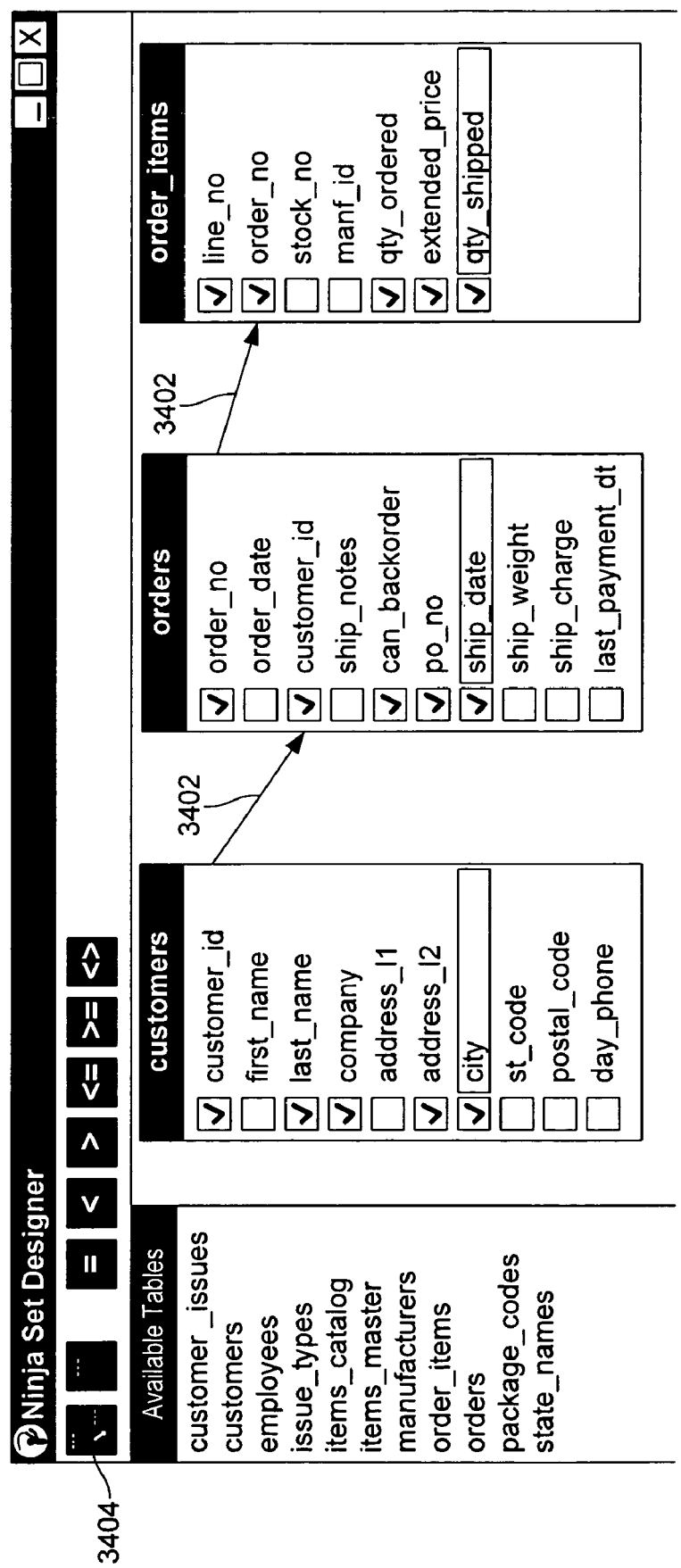
FIG. 34 shows three tables selected and linked in Query Builder.

In the example shown in FIG. 34, placing Customers, Orders, and Items on the query builder desktop and joining them on the appropriate join fields with the white arrow 3402 (the color for the query pane set builder mode) will generate three separate query panes upon return to the desktop, as shown in FIG. 35.

Figure 36:
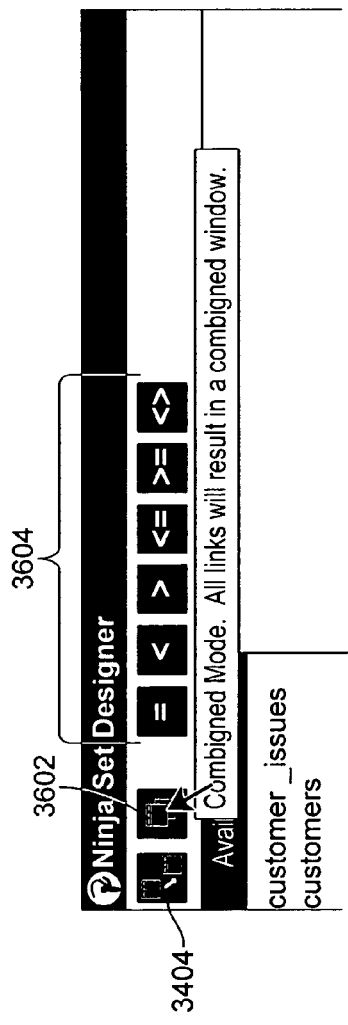
FIG. 36 illustrates the toolbar of the query builder view, showing especially selection of "Combined Mode" in a query builder session.
Figure 37:
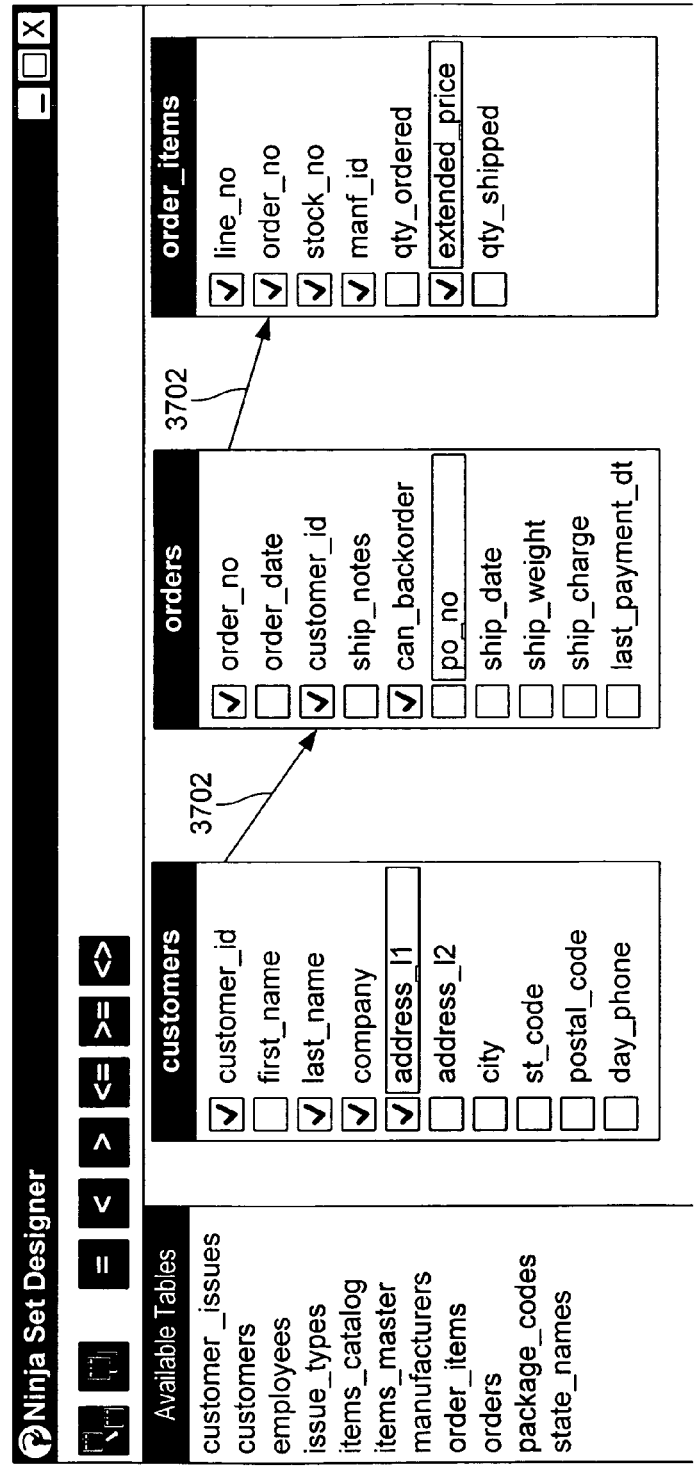
FIG. 37 illustrates a combined mode query graphically joined.
Figure 38:
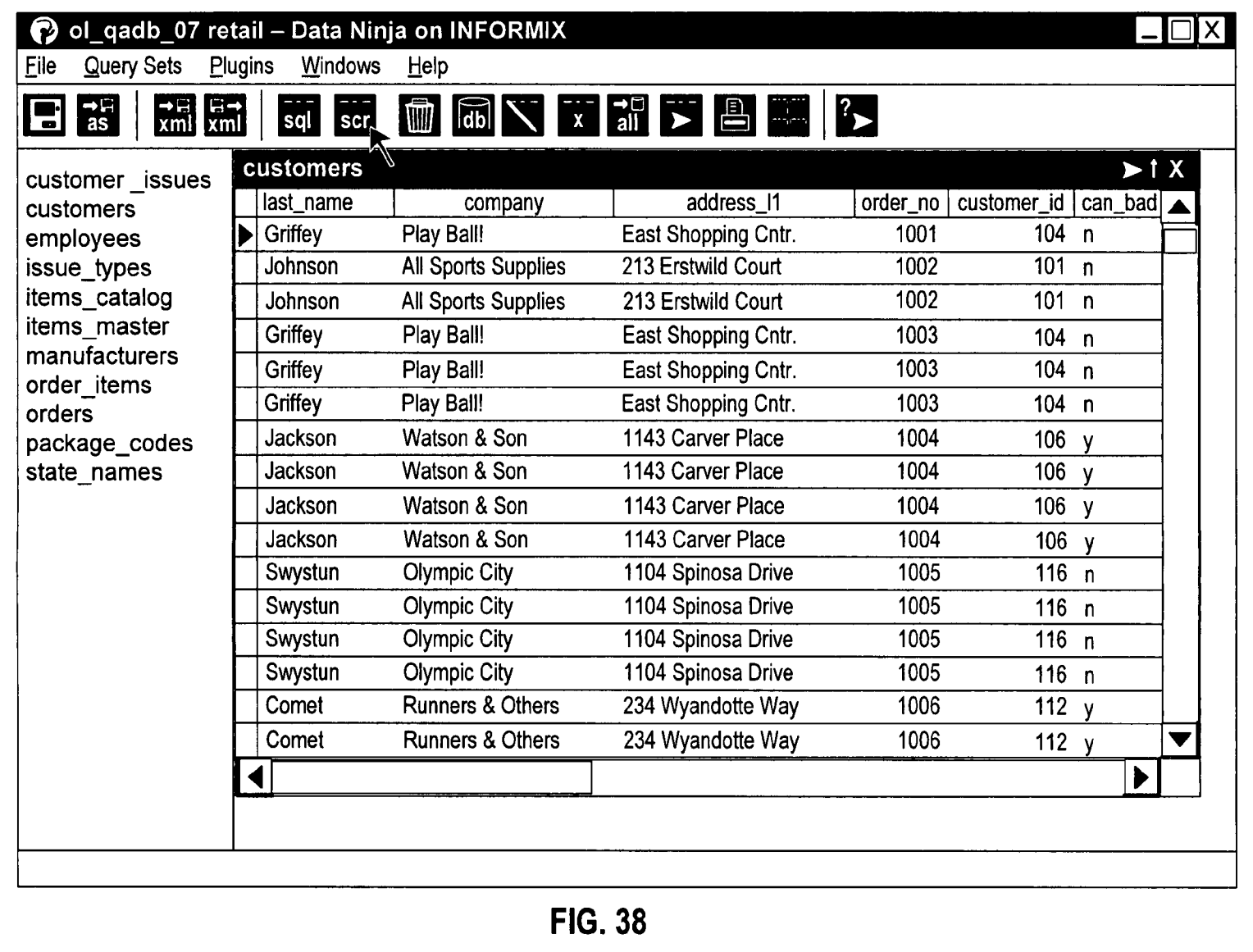

FIG. 36 is a close-up illustrating the query builder toolbar made according to an exemplary embodiment. As indicated above, mode button 3404 is the multi-pane mode selector. Mode button 3602 is the "join" or "combine" mode selector. As will be described below, combine mode button 3602 causes query builder to interpret graphical connections made between selected tables as indicating table join commands. FIG. 37 illustrates two combine mode links made between three tables, as indicated by dark arrows 3704. FIG. 38 shows the resultant single joined query pane that may be viewed by returning to the database query viewer desktop.

"Join" and "multi-pane" linkages may be combined in a query builder session and will result in a combination of joined and linked panes in the query set.

Referring back to FIG. 36, a number of linkage criterion buttons 3604 may be used to ascribe relational attributes to linkages formed in query builder. The default criterion is "=", wherein the linkages is made such that an equivalent value in linking and index fields defines a relationship between query panes or columns in a joined table.

Figure 39:
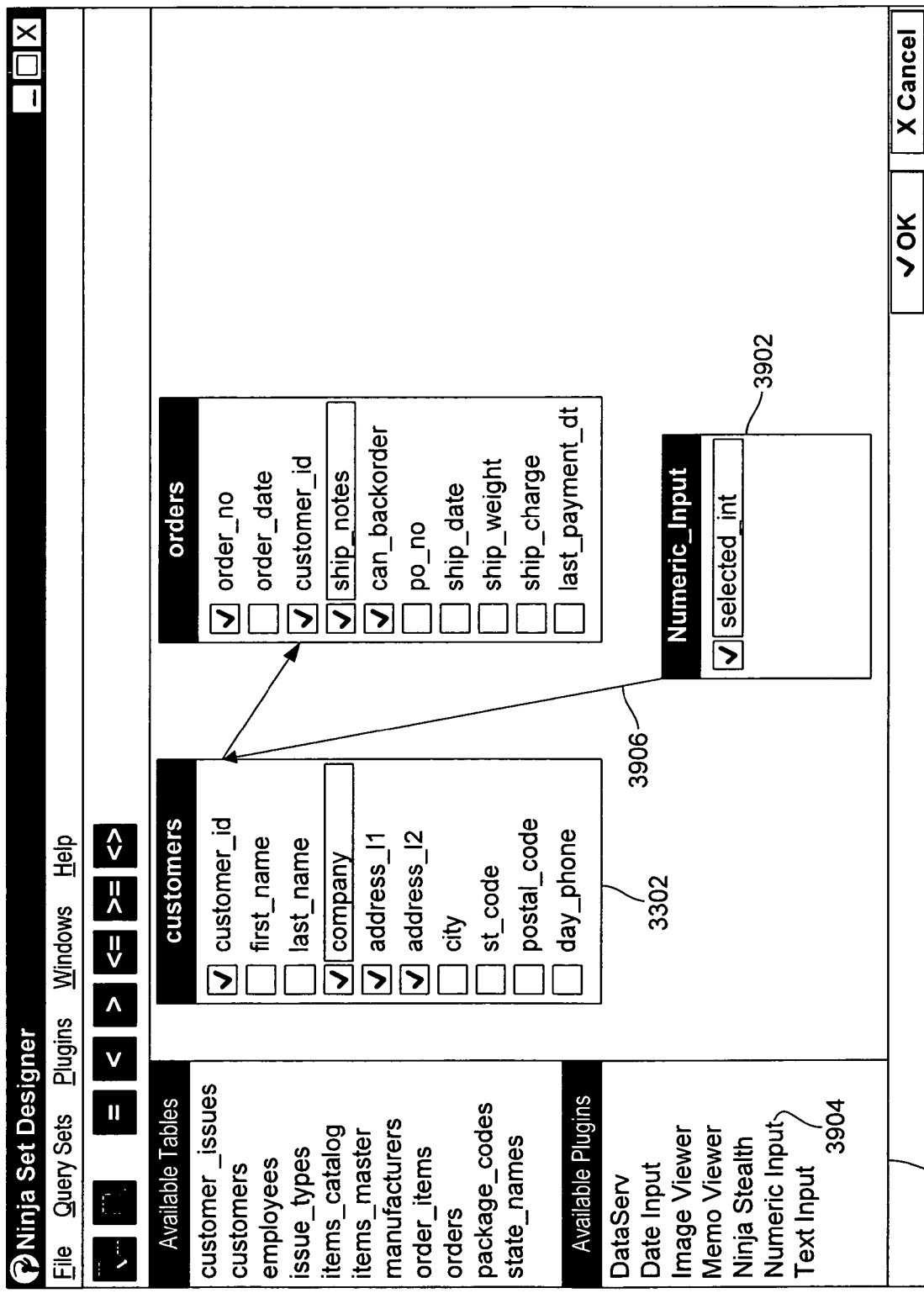
FIG. 39 illustrates the linking of a numeric input plug-in in combination with query pane specifications in a query builder session.

As indicated above, a variety of plug-ins may be combined with queries and tables (and other types of objects) to provide enhanced functionality for the user. FIG. 39 illustrates a method of building a query set that includes a plug-in in query builder. In the example of FIG. 39, a "numeric input" plug-in designator 3902 is selected by double-clicking the corresponding plug-in name 3904 in the plug-in list 3204. A linkage 3906 to the "customers" table designator 3302 has been created as is typical of query builder linkages; i.e. by dragging from the index field or column name in the parent pane to the linking field or column name in the dependent pane. Since the numeric input plug-in designator 3902 has only a single field, the user may drag from any place on the designator and query builder will automatically make the connection to that field. As shown in FIG. 39 and other images of query builder mode, the arrow tip on linkages points toward the dependent pane designator, with the arrow pointing from the parent index field to the dependent linking field.

Figure 40:
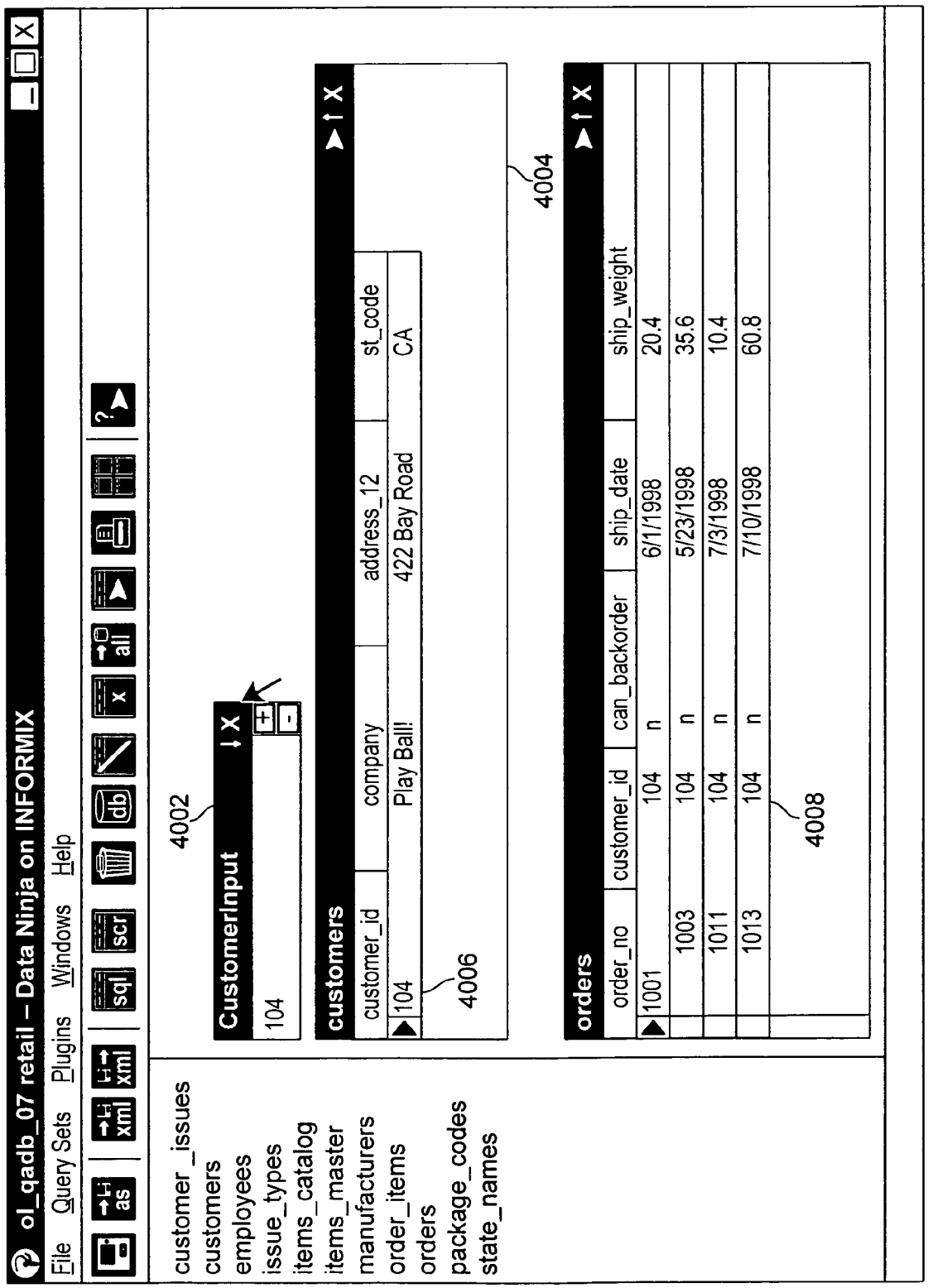
FIG. 40 illustrates a database query pane set created according to the graphical process of FIG. 39. The numeric input plug-in pane has been resized and renamed.

FIG. 40 illustrates a resultant query set. Numeric input plug-in pane 4002, which corresponds to the designator 3902 of FIG. 39, is shown sized appropriately for its task near the top of the workspace. In the example shown, the user has entered a customer_identification number "104" in pane 4002. Consistent with the query set structure shown in FIG. 39, the number entered in pane 4002 acts as a parent to the "customers" query pane 4004, which, accordingly displays a record 4006 from the "customers" table corresponding to customer number 104. Comparison of the "customers" designator pane 3302 in FIG. 39 to the "customers" query pane 4004 shows that only checked fields in the designator pane 3302 are displayed in the query pane 4004. As may be further seen in FIG. 40, an "orders" query pane 4008 is also shown with the selected records also defined by using the "customer_id" field from intermediate pane 4004 as an index to its own "customer_id" linking field. As described elsewhere, the linking fields between panes need not be the same (even though for this case, the same literal numeric entry value 104 designates a linking value in each of the depending tables).

Figure 41:
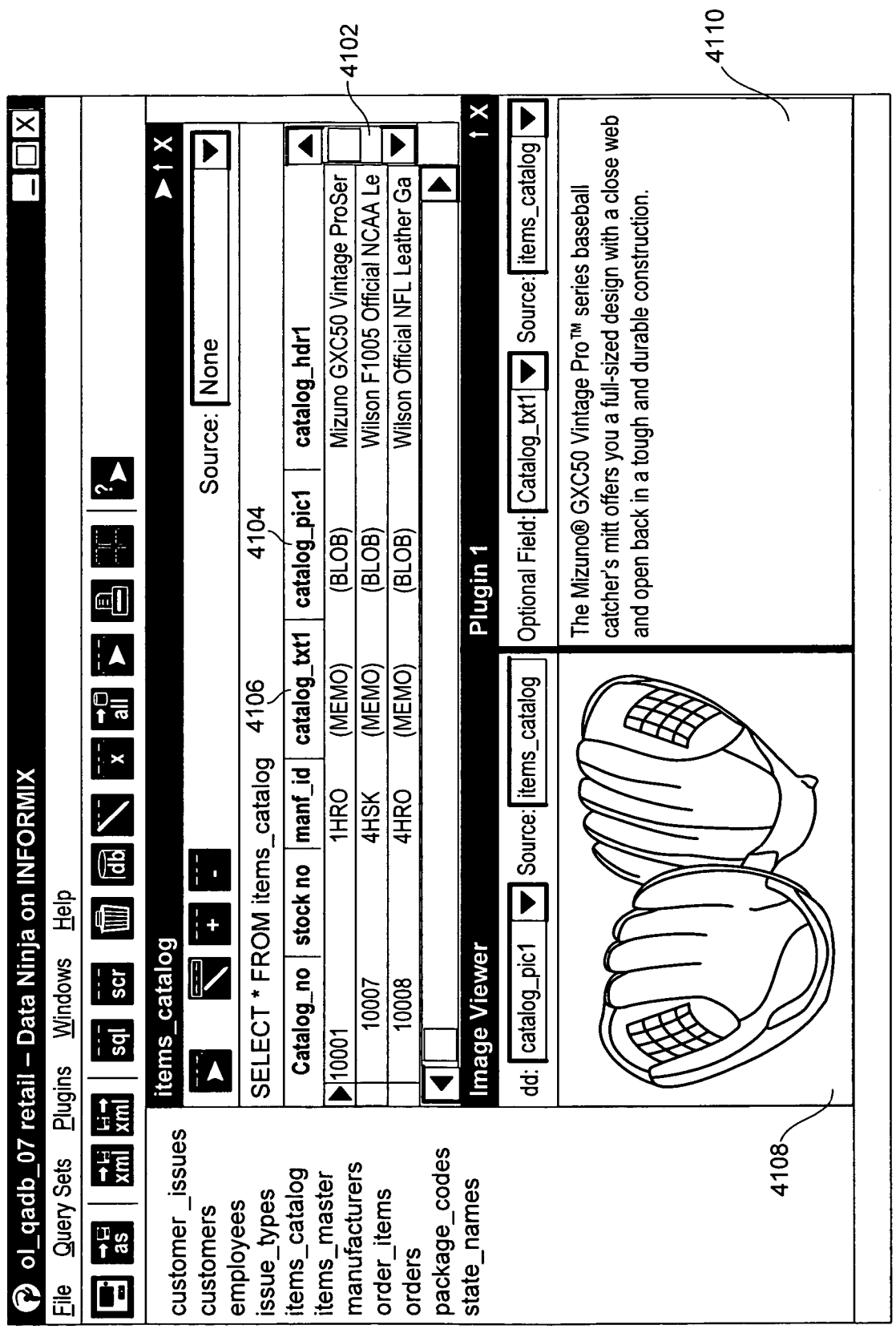
FIG. 41 illustrates use of two types of data publishing plug-ins, an image viewer and a memo viewer, in combination with a query (design mode) session.
Figure 42:
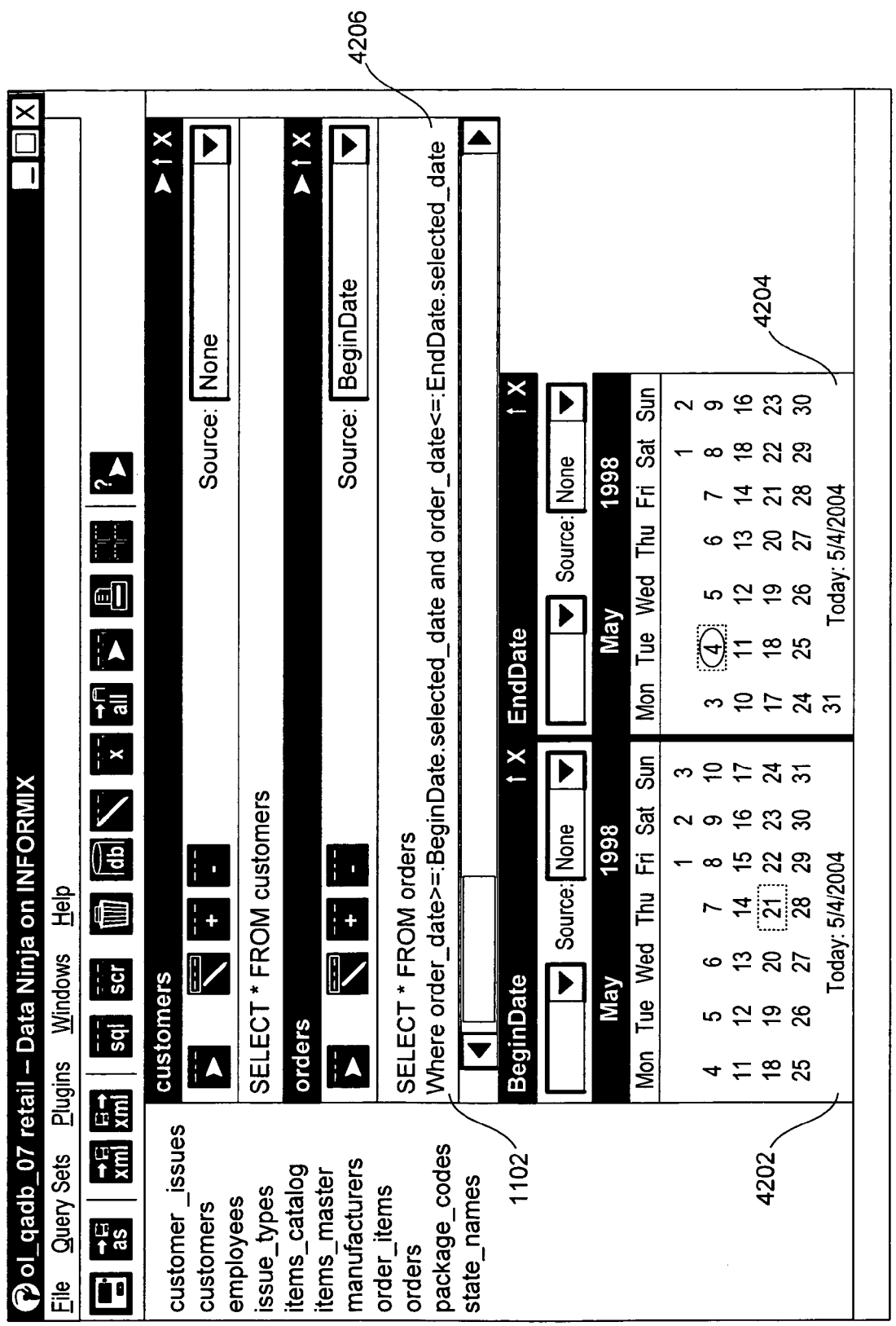
FIG. 42 illustrates the use of two date input plug-in panes used as parallel parent panes to drive one dependant pane.

FIGS. 41-42 illustrate some of the additional plug-ins that may be placed on the workspace. FIG. 41 illustrates a database query set with one query pane 4102 "items_catalog" that has non-displayable "BLOB" and "MEMO" fields 4104 and 4106, respectively. For the example of FIG. 41, the BLOB data of field 4104 contains image data.

An image viewer plug-in 4108 is shown on the workspace, displaying the product image corresponding to the BLOB data 4104 associated with selected catalog number 10001. A memo viewer plug-in pane 4110 (renamed "Plugin 1") is shown displaying the MEMO data 4106 also associated with the selected record. In the example, the memo data corresponds to a product description.

FIG. 42 illustrates two "date input" plug-in panes 4202 and 4204 that are used to designate a date range for a dependent pane 4206 entitled "orders". The example of FIG. 42 thus also demonstrates an example of a parallel or "two parent" relationship to the dependent orders table 4206. The drop-down 1102 contains an SQL parameterized query statement used to dynamically link the table 4206 to the two data input plug-in panes 4202 and 4204.

Thus, it can be appreciated that plug-ins may comprise data publishing entities (for example, the respective image viewer and memo viewer panes 4108 and 4110 of FIG. 41). Plug-ins may also constitute data processing entities and data input entities, as demonstrated by respective numeric input and date input panes shown in FIGS. 40 and 42. Another plug-in includes "Mach 5 Mailer", a plug-in that reads data from a selected database query pane and exports an email mailing list, optionally for automated emailing. A "text input" plug-in operates similarly to the numeric input plug-in of FIG. 40 but without format checking to ensure that only numerals are entered. A "Dataserv" plug-in accesses an Internet reverse telephone directory application. One example of its use is to update customer lists with current address information. Other plug-ins may perform a wide range of tasks, limited by only the imagination of the plug-in writer, as indicated by the "Ninja Stealth" plug-in described above used to vary the transparency of the database query set desktop.

As indicated above, a script pane may be added to a query viewer workspace and interact with other panes thereon. FIG. 43 is a representation of a database query set that includes a script pane 4302. For the example of FIG. 43, the script is written in the SQL database language for creating a "temporary table" that other panes in the query set write to. Table 4304 is a pane representation of the temporary table and contains processed data from other sources in the query set. In the example of FIG. 43, an "Execute" button 4306 is included in the script pane, indicating that in this case the script may be manually forced to execute.

According to the example of FIG. 43, potential error condition may be readily seen. If the script to create the temporary table in script pane 4302 were to not execute prior to executing the queries and linkages that place data into the temporary table, an error condition would result. The error condition may be dealt with in various ways. According to an exemplary embodiment, an "ignore errors" flag may be set to simply ignore that data has no place to go. The ignore errors flag may be set by the user or alternatively may be automatically enabled according to various parameters. Alternatively or additionally, a query time-out may be used to prevent endless loops from stopping execution of other portions of the query set.

According to another exemplary embodiment, execution order logic may be used to determine the required execution order of panes and linkages in the query set. Such a determination may be run by the user, or alternatively may be performed automatically. In the example of FIG. 43, such execution order logic determines that the script pane 4302 needs to execute prior to any queries that place data in the temporary table created thereby.

Another type of error control may be run during query building. In an exemplary embodiment, an error checker runs in the background during the query builder process, looking for circular references, determining execution order, etc. Such conditions may optionally be-flagged to the user so that pane and linkage definitions, execution order, and/or scripts may be modified to ameliorate the error condition.

In addition to using plug-ins, the database query viewer itself, according to an exemplary embodiment may be a plug-in. After a database query set is defined, it may be called to display a result to a user or, alternatively, return a value to the application from which it is called. According to one embodiment, the database query viewer is placed in a "stand-by" mode for calling as a plug-in. In a "cold stand-by" variant, the database query viewer remains inactive and responds upon being called. In a "warm stand-by" variant, the database query viewer is not necessarily displayed, but remains aware of data input changes, such as changes in the underlying database tables, and automatically updates itself to remain current.

The database query viewer may similarly be run in a minimized mode. A database query set may include panes that automatically update upon changes in input. One type of such input is monitoring changes to the underlying databases and updating itself upon such activity. An automatic update mode may be used while the application is open, minimized, or as described above, in warm stand-by mode. Also as described above, individual fields or panes may be hidden or minimized, while still retaining their function.

The preceding overview, brief description of the drawings, and detailed description describe exemplary embodiments according to the present invention in a manner intended to foster ease of understanding by the reader. Other structures, methods, and equivalents may be within the scope of the invention. As such, the scope of the invention described herein shall be limited only by the claims.

What is claimed is:

1. A method for expressing related database information comprising:
   receiving a defined linkage to a first database query result from a user;
   performing a first query of a database stored on first computer storage apparatus;
   displaying a result of the first database query in a first pane including a first table including data;
   receiving a user selection of at least one entry within the first database query result;
   automatically generating, for a second pane, a second database query by running the defined linkage to the first database query result using a parameterized query associated with the second pane, the parameterized query employing a reference to the first pane and an indicator the selected record within the first database query result, wherein the second database query is different than the first query;
wherein automatically generating the second database query includes employing an indicator of the selected record within the first database query result as a parameter in the automatic generating a second database query;
wherein automatically generating a second database query includes running a defined linkage to the first database query result;
receiving the defined linkage from user input;
performing the second database query of a database stored in second computer storage apparatus; and
expressing, in the second pane, a second database query result in a second table corresponding to the second database query;
wherein the second database query result includes data related to and different than data in the first database query result.

2. The method for expressing related database information of claim 1: wherein expressing the second database query result includes processing a result of the second database query to express data returned by the second database query.

3. The method for expressing related database information of claim 2:
wherein expressing a second database query result includes expressing data referenced by a cell included in the second database query result including at least one selected from the group consisting of playing an audio file, playing a video file, displaying a still image, displaying a memo field, displaying a word processor document, displaying a spreadsheet, displaying a presentation, displaying an HTML document, displaying an XML document, and executing a script.

4. The method for expressing related database information of claim 1:
wherein expressing the second database query result includes displaying at least a portion of at least one database record corresponding to the second database query result.

5. The method for expressing related database information of claim 4: wherein the at least a portion of the at least one database record is a portion of the at least one database record that is automatically selected.

6. The method for expressing related database information of claim 1, further comprising:
displaying a third database query result;
receiving a selection of a record within the third database query result; and
wherein automatically generating the second database query further includes employing an indicator of the selected record within the third database query result as a parameter in the automatic generation of the second database query.

7. The method for expressing related database information of claim 1, further comprising:
receiving a new selection of a second record within the first database query result;
automatically generating a new second database query employing an indicator of the second selected record within the first database query result as a parameter in the automatic generation of the new second database query; and expressing a new second database query result corresponding to the new second database query.

8. The method for expressing related database information of claim 1 further comprising:
retrieving the defined linkage from a stored query set;
wherein the query set includes at least two dynamically linked database queries.

9. A non-transitory computer readable medium carrying computer-readable instructions for expressing related database information comprising:
receiving a defined linkage to a first database query result from a user;
displaying the result of a first database query in a first pane including a table including data;
automatically generating, for a second pane, a second database query by running the defined linkage to the first database query result using a parameterized query associated with the second pane, the parameterized query, employing a reference to the first pane and an indicator of the selected record within the first database query result; and
wherein automatically generating the second database query includes employing an indicator of the selected record within the first database query result as a parameter in the automatic generating a second database query;
wherein automatically generating a second database query includes running a defined linkage to the first database query result;
receiving the defined linkage from user input;
expressing a second database query result corresponding to the second database query;
wherein the first database query is different than the second database query; and
wherein the second database query result includes a table with data related to and different that data in the first database query result.

10. The non-transitory computer readable medium carrying computer-readable instructions for expressing related database information of claim 9:
wherein expressing the second database query result includes processing a result of the second database query to express data returned by the second database query.

11. The non-transitory computer readable medium carrying computer-readable instructions for expressing related database information of claim 10:
wherein expressing a second database query result includes expressing data referenced by a cell included in the second database query result including at least one selected from the group consisting of playing an audio file, playing a video file, displaying a still image, displaying a memo field, displaying a word processor document, displaying a spreadsheet, displaying a presentation, displaying an HTML document, displaying an XML document, and executing a script.

12. The non-transitory computer readable medium carrying computer-readable instructions for expressing related database information of claim 9:
wherein expressing the second database query result includes displaying at least a portion of at least one database record corresponding to the second database query result.

13. The non-transitory computer readable medium carrying computer-readable instructions for expressing related database information of claim 12:
wherein the at least a portion of the at least one database record is a portion of the at least one database record that is automatically selected.

14. The non-transitory computer readable medium carrying computer-readable instructions for expressing related database information of claim 9 further comprising instructions for:
  displaying a third database query result;
  receiving a selection of a record within the third database query result; and
  wherein automatically generating the second database query further includes employing an indicator of the selected record within the third database query result as a parameter in the automatic generation of the second database query.

15. The non-transitory computer readable medium carrying computer-readable instructions for expressing related database information of claim 9 further comprising instructions for:
  receiving a new selection of a second record within the first database query result;
  automatically generating a new second database query employing an indicator of the second selected record within the first database query result as a parameter in the automatic generation of the new second database query; and
  expressing a new second database query result corresponding to the new second database query.

16. The non-transitory computer readable medium carrying computer-readable instructions for expressing related database information of claim 9 further comprising instructions for: retrieving the defined linkage from a stored query set.

17. A method comprising:
  establishing a first window having records of a database corresponding to a first query of the database;
  establishing a second window having records of a database corresponding to a second query of the database different than the first query;
  establishing a defined dynamic linkage between records query in the first window and records in the second window including a parameterized query statement received from a user to automatically perform the second query of the database corresponding to the second window, the second query employing an indicator of a selected database recorded within the first window as a parameter, wherein the records displayed in the second window are selected automatically responsive to a selection of at least one record in the first window according to the dynamic linkage to the selected at least one record displayed in the first window; and
    wherein the database records of the first window and the database records of the second window are records from first and second databases, respectively.

18. The method of claim 17:
wherein establishing the first and second windows includes displaying the first and second windows.

19. The method of claim 18 further comprising:
establishing a size of at least one of the first and second windows.

20. The method of claim 18 further comprising:
establishing a location of at least one of the first and second windows.

21. The method of claim 18 further comprising:
receiving a selection of a database first record in the first window; and
automatically displaying at least one related database second record in the second window.

22. The method of claim 21:
  wherein the at least one related database second record includes a plurality of records.

23. The method of claim 21 further comprising:
  receiving a selection of a database third record in the first window;
  automatically displaying at least one related database fourth record in the second window.

24. The method of claim 17 further comprising:
  saving the established first and second windows and the dynamic relationship there between as a database set.

25. The method of claim 24:
  wherein parameters of the established first and second windows and the dynamic relationship there between are saved as XML.

26. The method of claim 17 further comprising:
  transmitting the established first and second windows and the dynamic relationship there between as a database set.

27. The method of claim 26:
  wherein the transmission includes attaching the database set to an email.

28. The method of claim 17:
  Wherein establishing a dynamic linkage between records in the first window and records in the second window includes receiving the parameterized query statement in at least one of the first or second windows.

29. The method of claim 17:
  wherein establishing a dynamic linkage between records in the first window and records in the second window includes receiving a graphical interface indication of the dynamic linkage.

30. The method of claim 29:
  wherein the graphical interface indication includes a drag-and-drop operation.

31. A non-transitory computer readable medium carrying computer readable instructions for viewing databases to cause a computer to execute steps comprising:
  establishing a first window having records of a database;
  establishing a second window having records of a database;
  establishing a defined dynamic linkage between records in the first window and records in the second window including a parameterized query statement received from a user to automatically perform, the second query of the database corresponding to the second window, the second query employing an indicator of a selected database record within the first window as a parameter; and
  wherein selection of a record in the first window automatically determines the records displayed in the second window according to the defined dynamic linkage;
  wherein the database records of the first window and the database records of the second window are records from first and second databases, respectively.

32. The non-transitory computer readable medium carrying computer readable instructions for viewing databases of claim 31:
  wherein establishing the first and second windows includes displaying the first and second windows.

33. The non-transitory computer readable medium carrying computer readable instructions for viewing databases of claim 32 further including instructions to cause a computer to execute steps comprising:
  establishing a size of at least one of the first and second windows.

34. The non-transitory computer readable medium carrying computer readable instructions for viewing databases of claim 32 further including instructions to cause a computer to execute steps comprising:
establishing a location of at least one of the first and second windows.

35. The non-transitory computer readable medium carrying computer readable instructions for viewing databases of claim 32 further including instructions to cause a computer to execute steps comprising:
receiving a selection of a database first record in the first window; and
automatically displaying at least one related database second record in the second window.

36. The non-transitory computer readable medium carrying computer readable instructions for viewing databases of claim 35:
wherein the at least one related database second record includes a plurality of records.

37. The non-transitory computer readable medium carrying computer readable instructions for viewing databases of claim 35 further including instructions to cause a computer to execute steps comprising:
receiving a selection of a database third record in the first window; and
automatically displaying at least one related database fourth record in the second window.

38. The non-transitory computer readable medium carrying computer readable instructions for viewing databases of claim 31 further including instructions to cause a computer to execute steps comprising:
saving the established first and second windows and the dynamic relationship there between as a database set.

39. The non-transitory computer readable medium carrying computer readable instructions for viewing databases of claim 38:
wherein parameters of the established first and second windows and the dynamic relationship there between are saved as XML.

40. The non-transitory computer readable medium carrying computer readable instructions for viewing databases of claim 31 further including instructions to cause a computer to execute steps comprising:
transmitting the established first and second windows and the dynamic relationship there between as a database set.

41. The non-transitory computer readable medium carrying computer readable instructions for viewing databases of claim 40:
wherein the transmission includes attaching the database set to an email.

42. The non-transitory computer readable medium carrying computer readable instructions for viewing databases of claim 30:
wherein establishing a dynamic linkage between records in the first window and records in the second window includes receiving a graphical interface indication of the dynamic linkage.

43. The non-transitory computer readable medium carrying computer readable instructions for viewing databases of claim 30:
Wherein establishing a dynamic linkage between records in the first window and records in the second window includes receiving a graphical interface indication of the dynamic linkage.

44. The non-transitory computer readable medium carrying computer readable instructions for viewing databases of claim 43:
wherein the graphical interface indication includes a drag-and-drop operation.

45. The method for expressing related database information of claim 1:
wherein the first computer storage apparatus and the second computer storage apparatus are the same computer storage apparatus.

46. The method for expressing related database information of claim 1:
wherein the first and second database queries are performed on the same database.

47. The method for expressing related database information of claim 1:
wherein the first and second database queries are performed on different databases.

48. The method for expressing related database information of claim 47:
wherein the first and second databases are different database types; wherein establishing a dynamic linkage between records in the first window and records in the second window includes receiving the parameterized query statement in at least one of the first or the second windows.

* * * * *

UNITED STATES PATENT AND TRADEMARK OFFICE
CERTIFICATE OF CORRECTION

PATENT NO.       : 8,073,836 B2
APPLICATION NO.  : 11/070054
DATED            : December 6, 2011
INVENTOR(S)      : Kent S. McNall et al.

It is certified that error appears in the above-identified patent and that said Letters Patent is hereby corrected as shown below:

- In Claim 9, Column 26, Line 34 of the patent, "with data related to and different that data in the first" should read --with data related to and different than data in the first--.

- In Claim 17, Column 27, Line 39 of the patent, "between records query in the first window and records in the second" should read --between records in the first window and records in the second--.

- In Claim 28, Column 28, Line 24 of the patent, "Wherein establishing a dynamic linkage between records" should read --wherein establishing a dynamic linkage between records--.

- In Claim 42, Column 30, Line 8 of the patent, "claim 30:" should read --claim 31:--.

- In Claim 43, Column 30, Line 15 of the patent, "claim 30:" should read --claim 31:--.

Signed and Sealed this
Twenty-ninth Day of May, 2012

David J. Kappos
*Director of the United States Patent and Trademark Office*